United States Patent
Komano

(10) Patent No.: US 12,542,180 B2
(45) Date of Patent: Feb. 3, 2026

(54) SEMICONDUCTOR MEMORY DEVICE

(71) Applicant: Kioxia Corporation, Tokyo (JP)

(72) Inventor: Yusuke Komano, Yokohama Kanagawa (JP)

(73) Assignee: Kioxia Corporation, Tokyo (JP)

( * ) Notice: Subject to any disclaimer, the term of this patent is extended or adjusted under 35 U.S.C. 154(b) by 178 days.

(21) Appl. No.: 18/459,606

(22) Filed: Sep. 1, 2023

(65) Prior Publication Data

US 2024/0257869 A1    Aug. 1, 2024

(30) Foreign Application Priority Data

Jan. 17, 2023   (JP) ................. 2023-005213

(51) Int. Cl.
  *G11C 11/56*   (2006.01)
  *G11C 16/04*   (2006.01)
  *G11C 16/08*   (2006.01)
  *G11C 16/10*   (2006.01)
  *G11C 16/26*   (2006.01)

(52) U.S. Cl.
  CPC ...... *G11C 11/5671* (2013.01); *G11C 11/5628* (2013.01); *G11C 11/5642* (2013.01); *G11C 16/0483* (2013.01); *G11C 16/08* (2013.01); *G11C 16/10* (2013.01); *G11C 16/26* (2013.01)

(58) Field of Classification Search
  CPC ............ G11C 11/5671; G11C 11/5628; G11C 11/5642; G11C 16/0483; G11C 16/08; G11C 16/10; G11C 16/26; G11C 16/32

See application file for complete search history.

(56) References Cited

U.S. PATENT DOCUMENTS

| | | | |
|---|---|---|---|
| 2007/0268750 A1* | 11/2007 | Suzuki | G11C 16/0483 365/185.11 |
| 2011/0058417 A1 | 3/2011 | Aritome | |
| 2014/0286094 A1* | 9/2014 | Shen | G11C 16/10 365/185.03 |
| 2018/0181301 A1* | 6/2018 | Bandic | G11C 11/5642 |
| 2021/0398598 A1 | 12/2021 | Shibuya et al. | |

FOREIGN PATENT DOCUMENTS

| | | |
|---|---|---|
| JP | 2020107387 A | 7/2020 |
| JP | 2022002158 A | 1/2022 |

* cited by examiner

*Primary Examiner* — Uyen Smet
(74) *Attorney, Agent, or Firm* — Holtz, Holtz & Volek PC

(57) ABSTRACT

According to one embodiment, a semiconductor memory device includes a memory cell array and a control circuit. The memory cell array includes two or more memory cells. The control circuit is configured to control a write operation of writing first data to the two or more memory cells and a read operation of reading the first data from the two or more memory cells. The control circuit sets cell states of the two or more memory cells based on second data included in the first data in the write operation. The control circuit converts read data into the first data based on the second data included in data read from the two or more memory cells in the read operation.

11 Claims, 58 Drawing Sheets

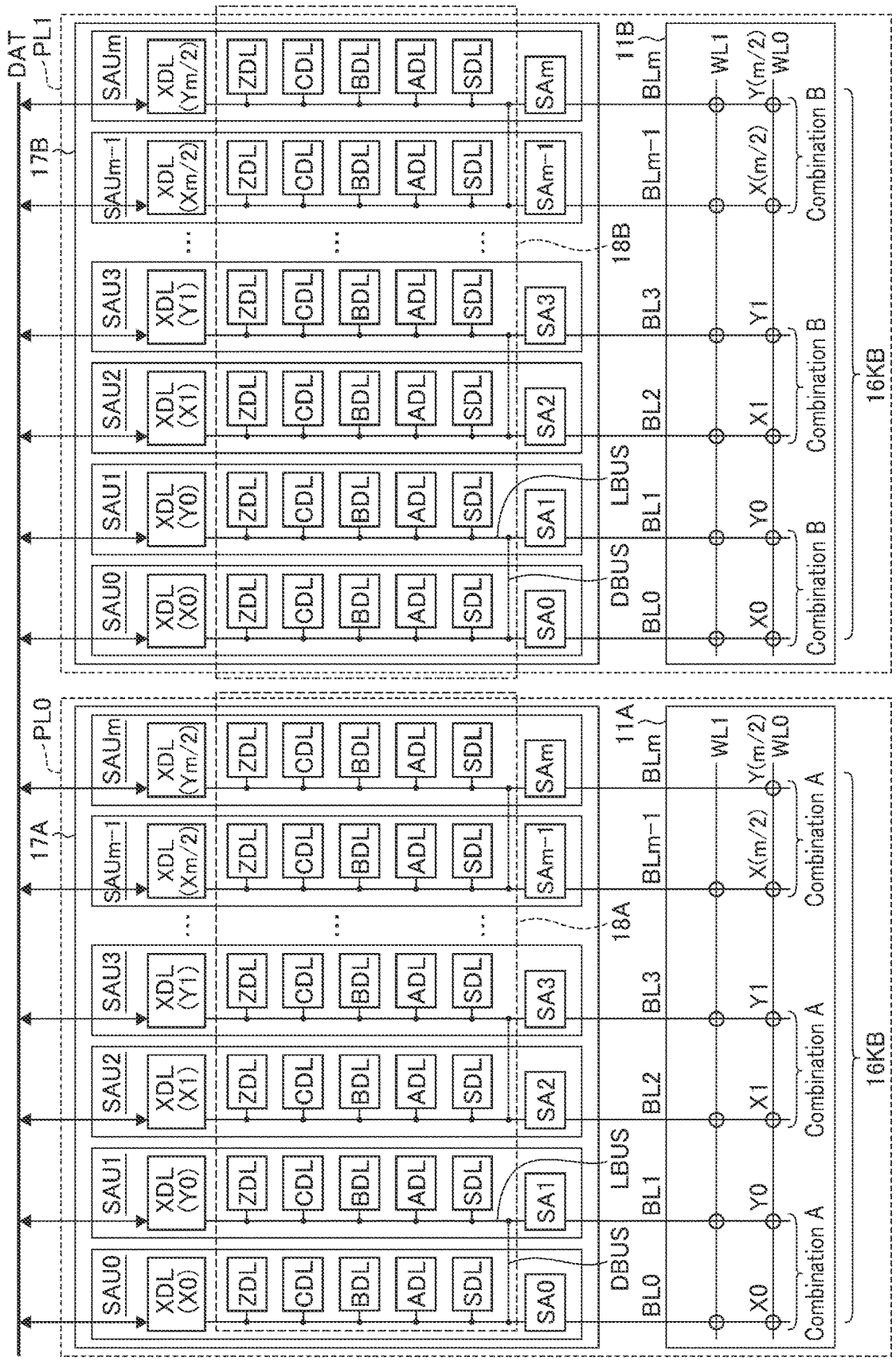
F I G. 7

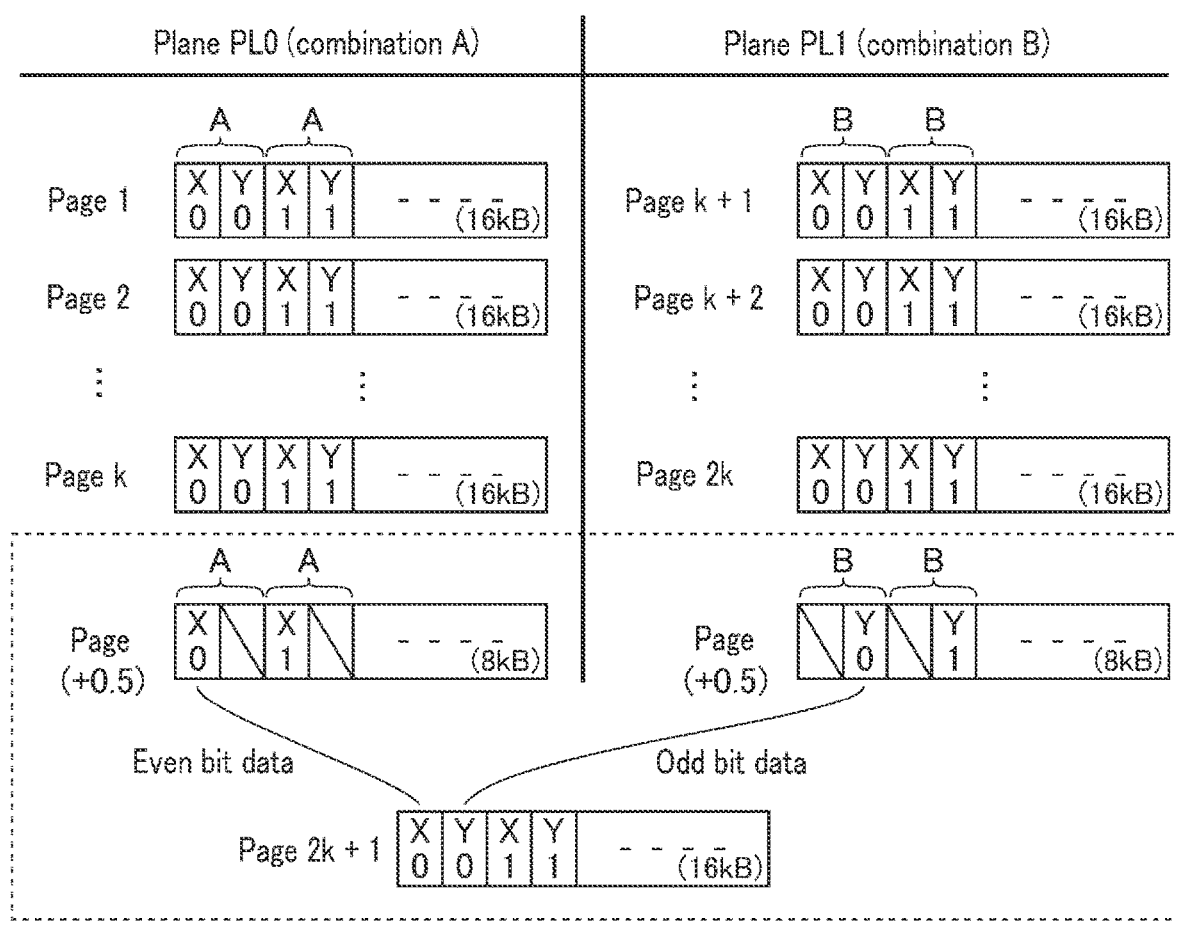
F I G. 16

Example of threshold coding

| | S(0) | | S($2^{k-1}-1$) | S($2^{k-1}$) | | S($2^k-1$) | S($2^k$) | | | S($2^k+2^{k-1}-1$) |
|---|---|---|---|---|---|---|---|---|---|---|
| ADL | 1 | 1 | 1 | 0 | 0 | 0 | 0 | 0 | 0 | 0 |
| BDL | 1 | 1 | 1 | 1 | 0 | 0 | 0 | 0 | 0 | 0 |
| CDL | 1 | 1 | 1 | 1 | 1 | 0 | 0 | 0 | 0 | 0 |
| ... | | | | | | | | | | |
| ... | | | | | | | | | | |
| ... | | | | | | | | | | |
| ZDL | 1 | 1 | 1 | 1 | 1 | 1 | 0 | 0 | 0 | 0 | k-bit

Mirror symmetry

F I G. 19

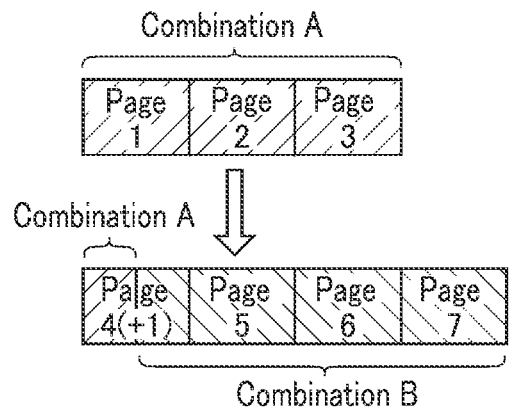
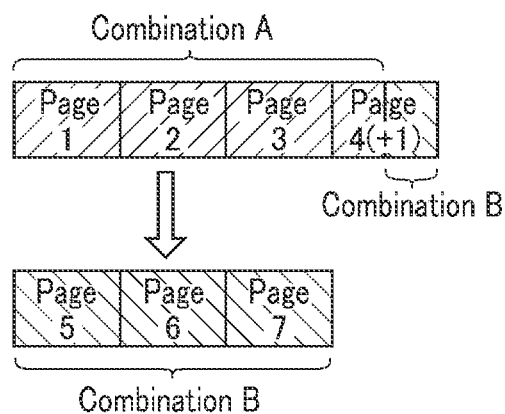
FIG. 20

(a)

| | S0 | S1 | S2 |
|---|---|---|---|
| ADL | 1 | 0 | 0 |
| ZDL | 1 | 1 | 0 |

⇒

(b)

| | S0 | S1 | S2 |
|---|---|---|---|
| [0] | 0 | 1 | 1 |
| 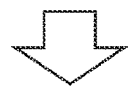 | 0 | 0 | 1 |

FIG. 23

Writing (in case of D1.5)
　　Page 1(16kB)→ Page 2(8kB+8kB)→ Page 3(16kB)

Combination A　　　　　　Combination B (a) First writing
Page 1 (combination A) 16kB

Combination A, X:
| Y\X | S0 | S1 | S2 |
|---|---|---|---|
| S0 | 0 | 1 | |
| S1 | 2 | 3 | |
| S2 | | | |

Combination B: (empty 3×3)

(b) Second writing
Page 2 (combination A) 8kB
Page 2 (combination B) 8kB

Combination A:
| Y\X | S0 | S1 | S2 |
|---|---|---|---|
| S0 | 0 | 1 | 4 |
| S1 | 2 | 3 | 5 |
| S2 | | 6 | 7 |

Combination B:
| Y\X | S0 | S1 | S2 |
|---|---|---|---|
| S0 | 0 | 1 | |
| S1 | | | |
| S2 | | | |

(c) Third writing
Page 3 (combination B) 16kB

Combination A:
| Y\X | S0 | S1 | S2 |
|---|---|---|---|
| S0 | 0 | 1 | 4 |
| S1 | 2 | 3 | 5 |
| S2 | | 6 | 7 |

Combination B:
| Y\X | S0 | S1 | S2 |
|---|---|---|---|
| S0 | 0 | 1 | 4 |
| S1 | 2 | 3 | 5 |
| S2 | | 6 | 7 |

Writing (in case of D1.5) Second example
Page 1 (16kB) → Page 2 (16kB) → Page 3 (16kB)

(a) First writing
Page 1 (combination A) : 10

(b) Second writing
Page 2 (combinations A and B) : 11

(c) Third writing
Page 3 (combination B) : 00

F I G. 26

Writing (in case of D1.5) Third example
Page 1 (16kB) → Page 2 (16kB) → Page 3 (16kB)

(a) First writing
Page 1 (combination A) : 01

(b) Second writing
Page 2 (combinations A and B) : 00

(c) Third writing
Page 3 (combination B) : 01

F I G. 27

Writing (in case of D1.5) Fourth example
Page 1 (16kB) → Page 2 (16kB) → Page 3 (16kB)

(a) First writing
Page 1 (combination A) : 01

(b) Second writing
Page 2 (combinations A and B) : 11

(c) Third writing
Page 3 (combination B) : 10

F I G. 28

Writing (in case of D1.5)   Fifth example
Page 1(16kB)→ Page 2(16kB)→ Page 3(16kB)

(a) First writing
Page 1 (combination A) : 01

(b) Second writing
Page 2 (combinations A and B) : 01

(c) Third writing
Page 3 (combination B) : 10

|     | S0 | S1 | S2 | S3 | S4 | S5 |
|-----|----|----|----|----|----|----|
| ADL | 1  | 1  | 0  | 0  | 0  | 0  |
| BDL | 1  | 0  | 0  | 1  | 1  | 0  |
| ZDL | 1  | 1  | 1  | 1  | 0  | 0  |

(b)

|     | S0 | S1 | S2 | S3 | S4 | S5 |
|-----|----|----|----|----|----|----|
| [1] | 0  | 0  | 1  | 1  | 1  | 1  |
| [0] | 0  | 1  | 1  | 0  | 0  | 1  |
| γ   | 0  | 0  | 0  | 0  | 1  | 1  |

Writing (in case of D2.5)

Page 1 (16kB) → Page 3 (16kB) → Page 4 (16kB)
Page 2 (16kB)                   Page 5 (16kB)

Combination A

(a) First writing
Page 1 (combination A) 16kB
Page 2 (combination A) 16kB

|     | S0 | S1 | S2 | S3 | S4 | S5 |
|-----|----|----|----|----|----|----|
| S0  | 0  | 1  | 3  | 2  |    |    |
| S1  | 4  | 5  | 7  | 6  |    |    |
| S2  | 12 | 13 | 15 | 14 |    |    |
| S3  | 8  | 9  | 11 | 10 |    |    |
| S4  |    |    |    |    |    |    |
| S5  |    |    |    |    |    |    |

Combination B

|     | S0 | S1 | S2 | S3 | S4 | S5 |
|-----|----|----|----|----|----|----|
| S0  |    |    |    |    |    |    |
| S1  |    |    |    |    |    |    |
| S2  |    |    |    |    |    |    |
| S3  |    |    |    |    |    |    |
| S4  |    |    |    |    |    |    |
| S5  |    |    |    |    |    |    |

(b) Second writing
Page 3 (combination A) 8kB
Page 3 (combination B) 8kB

Combination A:

|     | S0 | S1 | S2 | S3 | S4 | S5 |
|-----|----|----|----|----|----|----|
| S0  | 0  | 1  | 3  | 2  | 16 | 17 |
| S1  | 4  | 5  | 7  | 6  | 20 | 21 |
| S2  | 12 | 13 | 15 | 14 | 22 | 23 |
| S3  | 8  | 9  | 11 | 10 | 18 | 19 |
| S4  |    |    | 25 | 24 | 26 | 27 |
| S5  |    |    | 29 | 28 | 30 | 31 |

Combination B:

|     | S0 | S1 | S2 | S3 | S4 | S5 |
|-----|----|----|----|----|----|----|
| S0  | 0  | 1  |    |    |    |    |
| S1  |    |    |    |    |    |    |
| S2  |    |    |    |    |    |    |
| S3  |    |    |    |    |    |    |
| S4  |    |    |    |    |    |    |
| S5  |    |    |    |    |    |    |

(c) Third writing
Page 4 (combination A) 16kB
Page 5 (combination A) 16kB

Combination A:

|     | S0 | S1 | S2 | S3 | S4 | S5 |
|-----|----|----|----|----|----|----|
| S0  | 0  | 1  | 3  | 2  | 16 | 17 |
| S1  | 4  | 5  | 7  | 6  | 20 | 21 |
| S2  | 12 | 13 | 15 | 14 | 22 | 23 |
| S3  | 8  | 9  | 11 | 10 | 18 | 19 |
| S4  |    |    | 25 | 24 | 26 | 27 |
| S5  |    |    | 29 | 28 | 30 | 31 |

Combination B:

|     | S0 | S1 | S2 | S3 | S4 | S5 |
|-----|----|----|----|----|----|----|
| S0  | 0  | 1  | 3  | 2  | 16 | 17 |
| S1  | 4  | 5  | 7  | 6  | 20 | 21 |
| S2  | 12 | 13 | 15 | 14 | 22 | 23 |
| S3  | 8  | 9  | 11 | 10 | 18 | 19 |
| S4  |    |    | 25 | 24 | 26 | 27 |
| S5  |    |    | 29 | 28 | 30 | 31 |

F I G. 32

(a) Writing up to page 2k
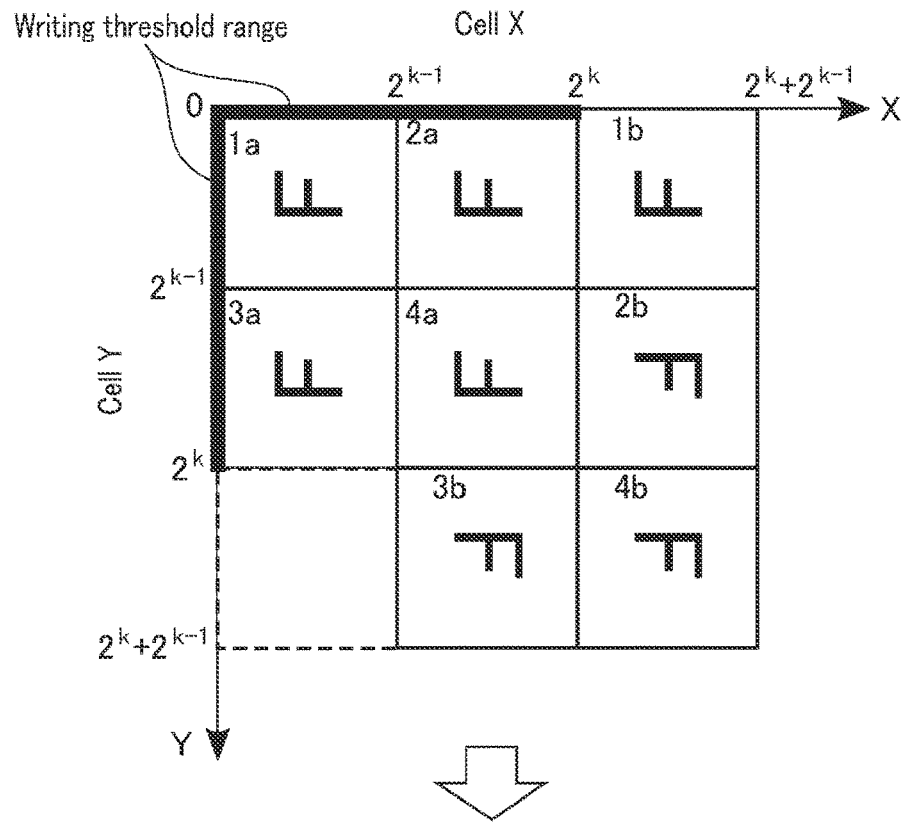
(b) Writing of page + 1
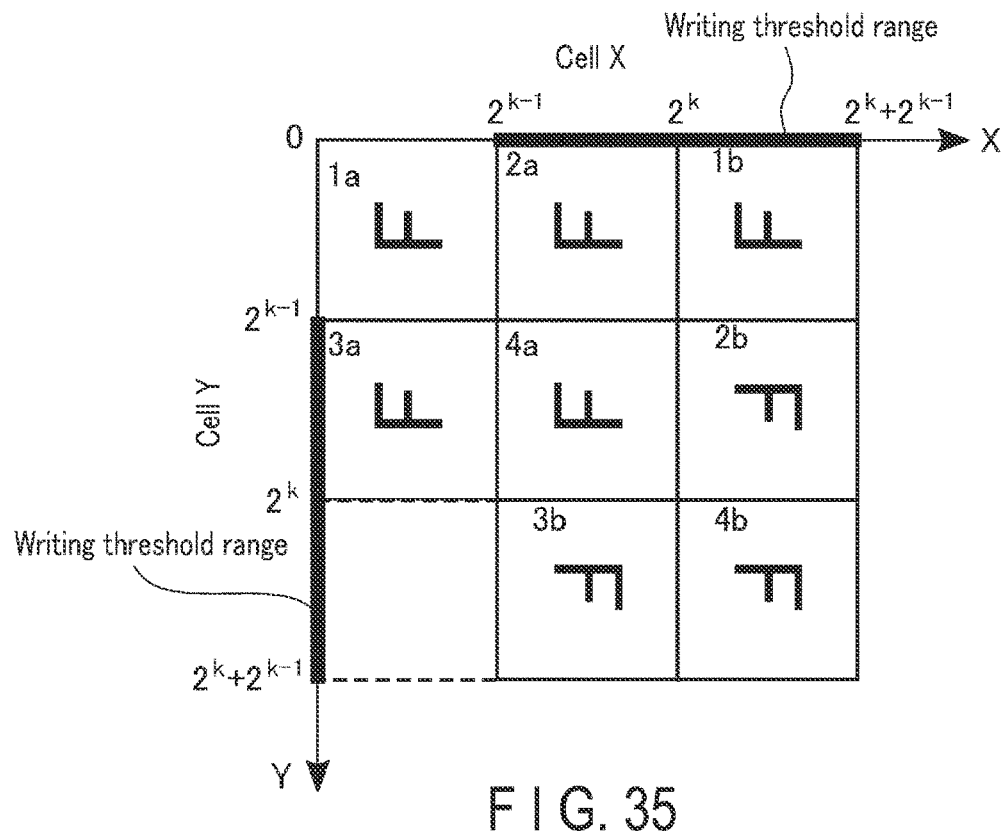
FIG. 35

(a) Writing up to page 2k
|  | S0 | S1 | S2 | S3 | S4 | S5 | S6 | S7 | S8 | S9 | S10 | S11 |
|---|---|---|---|---|---|---|---|---|---|---|---|---|
| ADL | 1 | 1 | 1 | 1 | 0 | 0 | 0 | 0 |  |  |  |  |
| BDL | 1 | 1 | 0 | 0 | 0 | 0 | 1 | 1 |  |  |  |  |
| CDL | 1 | 0 | 0 | 1 | 1 | 0 | 0 | 1 |  |  |  |  |
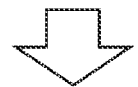
(b) Writing of page + 1
|  | S0 | S1 | S2 | S3 | S4 | S5 | S6 | S7 | S8 | S9 | S10 | S11 |
|---|---|---|---|---|---|---|---|---|---|---|---|---|
| ADL |  |  |  |  | 0 | 0 | 0 | 0 | 1 | 1 | 1 | 1 |
| BDL |  |  |  |  | 0 | 0 | 1 | 1 | 1 | 1 | 0 | 0 |
| CDL |  |  |  |  | 1 | 0 | 0 | 1 | 1 | 0 | 0 | 1 |
F I G. 36

< Pages 1 to 7 continuous writing >
(a) In case of division by plane PL0 (combination A) and plane PL1 (combination B)
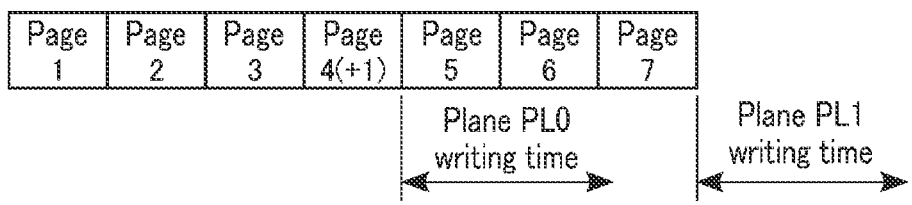
(b) In case of division by word line WL0 (combination A) and word line WL1 (combination B)
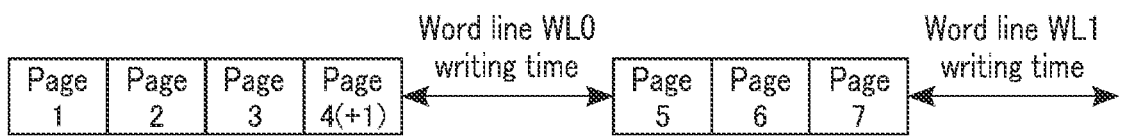
F I G. 38

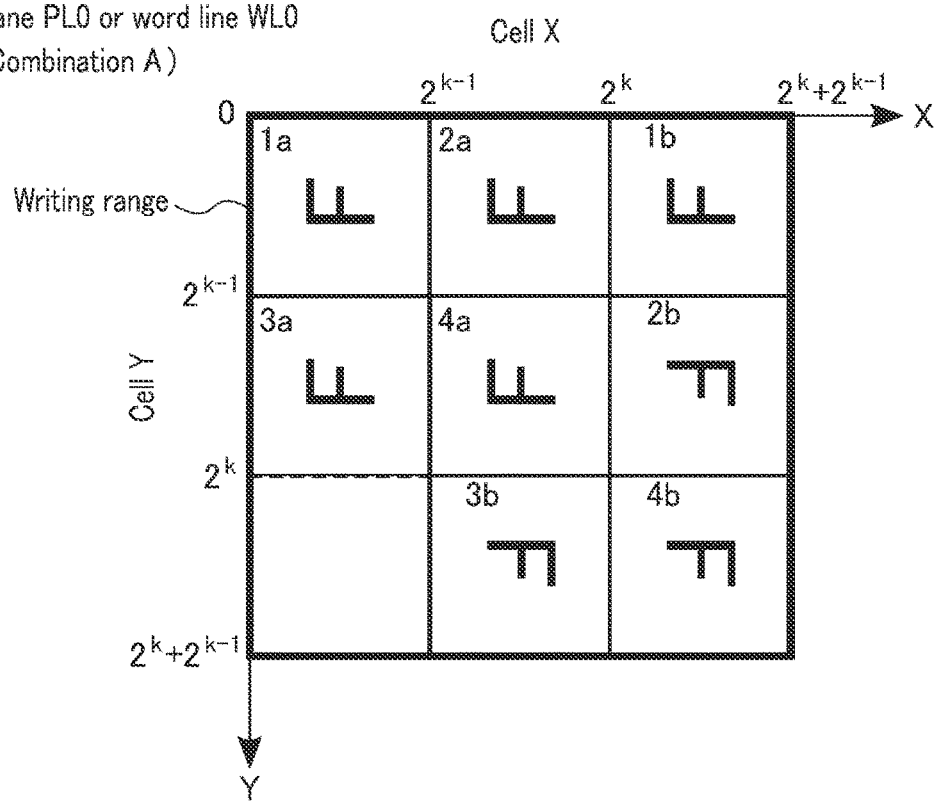
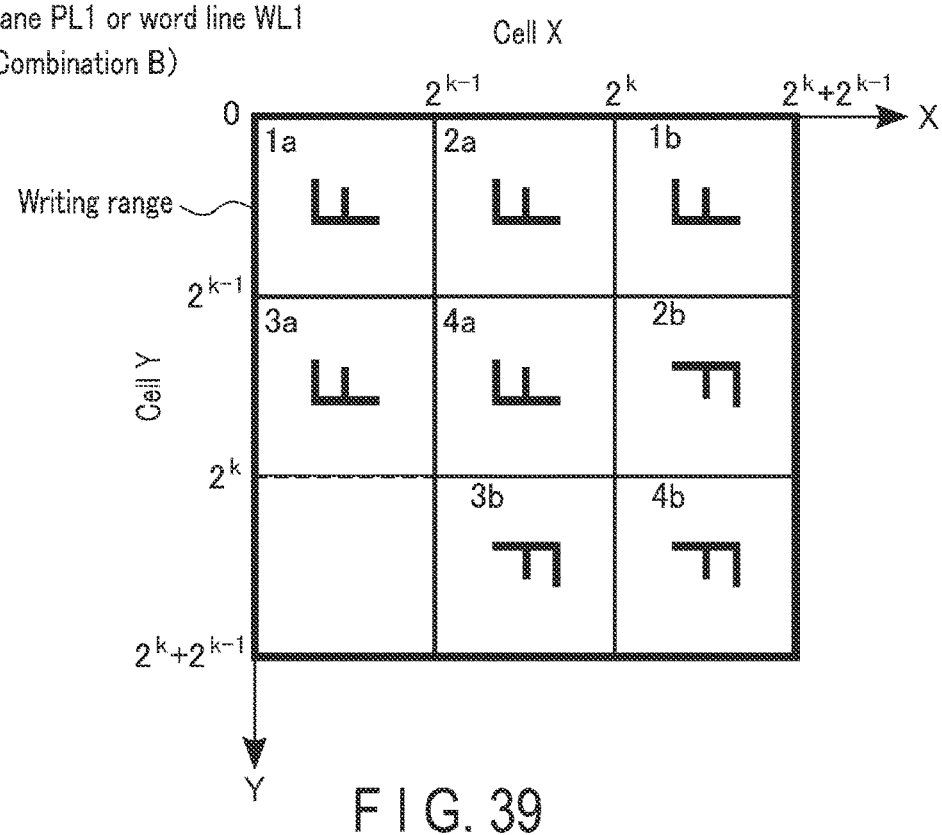
FIG. 39

⎧ < Pages 1 to 3 precedent writing >
⎪
⎪ (a) In case of division by plane PL0 (combination A) and plane PL1 (combination B)
⎪
⎪ 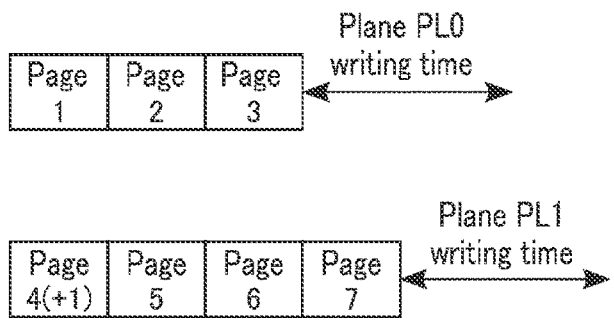
⎨
⎪
⎪ (b) In case of division by word line WL0 (combination A) and word line WL1 (combination B)
⎪
⎪ 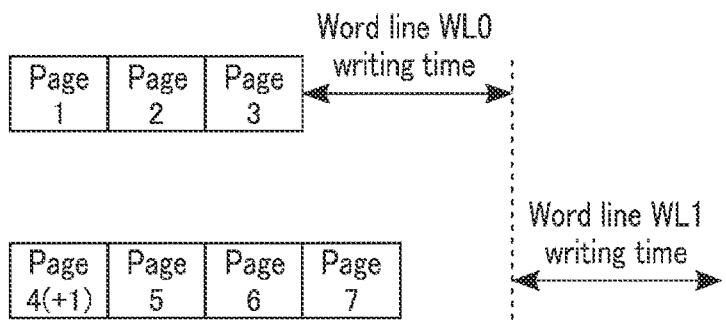
⎩
F I G. 41

< Pages 1 to 3 precedent writing >
(a) Plane PL0 or word line WL0
(Combination A)
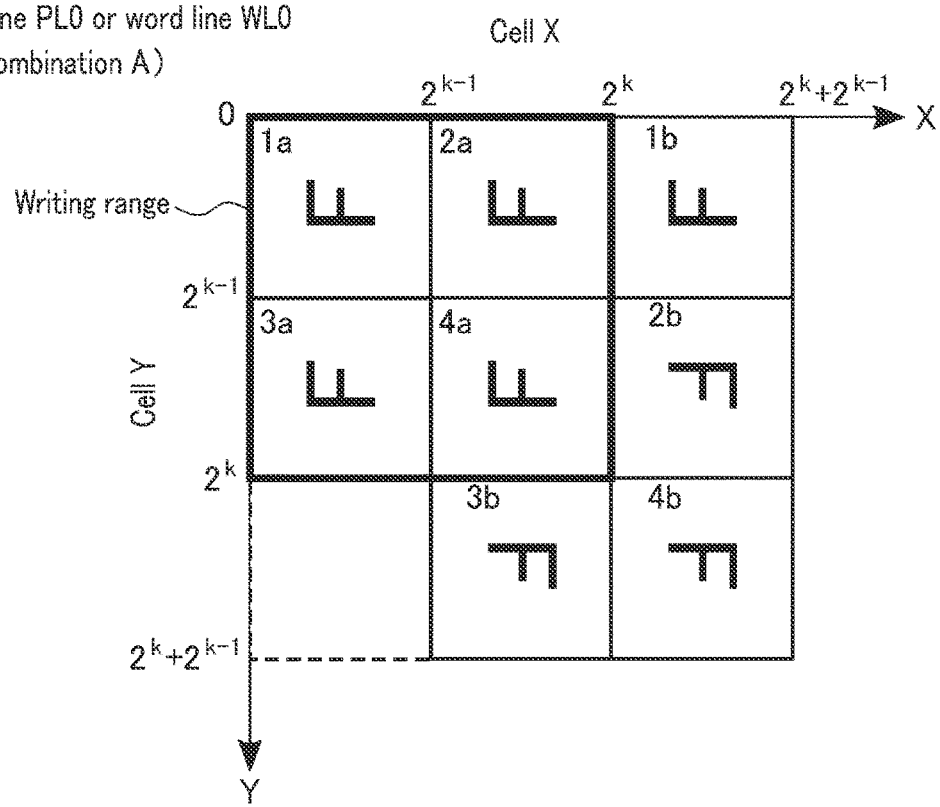
(b) Plane PL1 or word line WL1
(Combination B)
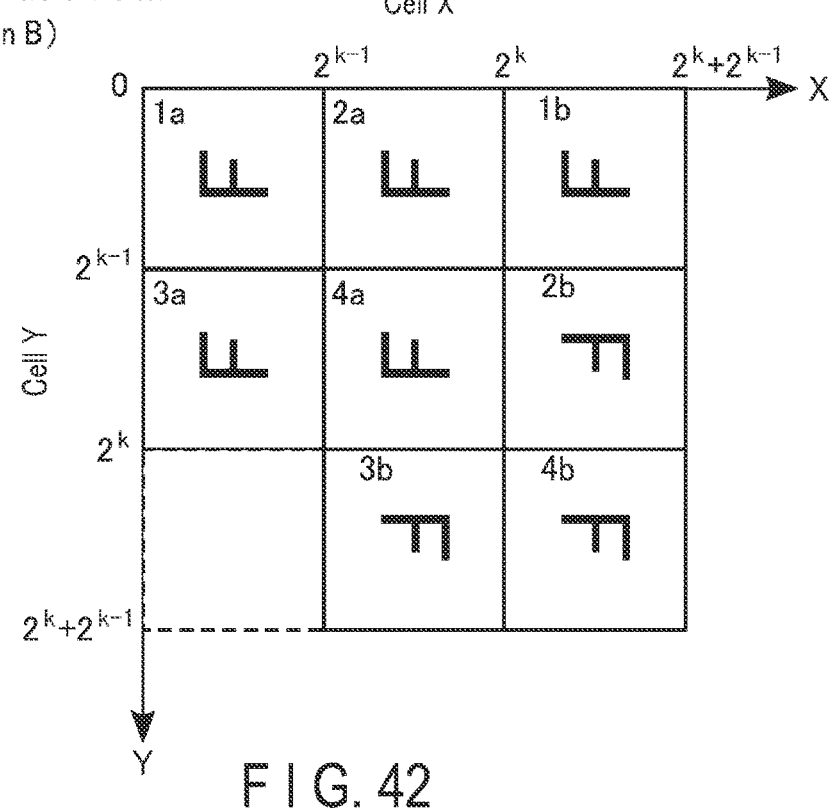
FIG. 42

⟨ Pages 1 to 3 precedent writing ⟩

| Plane PL0 (combination A) | Plane PL1 (combination B) |

Page 1: | X | Y | X | Y | - - (16kB) |  
0 | 0 | 1 | 1

Page 2: | X | Y | X | Y | - - (16kB) |  
0 | 0 | 1 | 1

Page 3: | X | Y | X | Y | - - (16kB) |  
0 | 0 | 1 | 1

Page 4 (+0.5): | X | \ | X | \ | - - (8kB) |  
0 |   | 1 |

Precedent writing page

Page 4 (+0.5): | \ | Y | \ | Y | - - (8kB) |  
  | 0 |   | 1

Page 5: | X | Y | X | Y | - - (16kB) |  
0 | 0 | 1 | 1

Page 6: | X | Y | X | Y | - - (16kB) |  
0 | 0 | 1 | 1

Page 7: | X | Y | X | Y | - - (16kB) |  
0 | 0 | 1 | 1

F I G. 43

< Pages 1 to 4 precedent writing >
(a) In case of division by plane PL0 (combination A) and plane PL1 (combination B)
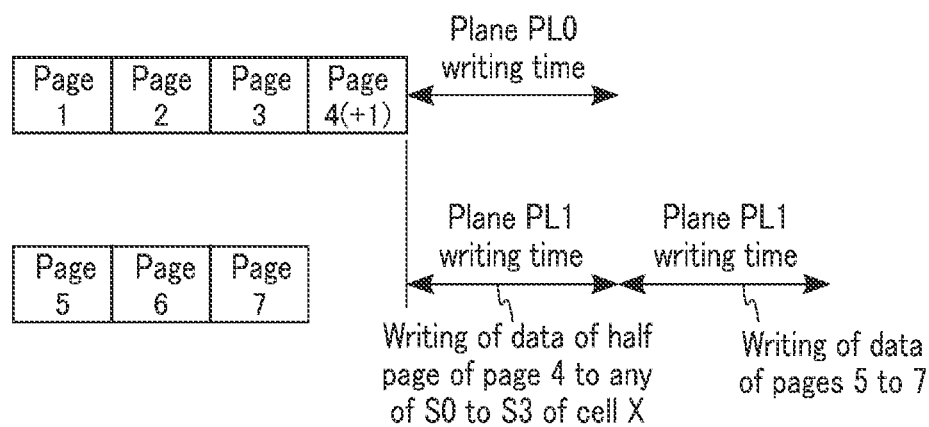
(b) In case of division by word line WL0 (combination A) and word line WL1 (combination B)
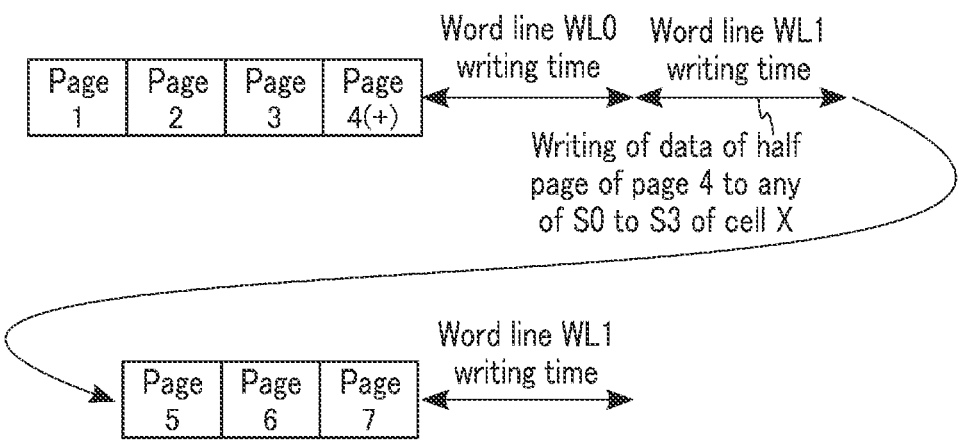
F I G. 44

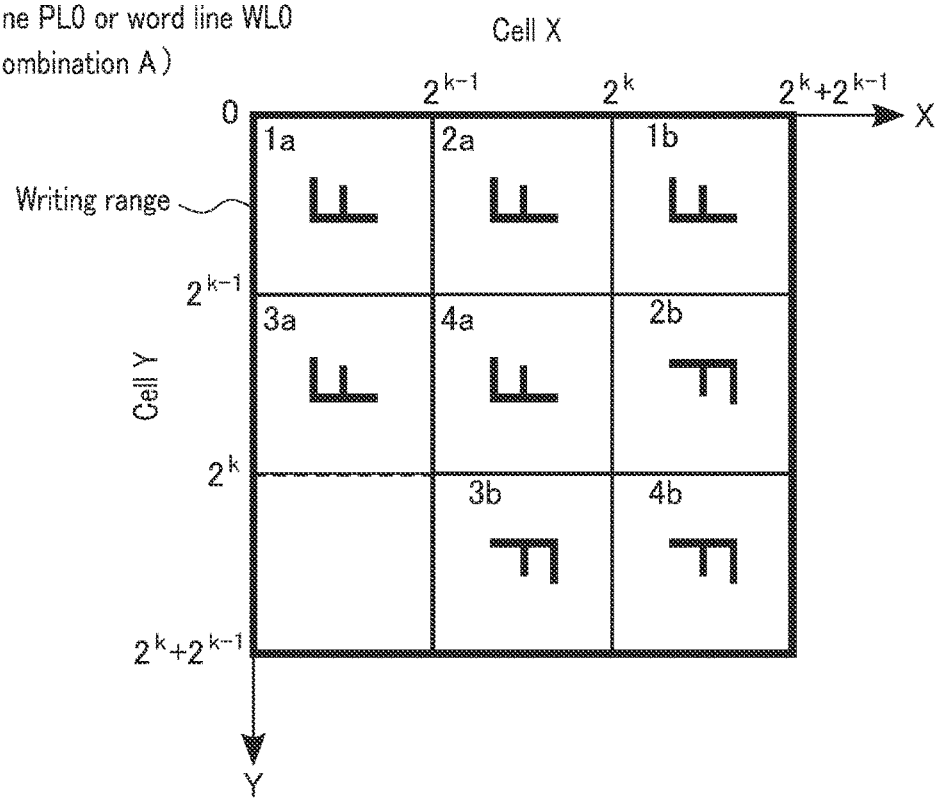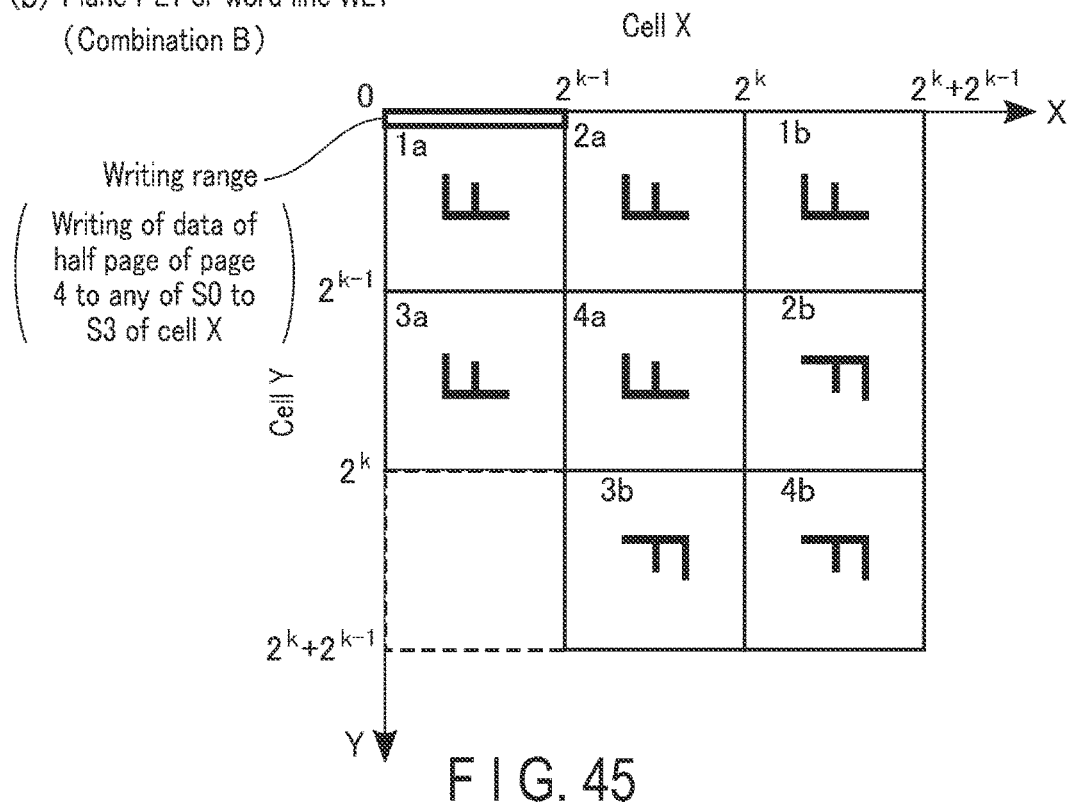
FIG. 45

< Pages 1 to 4 precedent writing >

| Plane PL0 (combination A) | Plane PL1 (combination B) |

Page 1: X0 Y0 X1 Y1 -- (16kB)
Page 2: X0 Y0 X1 Y1 -- (16kB)
Page 3: X0 Y0 X1 Y1 -- (16kB)
Page 4 (+0.5): X0 X1 -- (8kB) ← Precedent writing page Page 4 (+0.5): Y0 Y1 -- (8kB) ← Precedent writing page
Page 5: X0 Y0 X1 Y1 -- (16kB)
Page 6: X0 Y0 X1 Y1 -- (16kB)
Page 7: X0 Y0 X1 Y1 -- (16kB)

F I G. 46

⎧ <Example of post-writing of pages 1 to 3 in state where page + 1 has been written>
⎪
⎪ (a) In case of division by plane PL0 (combination A) and plane PL1 (combination B)
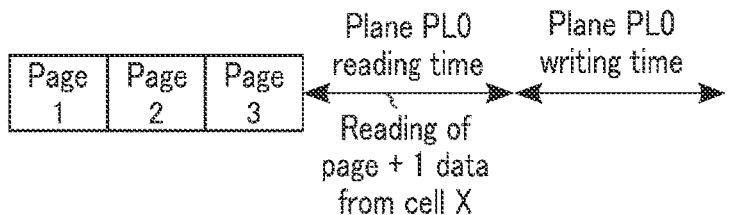
⎨
⎪
⎪ (b) In case of division by word line WL0 (combination A) and word line WL1 (combination B)
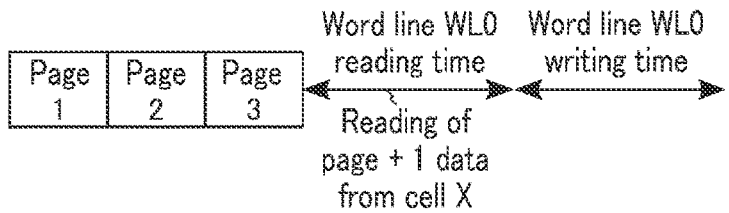
⎩
F I G. 47

< Example of post-writing of pages 1 to 3 in state where page +1 has been written >
(a) Plane PL0 or word line WL0
 (Combination A)
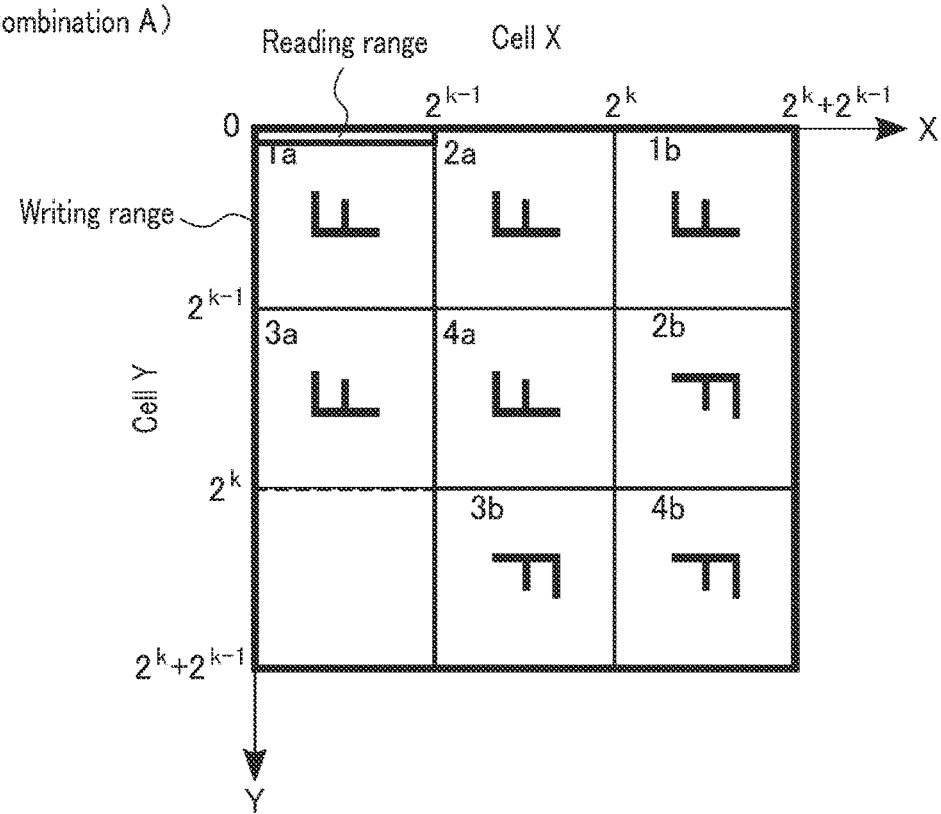
(b) Plane PL1 or word line WL1
 (Combination B)
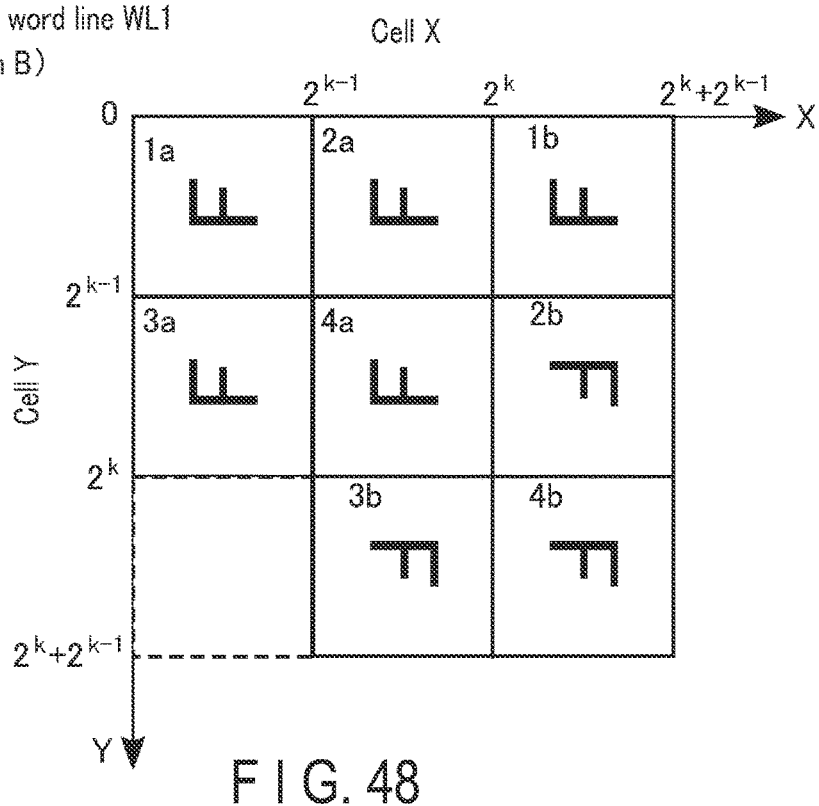
FIG. 48

< Example of post-writing of page + 1 in state where pages 1 to 3 have been written >
(a) In case of division by plane PL0 (combination A) and plane PL1 (combination B)
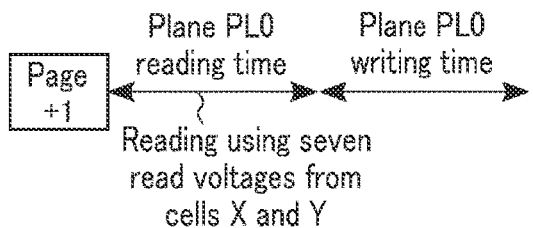
(b) In case of division by word line WL0 (combination A) and word line WL1 (combination B)
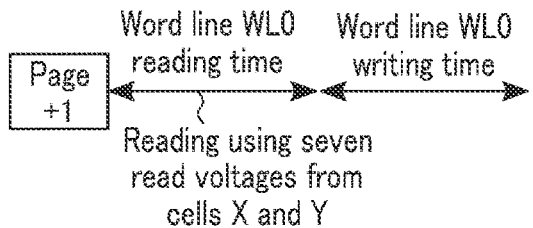
F I G. 50

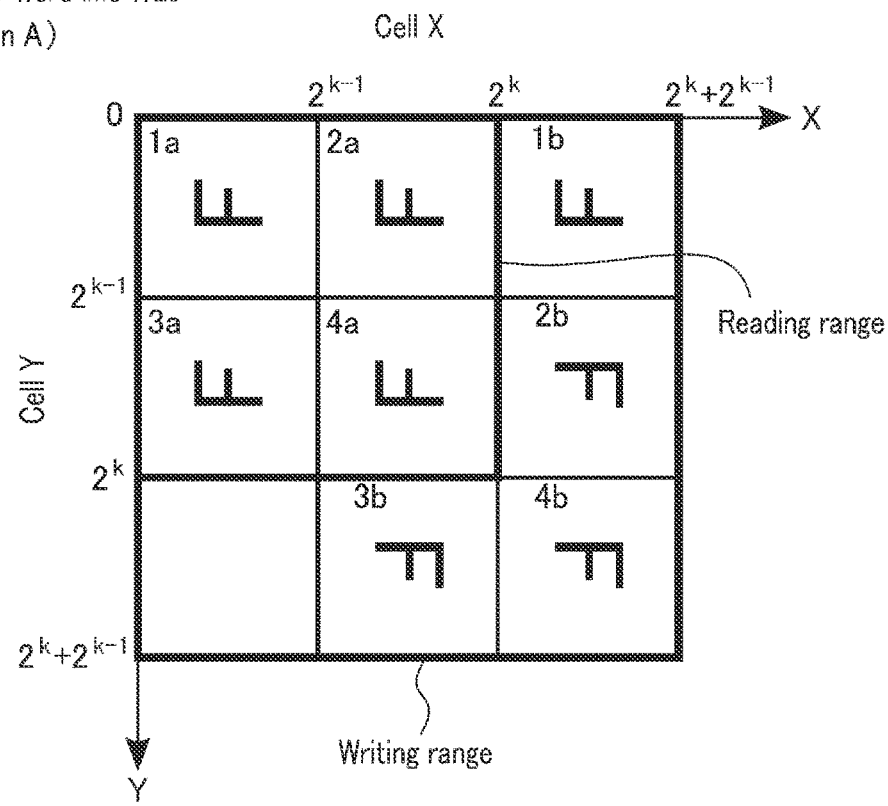
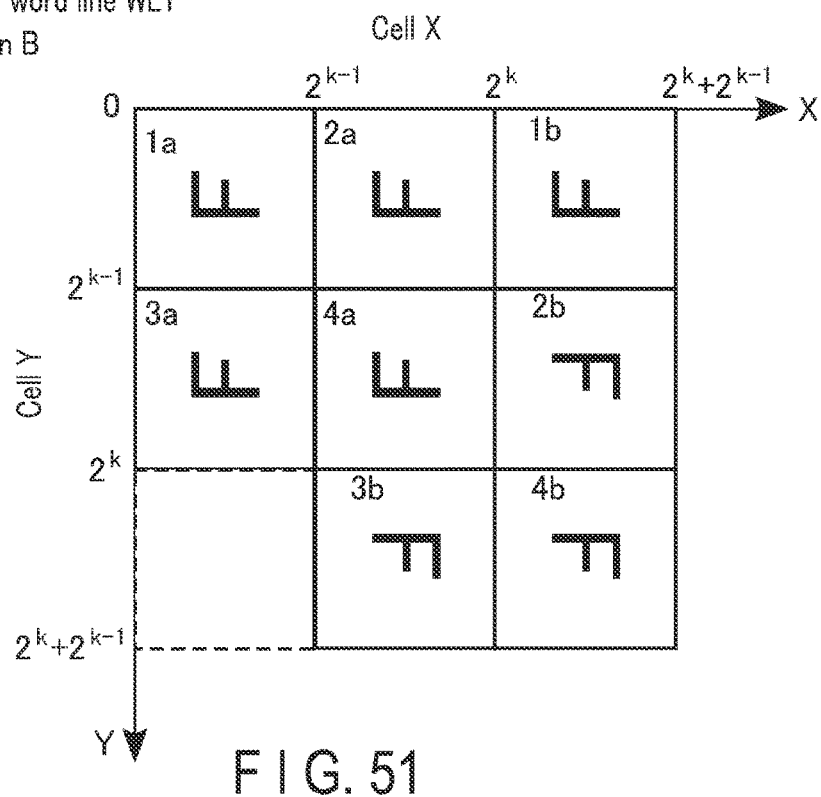
FIG. 51

Threshold coding (in case of D3.5)

$2^k$

| | S0 | S1 | S2 | S3 | S4 | S5 | S6 | S7 | S8 | S9 | S10 | S11 |
|---|---|---|---|---|---|---|---|---|---|---|---|---|
| ADL | 1 | 1 | 1 | 1 | 0 | 0 | 0 | 0 | 0 | 0 | 0 | 0 |
| BDL | 1 | 1 | 0 | 0 | 0 | 0 | 1 | 1 | 1 | 1 | 0 | 0 |
| CDL | 1 | 0 | 0 | 1 | 1 | 0 | 0 | 1 | 1 | 0 | 0 | 1 |
| ZDL (Additional DL) | 1 | 1 | 1 | 1 | 1 | 1 | 1 | 1 | 0 | 0 | 0 | 0 |

FIG. 53

Number of times of determination in read operation (in case of D1.5)

| | Page | Use read voltage | | Number of times of determination |
| --- | --- | --- | --- | --- |
| | | Memory cell X | Memory cell Y | |
| PL0 (Combination A) | Page 1 (16kB) | R1, R2 | R1, R2 | 2 |
| | Page 2 (8kB) | R2 | R2 | 1 |
| PL1 (Combination B) | Page 2 (8kB) | R2 | R2 | 1 |
| | Page 3 (16kB) | R1, R2 | R1, R2 | 2 |

Three in total (PL0), Three in total (PL1)

F I G. 56

Number of times of determination in read operation (in case of D2.5)

| | Page | Use read voltage | | Number of times of determination |
| --- | --- | --- | --- | --- |
| | | Memory cell X | Memory cell Y | |
| PL0 (Combination A) | Page 1 (16kB) | R2, R4 | R2, R4 | 2 |
| | Page 2 (16kB) | R1, R3, R5 | R1, R3, R5 | 3 |
| | Page 3 (8kB) | R4 | R4 | 1 |
| PL1 (Combination B) | Page 3 (8kB) | R4 | R4 | 1 |
| | Page 4 (16kB) | R1, R3, R5 | R1, R3, R5 | 3 |
| | Page 5 (16kB) | R2, R4 | R2, R4 | 2 |

Six in total (PL0), Six in total (PL1)

F I G. 57

Number of times of determination in read operation (in case of D3.5)

| | Page | Use read voltage | | Number of times of determination |
|---|---|---|---|---|
| | | Memory cell X | Memory cell Y | |
| PL0 (Combination A) | Page 1 (16kB) | R4, R8 | R4, R8 | 2 |
| | Page 2 (16kB) | R2, R6, R10 | R2, R6, R10 | 3 |
| | Page 3 (16kB) | R1, R3, R5, R7, R9, R11 | R1, R3, R5, R7, R9, R11 | 6 |
| | Page 4 (8kB) | R8 | R8 | 1 |
| PL1 (Combination B) | Page 4 (8kB) | R8 | R8 | 1 |
| | Page 5 (16kB) | R4, R8 | R4, R8 | 2 |
| | Page 6 (16kB) | R2, R6, R10 | R2, R6, R10 | 3 |
| | Page 7 (16kB) | R1, R3, R5, R7, R9, R11 | R1, R3, R5, R7, R9, R11 | 6 |

Twelve in total (PL0); Twelve in total (PL1)

F I G. 58

(a) Read voltage in read operation (in case of D3)

| | Page | Use read voltage | | Number of times of determination |
| --- | --- | --- | --- | --- |
| | | Memory cell X | Memory cell Y | |
| PL0 (Combination A) | Page 1 (16kB) | R4 | R4 | 1 |
| | Page 2 (16kB) | R2, R6 | R2, R6 | 2 |
| | Page 3 (16kB) | R1, R3, R5, R7 | R1, R3, R5, R7 | 4 |
| PL1 (Combination B) | Page 4 (16kB) | R4 | R4 | 1 |
| | Page 5 (16kB) | R2, R6 | R2, R6 | 2 |
| | Page 6 (16kB) | R1, R3, R5, R7 | R1, R3, R5, R7 | 4 |

Seven in total (PL0)
Seven in total (PL1)

⬇ After writing of page + 1 (page 4)

(b) Read voltage in read operation (in case of D3.5)

| | Page | Use read voltage | | Number of times of determination |
| --- | --- | --- | --- | --- |
| | | Memory cell X | Memory cell Y | |
| PL0 (Combination A) | Page 1 (16kB) | R4, \<R8\> | R4, \<R8\> | 2 |
| | Page 2 (16kB) | R2, R6, \<R10\> | R2, R6, \<R10\> | 3 |
| | Page 3 (16kB) | R1, R3, R5, R7, \<R9, R11\> | R1, R3, R5, R7, \<R9, R11\> | 6 |
| | Page 4 (8kB) | \<R8\> | \<R8\> | 1 |
| PL1 (Combination B) | Page 4 (8kB) | \<R8\> | \<R8\> | 1 |
| | Page 5 (16kB) | R4, \<R8\> | R4, \<R8\> | 2 |
| | Page 6 (16kB) | R2, R6, \<R10\> | R2, R6, \<R10\> | 3 |
| | Page 7 (16kB) | R1, R3, R5, R7, \<R9, R11\> | R1, R3, R5, R7, \<R9, R11\> | 6 |

Twelve in total (PL0)
Twelve in total (PL1)

FIG. 59

(a) Reading range in case of D3
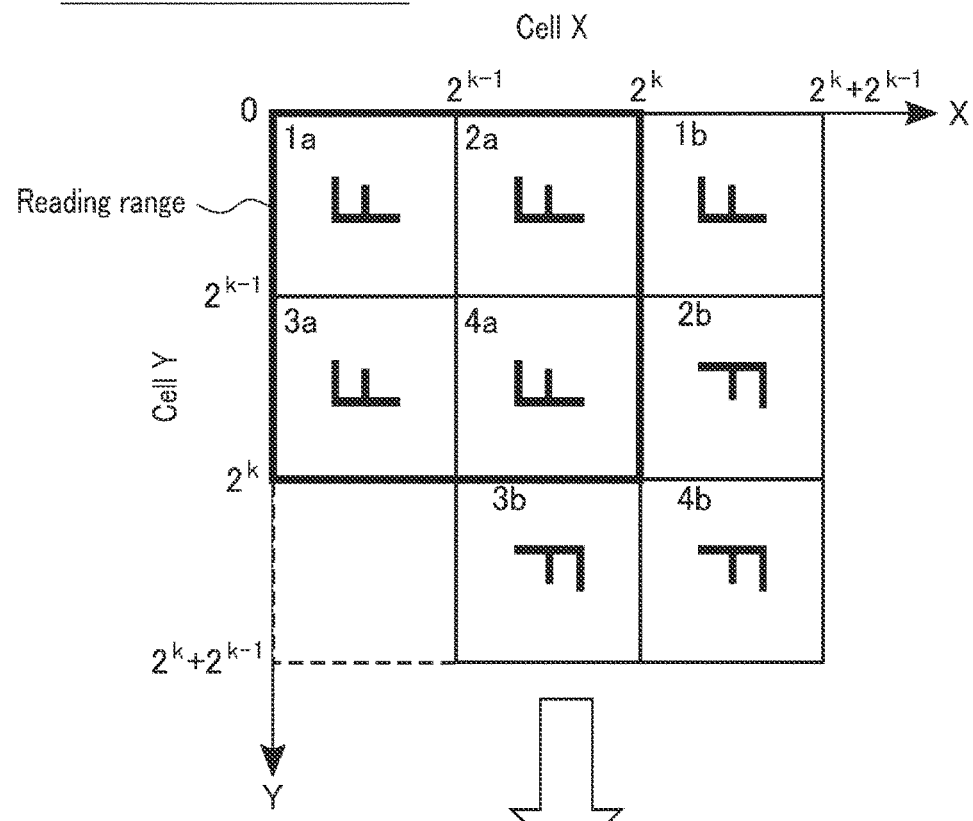
(b) Reading range in case of D3.5
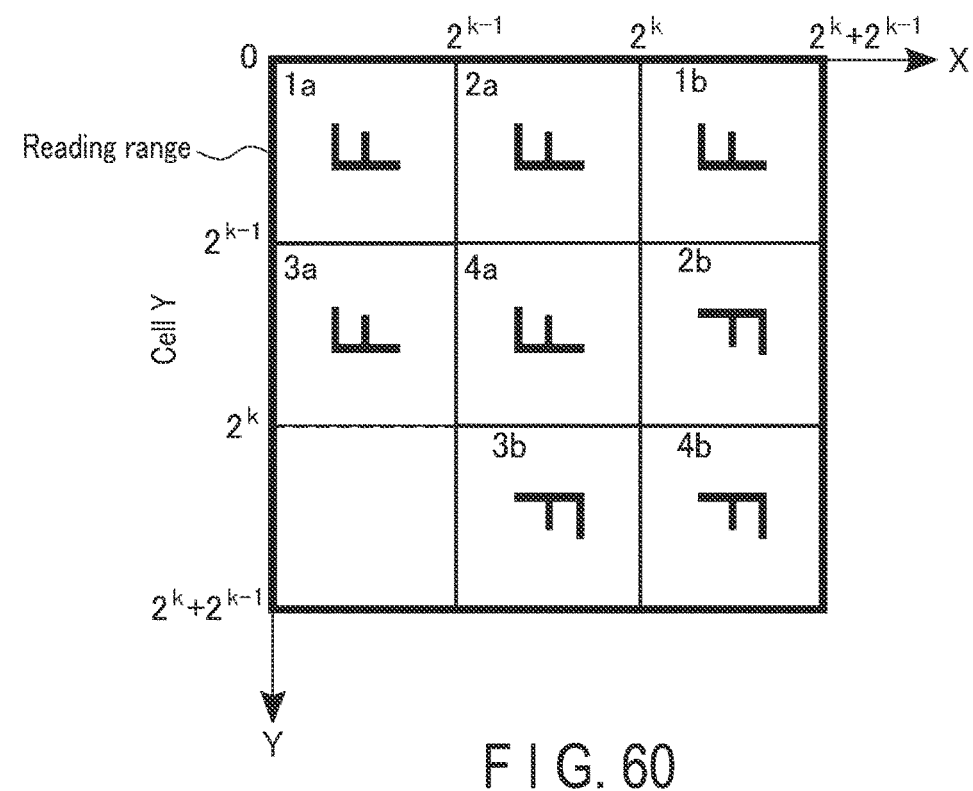
F I G. 60

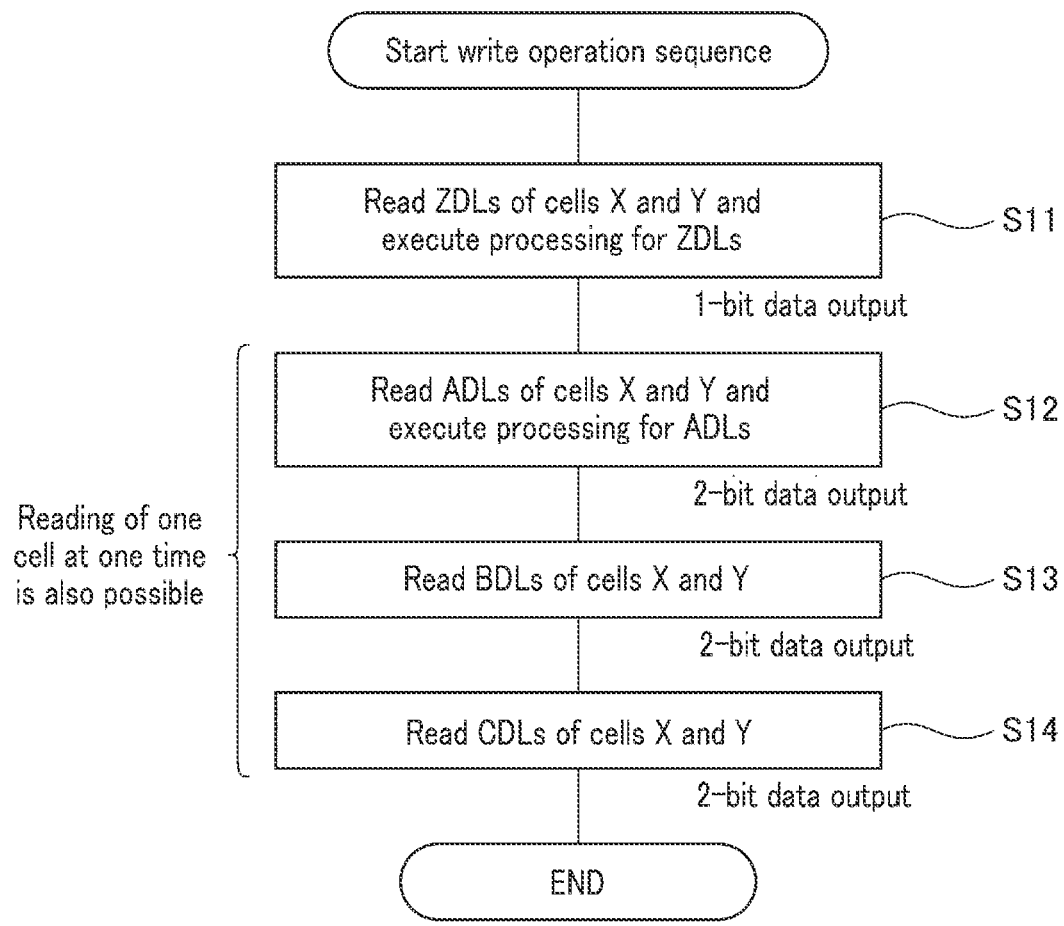
F I G. 64

SEMICONDUCTOR MEMORY DEVICE

CROSS-REFERENCE TO RELATED APPLICATIONS

This application is based upon and claims the benefit of priority from Japanese Patent Application No. 2023-005213, filed Jan. 17, 2023, the entire contents of which are incorporated herein by reference.

FIELD

Embodiments described herein relate generally to a semiconductor memory device.

BACKGROUND

NAND flash memory capable of storing data in a non-volatile manner is known.

BRIEF DESCRIPTION OF THE DRAWINGS

FIG. 7 is a diagram illustrating a first configuration example of the sense amplifier of the semiconductor memory device according to the first embodiment.

FIG. 16 is a diagram illustrating a configuration of page data in a case where pages are stored using a plurality of planes according to the first embodiment.

FIG. 19 is a diagram illustrating an example of threshold coding corresponding to facilitation of processing of "2k+1"-bit data according to the first embodiment.

FIG. 20 is a diagram illustrating page data in a write operation according to a second embodiment.

FIG. 23 is a diagram illustrating threshold tables in the write operation in a case where the memory cell corresponds to D1.5 according to the second embodiment.

FIG. 24 is a diagram illustrating threshold voltages of the memory cell in the write operation in a case where the memory cell corresponds to D1.5 according to the second embodiment.

FIG. 25 is a diagram illustrating a first example of the write operation in a case where the memory cell corresponds to D1.5 according to the second embodiment.

FIG. 26 is a diagram illustrating a second example of the write operation in a case where the memory cell corresponds to D1.5 according to the second embodiment.

FIG. 27 is a diagram illustrating a third example of the write operation in a case where the memory cell corresponds to D1.5 according to the second embodiment.

FIG. 28 is a diagram illustrating a fourth example of the write operation in a case where the memory cell corresponds to D1.5 according to the second embodiment.

FIG. 29 is a diagram illustrating a fifth example of the write operation in a case where the memory cell corresponds to D1.5 according to the second embodiment.

FIG. 30 is a diagram illustrating a sixth example of the write operation in a case where the memory cell corresponds to D1.5 according to the second embodiment.

FIG. 32 is a diagram illustrating threshold voltages of the memory cell in the write operation in a case where the memory cell corresponds to D2.5 according to the second embodiment.

FIG. 35 is a diagram illustrating threshold voltage ranges of a memory cell used in writing of page data according to the second embodiment.

FIG. 36 is threshold tables illustrating a correspondence between values of latch circuits and threshold voltages in writing of page data according to the second embodiment.

FIG. 38 is a diagram illustrating writing timings in continuous writing according to the second embodiment.

FIG. 39 is a diagram illustrating writing ranges in continuous writing according to the second embodiment.

FIG. 41 is a diagram illustrating writing timings in first writing according to the second embodiment.

FIG. 42 is a diagram illustrating a writing range in the first writing according to the second embodiment.

FIG. 43 is a diagram illustrating a writing page in the first writing according to the second embodiment.

FIG. 44 is a diagram illustrating writing timings in second writing according to the second embodiment.

FIG. 45 is a diagram illustrating writing ranges in the second writing according to the second embodiment.

FIG. 46 is a diagram illustrating writing pages in the second writing according to the second embodiment.

FIG. 47 is a diagram illustrating writing timings in a case where page "+1" data is written first and page data is written subsequently according to the second embodiment.

FIG. 48 is a diagram illustrating a writing range in a case where page "+1" data is written first and page data is written subsequently according to the second embodiment.

FIG. 50 is a diagram illustrating writing timings in a case where page data is written first and page "+1" data is written subsequently according to the second embodiment.

FIG. 51 is a diagram illustrating a writing range in a case where page data is written first and page "+1" data is written subsequently according to the second embodiment.

FIG. 53 is a diagram illustrating threshold coding in a case where the memory cell corresponds to D3.5 according to the second embodiment.

FIG. 56 is a table illustrating read voltages used for a read operation in a case where the memory cell corresponds to D1.5 according to the second embodiment.

FIG. 57 is a table illustrating read voltages used for a read operation in a case where the memory cell corresponds to D2.5 according to the second embodiment.

FIG. 58 is a table illustrating read voltages used for a read operation in a case where the memory cell corresponds to D3.5 according to the second embodiment.

FIG. 59 is tables illustrating read voltages used for read operations in a case where the memory cell corresponds to D3 and D3.5 according to the second embodiment.

FIG. 60 is a diagram illustrating reading ranges in the read operations in a case where the memory cell corresponds to D3 and D3.5 according to the second embodiment.

FIG. 64 is a flowchart illustrating an operation sequence in the read operation according to the second embodiment.

DETAILED DESCRIPTION

In general, according to one embodiment, a semiconductor memory device includes a memory cell array and a control circuit. The memory cell array includes two or more memory cells. The control circuit is configured to control a write operation of writing first data to the two or more memory cells and a read operation of reading the first data from the two or more memory cells. The control circuit sets cell states of the two or more memory cells based on second data included in the first data in the write operation. The control circuit converts read data into the first data based on the second data included in data read from the two or more memory cells in the read operation.

Hereinafter, embodiments will be described with reference to the drawings. In the following description, constituent elements having the same function and configuration are denoted by the same reference signs. In addition, the following embodiments exemplify a device and a method for embodying the technical idea of the embodiments, and do not limit the material, shape, structure, arrangement, and the like of the components to those described below.

The functional block can be implemented as any one of hardware and computer software or a combination of both. It is not essential that the functional blocks are distinguished as in the following examples. For example, some functions may be executed by a functional block different from the exemplary functional block. Further, the exemplary functional block may be divided into finer functional sub-blocks.

1. First Embodiment

Figure 1:
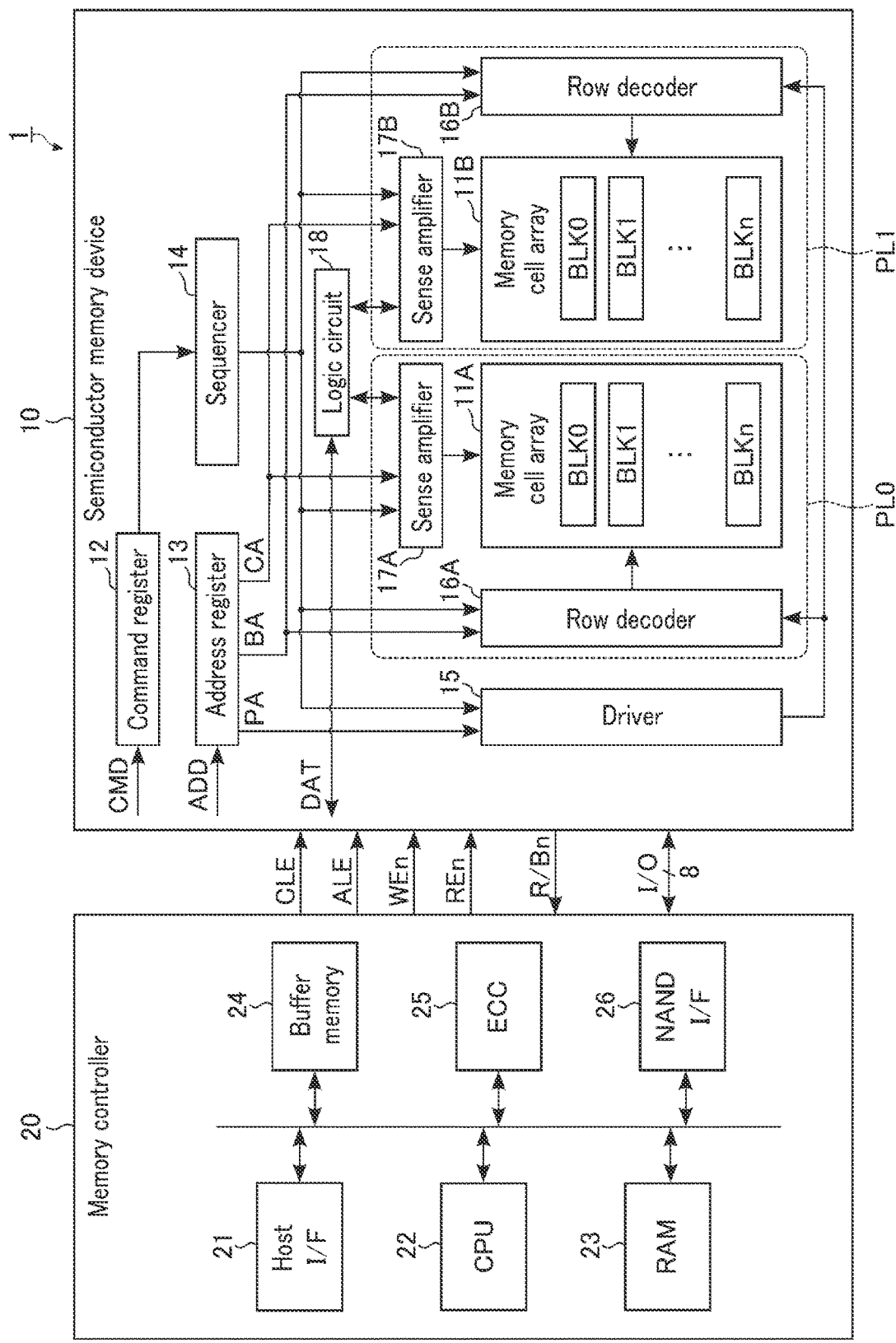
FIG. 1 is a block diagram illustrating a configuration of a memory system including a semiconductor memory device according to a first embodiment.

A semiconductor memory device of a first embodiment will be described. FIG. 1 is a block diagram illustrating a configuration of a memory system 1 including the semiconductor memory device of the first embodiment.

The memory system 1 includes, for example, a semiconductor memory device 10 and a memory controller 20. An example of the semiconductor memory device 10 is NAND flash memory in which a memory cell transistor can store data in a nonvolatile manner. Hereinafter, an example of a configuration of each of the semiconductor memory device 10 and the memory controller 20 will be sequentially described.

1.1 Configuration of Semiconductor Memory Device 10

First, the configuration of the semiconductor memory device 10 will be described.

As illustrated in FIG. 1, the semiconductor memory device 10 includes memory cell arrays 11A and 11B, a command register 12, an address register 13, a sequencer 14, a driver 15, row decoders 16A and 16B, sense amplifiers 17A and 17B, and a logic circuit 18.

Figure 2:
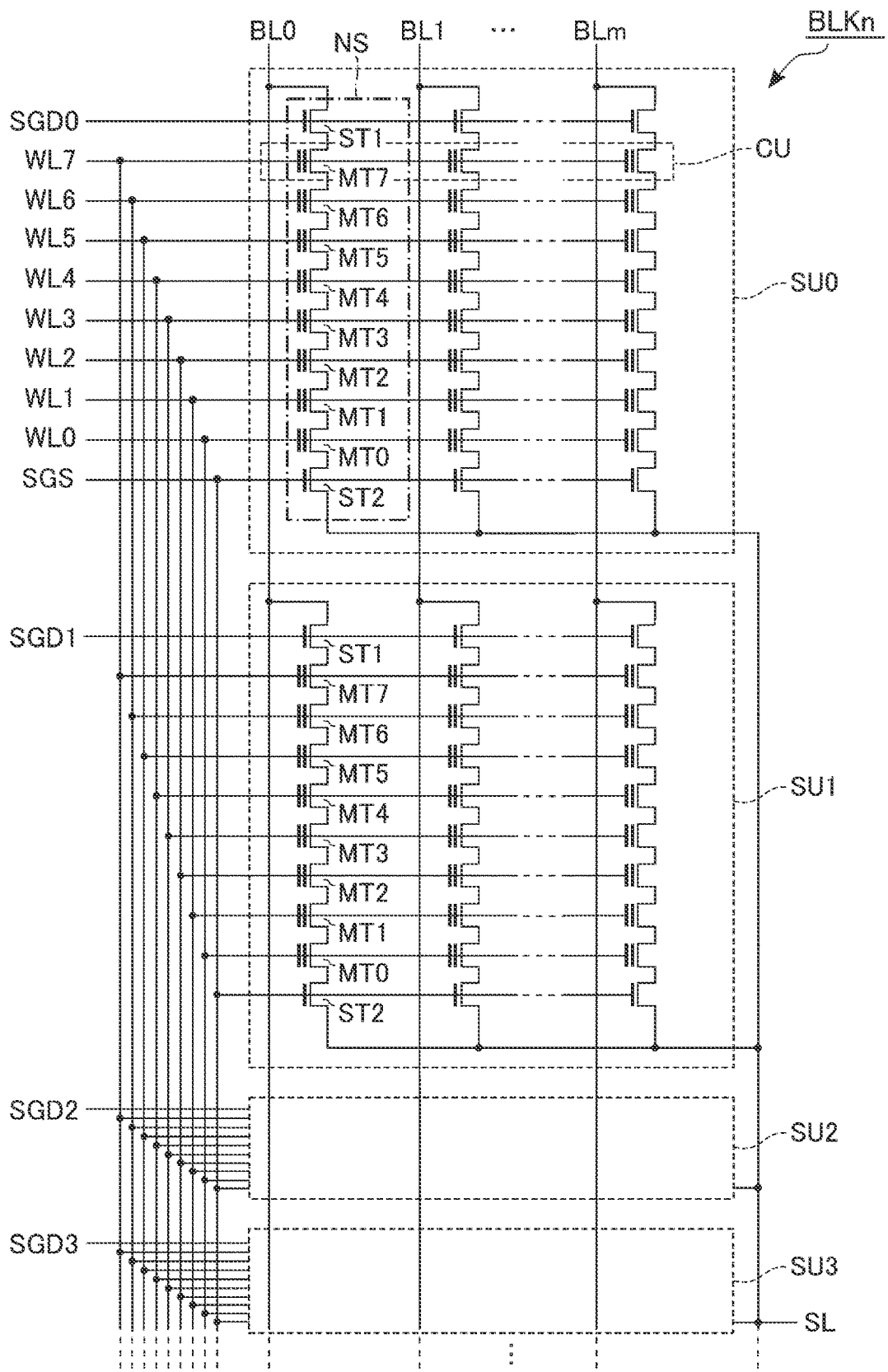
FIG. 2 is a circuit diagram of a block of a memory cell array according to the first embodiment.

Each of the memory cell arrays 11A and 11B includes one or a plurality of blocks BLK0, BLK1, BLK2, ..., and BLKn (n is an integer of 0 or more). Each of the plurality of blocks BLK0 to BLKn includes a plurality of memory cell transistors (hereinafter, also referred to as a memory cell) associated with a row and a column. The memory cell transistor is an electrically erasable programmable non-volatile memory cell. As illustrated in FIG. 2, the block BLKn included in each of the memory cell arrays 11A and 11B includes a plurality of word lines WL (for example, WL0 to WL7), a plurality of bit lines BL0 to BLm (m is an integer of 0 or more), and a source line SL for applying a voltage to the memory cell transistor. A detailed configuration of the block BLKn will be described below.

The command register 12 stores a command CMD received by the semiconductor memory device 10 from the memory controller 20. The command CMD includes, for example, a writing command instructing the sequencer 14 to perform a write operation, a reading command instructing a read operation, and an erase command instructing an erase operation.

The address register 13 stores an address ADD received by the semiconductor memory device 10 from the memory controller 20. The address ADD includes a row address including a block address BA and a page address PA, and a column address CA. The block address BA designates, for example, a block BLKn, which is an operation target. The page address PA further designates a word line WL, which is an operation target, in the designated block. The column address CA designates, for example, a bit line BLm, which is an operation target.

The sequencer 14 controls the entire operation of the semiconductor memory device 10 based on the command CMD stored in the command register 12. For example, the sequencer 14 controls the driver 15, the row decoders 16A and 16B, and the sense amplifiers 17A and 17B based on the writing command stored in the command register 12, and writes data DAT to the plurality of memory cell transistors designated by the address ADD. In addition, the sequencer 14 controls the driver 15, the row decoders 16A and 16B, and the sense amplifiers 17A and 17B based on the reading command stored in the command register 12, and reads data DAT from the plurality of memory cell transistors designated by the address ADD.

The driver 15 generates a desired voltage based on the control of the sequencer 14. For example, the driver 15 applies a voltage to be applied to the selected word line of the memory cell array 11A and a voltage to be applied to the selected word line of the memory cell array 11B to corresponding signal lines based on the page address PA stored in the address register 13.

For example, the row decoders 16A and 16B select blocks BLKn in the memory cell arrays 11A and 11B based on the block address BA stored in the address register 13, respectively. Then, the row decoders 16A and 16B transfer the voltages generated by the driver 15 to the wirings provided in the blocks BLKn selected in the memory cell arrays 11A and 11B, respectively, for example.

The sense amplifiers 17A and 17B apply desired voltages to the bit lines corresponding to the memory cell arrays 11A and 11B according to the writing data DAT received from the memory controller 20, respectively, for example. In addition, each of the sense amplifiers 17A and 17B determines data stored in the memory cell transistor based on the voltage of the corresponding bit line, and transmits the determined read data DAT to the memory controller 20.

The logic circuit 18 is connected, for example, between an input/output circuit (not illustrated) and the sense amplifiers 17A and 17B of the semiconductor memory device 10. Note that the logic circuit 18 may be provided in each of the sense amplifiers 17A and 17B. For example, at the time of the read operation, the logic circuit 18 determines the read data based on the reading result of the sense amplifier 17A and the reading result of the sense amplifier 17B. In addition, the logic circuit 18 can also transfer received data between the input/output circuit and the sense amplifiers 17A and 17B of the semiconductor memory device 10, for example, at the time of the write operation or the read operation.

Hereinafter, a set of the memory cell array, the row decoder, and the sense amplifier is referred to as a plane. The semiconductor memory device 10 of the embodiment includes planes PL0 and PL1. The plane PL0 includes the memory cell array 11A, the row decoder 16A, and the sense amplifier 17A. The plane PL1 includes the memory cell array 11B, the row decoder 16B, and the sense amplifier 17B.

The planes PL0 and PL1 may each be independently controlled by the sequencer 14. In the semiconductor memory device 10, data is stored by a set of blocks BLKn associated between the plane PL0 and the plane PL1. For example, the blocks BLK0 to BLKn in the plane PL0 are associated with the blocks BLK0 to BLKn in the plane PL1, respectively. The association of the blocks BLKn between the planes PL0 and PL1 may be designed into any combination.

In addition, in the semiconductor memory device 10, data is stored by a set of cell units associated among a plurality of cell units in the block BLKn of the plane PL0 (or PL1). For example, in a case where the memory cell transistor connected to the word line WL0 and the memory cell transistor connected to the word line WL1 in the block BLKn of the plane PL0 are arranged, the memory cell transistor connected to the word line WL0 and the memory cell transistor connected to the word line WL1 are associated with each other. The association of two cell units of the plurality of cell units in the block BLKn may be designed into any combination. Note that the cell unit will be described below.

Next, a configuration of the memory controller 20 connected to the semiconductor memory device 10 will be described.

The memory controller 20 instructs the semiconductor memory device 10 to read, write, erase, and the like data in response to an instruction from an external host device.

As illustrated in FIG. 1, the memory controller 20 includes, for example, a host interface circuit 21, a central processing unit (CPU) 22, random access memory (RAM) 23, buffer memory 24, an error correction code (ECC) circuit 25, and a NAND interface circuit 26.

The host interface circuit 21 is connected to the external host device and controls transfer of data, commands, and addresses between the memory controller 20 and the host device. The host interface circuit 21 supports communication interface standards such as Serial Advanced Technology Attachment (SATA), Serial Attached SCSI (SAS), and PCI Express (PCIe) (registered trademark).

The CPU 22 controls the entire operation of the memory controller 20. For example, the CPU 22 issues a writing command in response to a writing instruction received from the host device. In addition, the CPU 22 executes various processing (for example, wear leveling or the like) for managing the memory space of the semiconductor memory device 10.

The RAM 23 can be used as a work area of the CPU 22. For example, the RAM 23 stores firmware for managing the semiconductor memory device 10, various management tables, count results during various operations, and the like. The RAM 23 includes, for example, volatile memory such as dynamic random access memory (DRAM).

The buffer memory 24 temporarily stores, for example, read data received by the memory controller 20 from the semiconductor memory device 10, writing data received from the host device, and the like.

The ECC circuit 25 executes processing regarding error correction. Specifically, at the time of the write operation, the ECC circuit 25 generates a parity based on the writing data received from the host device and gives the generated parity to the writing data. At the time of the read operation, the ECC circuit 25 generates a syndrome based on the read data received from the semiconductor memory device 10, and detects and corrects an error in the read data based on the generated syndrome.

The NAND interface circuit 26 controls transfer of data, commands, addresses, and the like between the memory controller 20 and the semiconductor memory device 10. The NAND interface circuit 26 supports, for example, an interface standard regarding NAND flash memory.

Specifically, for communication between the semiconductor memory device 10 and the memory controller 20, for example, a command latch enable signal CLE, an address latch enable signal ALE, a write enable signal WEn, a read enable signal REn, a ready/busy signal R/Bn, and an input/output signal I/O are used. The symbol "n" appended to the signal names indicates that the signal is active low.

The command latch enable signal CLE is a signal indicating that the input/output signal I/O received by the semiconductor memory device 10 is the command CMD. The address latch enable signal ALE is a signal indicating that a signal I/O received by the semiconductor memory device 10 is the address ADD. The write enable signal WEn is a signal that instructs the semiconductor memory device 10 to input the input/output signal I/O. The read enable signal REn is a signal that instructs the semiconductor memory device 10 to output the input/output signal I/O.

The ready/busy signal R/Bn is a signal for notifying the memory controller 20 of whether the semiconductor memory device 10 is in a ready state of accepting an instruction from the memory controller 20 or in a busy state of not accepting an instruction. The input/output signal I/O is, for example, an 8-bit width signal, and may include the command CMD, the address ADD, the data DAT, and the like.

The semiconductor memory device 10 and the memory controller 20 described above may constitute a semiconductor device based on a combination thereof. Examples of such a semiconductor device include a memory card such as an SD™ card, a solid state drive (SSD), and the like.

1.1.1 Configuration of Memory Cell Array

A circuit configuration and a structure of the memory cell arrays 11A and 11B included in the semiconductor memory device 10 of the present embodiment will be described.

1.1.1.1 Circuit Configuration of Memory Cell Array

First, a circuit configuration of the memory cell arrays 11A and 11B in the semiconductor memory device 10 will be described. The memory cell array 11A (or 11B) includes the plurality of blocks BLK0 to BLKn as described above. Hereinafter, a circuit configuration of the block BLKn will be described.

FIG. 2 is a circuit diagram of a block BLKn in the memory cell array 11A (or 11B) according to the first embodiment. The block BLKn includes, for example, a plurality of string units SU0, SU1, SU2, and SU3. Hereinafter, the string unit SU indicates each of the string units SU0 to SU3. The string unit SU includes a plurality of NAND strings (or memory strings) NS.

Here, for ease of description, an example in which the NAND string NS includes, for example, eight memory cell transistors MT0, MT1, MT2, . . . , and MT7 and two select transistors ST1 and ST2 will be described. Hereinafter, the memory cell transistor MT indicates each of the memory cell transistors MT0 to MT7.

The memory cell transistor MT includes a control gate and a charge storage layer, and stores data in a nonvolatile manner. The memory cell transistors MT0 to MT7 are connected in series between the source of the select transistor ST1 and the drain of the select transistor ST2. The memory cell transistor MT can store 1-bit data or 2-bit or more data.

The gates of the plurality of select transistors ST1 included in the string unit SU0 are connected to a select gate line SGD0. Similarly, the gates of the select transistors ST1 of the string units SU1 to SU3 are connected to select gate lines SGD1 to SGD3, respectively. Each of the select gate lines SGD0 to SGD3 is independently controlled by the row decoder 16A (or 16B).

The gates of the plurality of select transistors ST2 included in the string unit SU0 are connected to a select gate line SGS. Similarly, the gates of the select transistors ST2 of the string units SU1 to SU3 are connected to the select gate line SGS. Note that individual select gate lines SGS may be connected to the gates of the select transistors ST2 of the string units SU0 to SU3, respectively. The select transistors ST1 and ST2 are used to select the string unit SU in various operations.

The control gates of the memory cell transistors MT0 to MT7 included in the block BLKn are connected to the word lines WL0 to WL7, respectively. Each of the word lines WL0 to WL7 is independently controlled by the row decoder 16A (or 16B).

Each of the bit lines BL0 to BLm (m is an integer of 0 or more) is connected to the plurality of blocks BLK0 to BLKn, and is connected to a NAND string NS in the string unit SU included in the block BLKn. That is, each of the bit lines BL0 to BLm is connected to the drains of the select transistors ST1 of the plurality of NAND strings NS in the same column among the NAND strings NS arranged in a matrix in the block BLKn. In addition, the source line SL is connected to the plurality of blocks BLK0 to BLKn. That is, the source line SL is connected to the sources of the plurality of select transistors ST2 included in the block BLKn.

In short, the string unit SU includes a plurality of NAND strings NS connected to different bit lines BL and connected to the same select gate line SGD. In addition, the block BLKn includes a plurality of string units SU sharing the word lines WL. Further, the memory cell array 11A (or 11B) includes the plurality of blocks BLK0 to BLKn sharing the bit lines BL.

The plurality of memory cell transistors MT sharing the word lines WL in a string unit SU is referred to as a cell unit CU. The write operation and the read operation with respect to the cell unit CU are performed in units of pages. In other words, the read operation and the write operation are collectively performed for the plurality of memory cell transistors MT connected to a word line WL disposed in a string unit SU.

In the semiconductor memory device 10, for example, page "2k+1" data can be stored by a set of a cell unit CU included in the plane PL0 and a cell unit CU included in the plane PL1.

The page "2k+1" data stored by the set of cell units CU of the planes PL0 and PL1 includes page 1 data, page 2 data, and page 3 data in a case where k is 1. In addition, in a case where k is 2, the page "2k+1" data includes page 1 data, page 2 data, page 3 data, page 4 data, and page 5 data. Further, in a case where k is 3, the page "2k+1" data includes page 1 data, page 2 data, page 3 data, page 4 data, page 5 data, page 6 data, and page 7 data.

In addition, in the semiconductor memory device 10, for example, the page "2k+1" data can be stored by a set of the memory cell transistor MT connected to a first word line and the memory cell transistor MT connected to a second word line in the plane PL0 (or PL1).

The page "2k+1" data stored by the set of two cell units CU of the plane PL0 (or PL1) includes page 1 data, page 2 data, and page 3 data in a case where k is 1. In addition, in a case where k is 2, the page "2k+1" data includes page 1 data, page 2 data, page 3 data, page 4 data, and page 5 data. Further, in a case where k is 3, the page "2k+1" data includes page 1 data, page 2 data, page 3 data, page 4 data, page 5 data, page 6 data, and page 7 data.

1.1.1.2 Structure of Memory Cell Array

An example of a structure of the memory cell arrays 11A and 11B included in the semiconductor memory device 10 of the embodiment will be described. Hereinafter, as a memory cell array of the semiconductor memory device 10, three-dimensionally stacked NAND flash memory in which memory cell transistors are three-dimensionally stacked above a semiconductor substrate will be described as an example.

In the drawings referred to below, the X direction corresponds to the extending direction of the word line WL, the Y direction corresponds to the extending direction of the bit line BL, and the Z direction corresponds to the vertical direction with respect to the surface of the semiconductor substrate on which the semiconductor memory device 10 is formed. The hatching added to the plan diagram is not necessarily associated with a material or a characteristic of the constituent elements to which the hatching is added. In the present specification, constituent elements such as wirings, contacts, and insulating layers are omitted as appropriate for easy viewing of the drawings.

Figure 3:
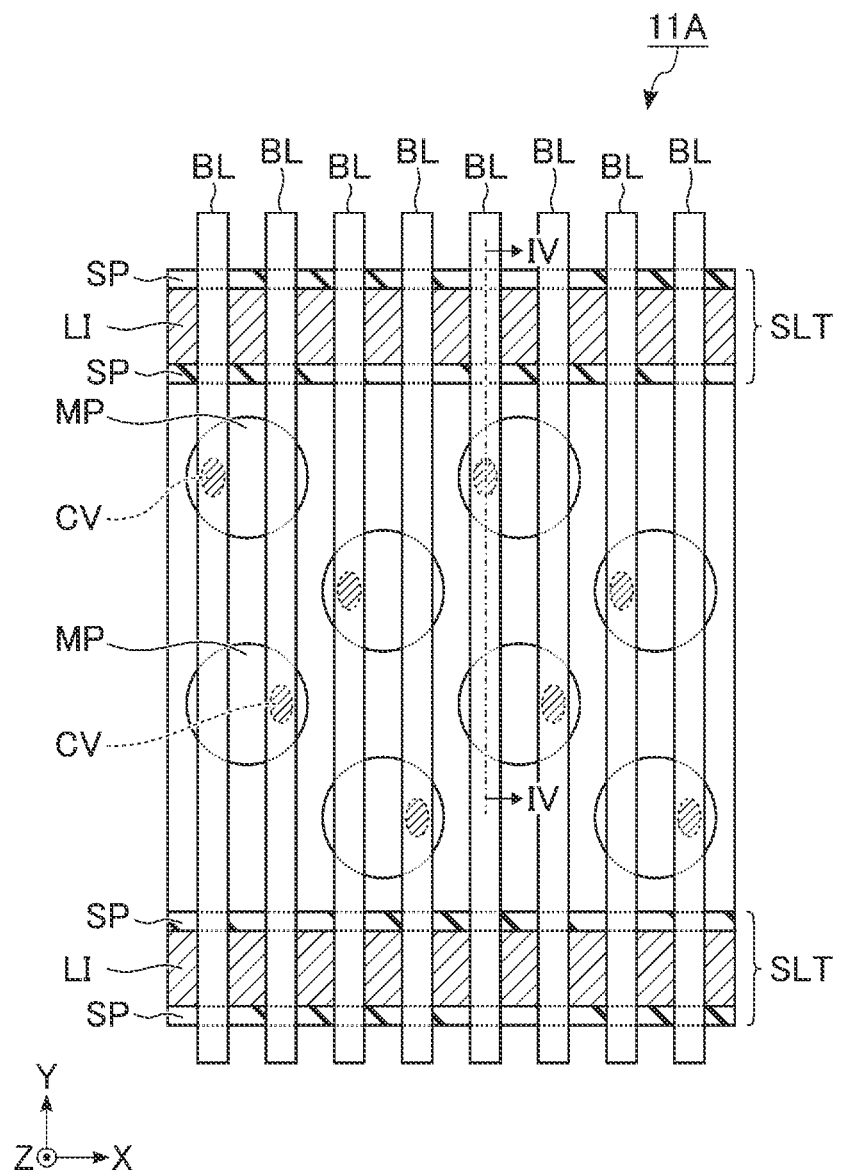
FIG. 3 is a diagram illustrating a plane layout of the memory cell array according to the first embodiment.

First, a plane layout of the memory cell array 11A (or 11B) will be described. FIG. 3 is a diagram illustrating a part of the plane layout of the memory cell array 11A (or 11B) of the first embodiment.

The memory cell array 11A includes, for example, a plurality of slits SLT, a plurality of memory pillars MP, a plurality of contacts CV, and a plurality of bit lines BL.

The plurality of slits SLT is arranged in the Y direction. At least a part of each of the slits SLT extends along the X direction. In addition, the slits SLT are divide the conductive layers provided in the same wiring layer and adjacent via the slits SLT. Specifically, the slits SLT divide a plurality of wiring layers corresponding to the word lines WL0 to WL7 and the select gate lines SGD and SGS, for example.

In addition, each slit SLT includes, for example, spacers SP and a contact LI. In each slit SLT, at least a part of the contact LI extends in the X direction. The spacers SP are provided on the side surfaces of the contact LI. The contact LI and the plurality of wiring layers adjacent to the slits SLT are separated and insulated by the spacers SP. The contact LI is used as the source line SL. The contact LI may be a semiconductor or a metal.

Each of the memory pillars MP functions as, for example, a NAND string NS. For example, the plurality of memory pillars MP is arranged in four rows in a staggered manner in a region between two adjacent slits SLT. The present embodiment is not limited thereto, and the number and arrangement of the memory pillars MP between two adjacent slits SLT can be appropriately changed. At least a bit line BL is arranged to overlap each memory pillar MP. The plurality of bit lines BL is arranged in the X direction. At least a part of each of the bit lines BL extends along the Y direction. A bit line BL among the plurality of bit lines BL overlapping the memory pillar MP is electrically connected to the memory pillar MP via a contact CV.

The plane layout of the memory cell array 11A described above is repeatedly arranged in the Y direction. Then, each of the regions partitioned by the slits SLT corresponds to a string unit SU. That is, a set of string units SU0 to SU3 each extending in the X direction is arranged in the Y direction. For example, a contact CV is connected to a bit line BL in each space partitioned by the slits SLT.

Figure 4:
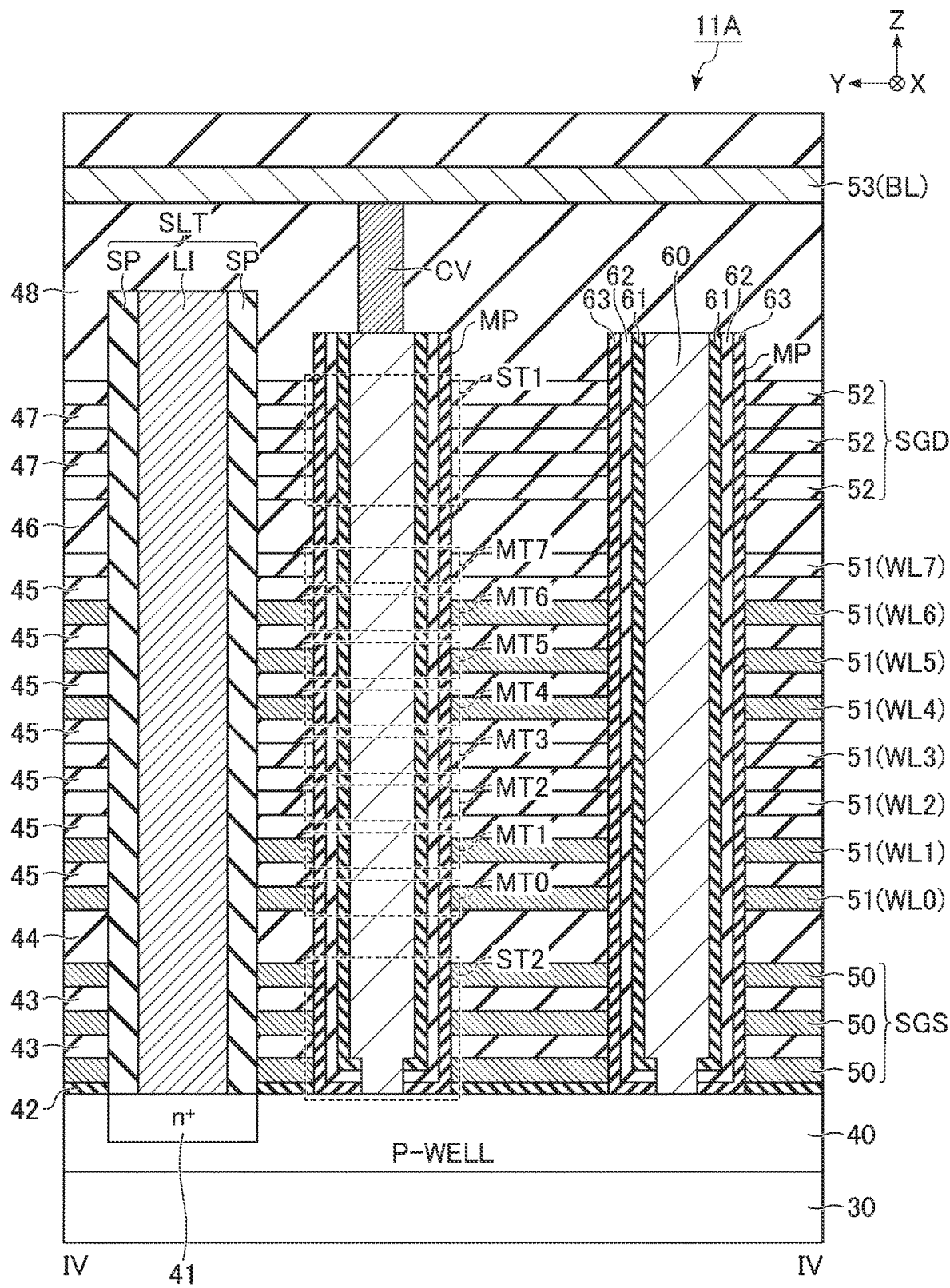
FIG. 4 is a diagram illustrating a cross-sectional structure of the memory cell array according to the first embodiment.

Next, a cross-sectional structure of the memory cell array 11A (or 11B) will be described. FIG. 4 is a diagram illustrating an example of a cross-sectional structure of the memory cell array 11A (or 11B), and illustrates a cross-section taken along line IV-IV in FIG. 3.

The memory cell array 11A includes, for example, a semiconductor substrate 30, a p-type well region 40, insulating layers 42 to 48, and conductive layers 50 to 53.

The p-type well region 40 is provided in the vicinity of the surface of the semiconductor substrate 30. The p-type well region 40 includes an n-type semiconductor region 41. The n-type semiconductor region 41 is a diffusion region containing an n-type impurity-provided in the vicinity of the surface of the p-type well region 40. The n-type semiconductor region 41 is doped with, for example, phosphorus (P).

The insulating layer 42 is provided on the p-type well region 40. On the insulating layer 42, the conductive layer 50 and the insulating layer 43 are alternately stacked. The conductive layer 50 is formed in, for example, a plate shape extending along the XY plane. The plurality of stacked conductive layers 50 is used as a select gate line SGS. The conductive layer 50 contains, for example, tungsten (W).

The insulating layer 44 is provided on the uppermost conductive layer 50. On the insulating layer 44, the conductive layer 51 and the insulating layer 45 are alternately stacked. The conductive layer 51 is formed in, for example, a plate shape extending along the XY plane. The plurality of stacked conductive layers 51 is used as the word lines WL0 to WL7, respectively, in order from the p-type well region 40 side. The conductive layer 51 contains, for example, tungsten (W).

The insulating layer 46 is provided on the uppermost conductive layer 51. On the insulating layer 46, the conductive layer 52 and the insulating layer 47 are alternately stacked. The conductive layer 52 is formed in, for example, a plate shape extending along the XY plane. The plurality of stacked conductive layers 52 is used as a select gate line SGD. The conductive layer 52 contains, for example, tungsten (W).

The insulating layer 48 is provided on the uppermost conductive layer 52. The conductive layer 53 is provided on the insulating layer 48. The conductive layer 53 is formed in, for example, a line shape extending in the Y direction. The conductive layer 53 is used as the bit line BL. That is, in a region, which is not illustrated, the plurality of conductive layers 53 is arranged along the X direction. The conductive layer 53 contains, for example, copper (Cu).

Each of the memory pillars MP is provided to extend along the Z direction. Each memory pillar MP penetrates the insulating layers 42 to 47 and the conductive layers 50 to 52. The bottom of the memory pillar MP is in contact with the p-type well region 40. In addition, each of the memory pillars MP includes, for example, a semiconductor layer 60, a tunnel insulating film 61, an insulating film (alternatively, charge storage layer) 62, and a block insulating film 63. The semiconductor layer 60 extends along the Z direction. For example, the upper end of the semiconductor layer 60 is provided above the uppermost conductive layer 52, and the lower end of the semiconductor layer 60 is in contact with the p-type well region 40. The tunnel insulating film 61 covers the side surface of the semiconductor layer 60. The insulating film 62 covers the side surface of the tunnel insulating film 61. The block insulating film 63 covers the side surface of the insulating film 62. Each of the tunnel insulating film 61 and the block insulating film 63 contains, for example, silicon oxide ($SiO_2$). The insulating film 62 contains, for example, silicon nitride (SiN).

A contact CV having a columnar shape is provided on the semiconductor layer 60 in the memory pillar MP. In the illustrated region, the contact CV corresponding to a memory pillar MP of the two memory pillars MP is illustrated. The contact CV is connected in a region, which is not illustrated, to the memory pillar MP to which the contact CV is not connected in the region. A conductive layer 53 (a bit line BL) is in contact with the contact CV. As described above, a contact CV is connected to a conductive layer 53 in each space partitioned by the slits SLT. That is, a memory pillar MP provided between two adjacent slits SLT is electrically connected to each of the conductive layers 53.

The slit SLT is formed in, for example, a shape extending along the XZ plane, and divides the insulating layers 42 to 47 and the conductive layers 50 to 52. The upper end of the slit SLT is included in the level at which the insulating layer 48 is provided. The lower end of the slit SLT is in contact with the n-type semiconductor region 41 in the p-type well region 40. Specifically, the contact LI in the slit SLT is formed in a plate shape extending along the XZ plane. The bottom of the contact LI is electrically connected to the n-type semiconductor region 41. The contact LI and each of the conductive layers 50 to 52 are separated from each other by the spacers SP.

Note that the structure of the memory cell array 11A (or 11B) included in the semiconductor memory device 10 of the first embodiment is not limited to the structure described above. It is sufficient if the slit SLT is provided at least in a boundary portion of the block BLK. In a case where the plurality of string units SU is arranged between the adjacent slits SLT, at least a slit that divides the select gate line SGD is provided between the adjacent slits SLT.

1.1.2 Configuration of Row Decoder

Next, a circuit configuration of the row decoders 16A and 16B in the semiconductor memory device 10 of the first embodiment will be described. The row decoders 16A and 16B are provided corresponding to the memory cell arrays 11A and 11B, respectively.

Figure 5:
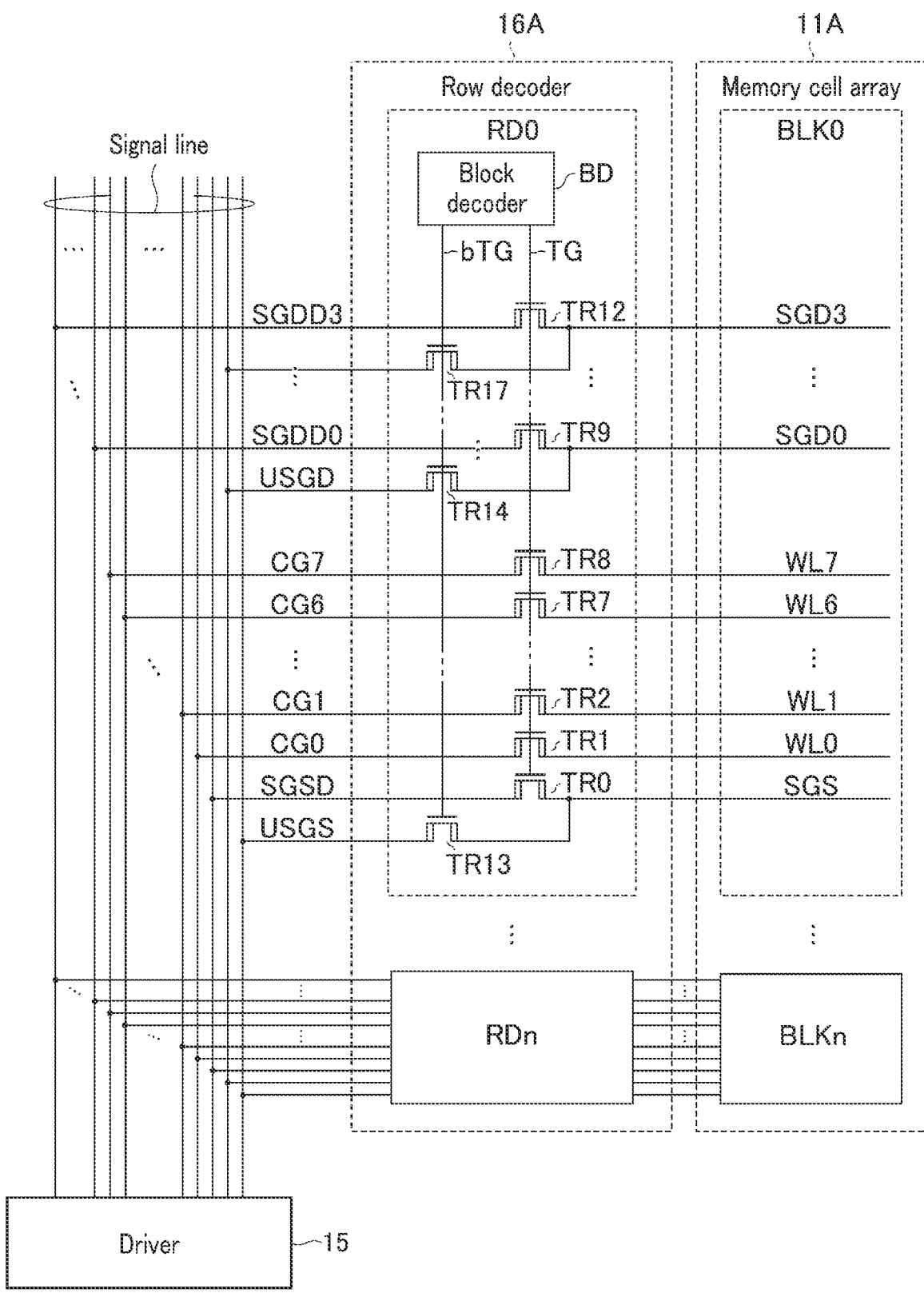
FIG. 5 is a diagram illustrating a circuit configuration of a row decoder of the semiconductor memory device according to the first embodiment.

FIG. 5 is a diagram illustrating a circuit configuration of the row decoder 16A (or 16B) of the semiconductor memory device 10. The row decoders 16A and 16B have a similar circuit configuration. Here, a circuit configuration of the row decoder 16A will be described.

The row decoder 16A includes a plurality of row decoder units RD0, RD1, . . . , RDn. The row decoder units RD0 to RDn are associated with the blocks BLK0 to BLKn, respectively. FIG. 5 illustrates a detailed circuit configuration of the row decoder unit RD0. The circuit configuration of another row decoder units RDn is similar to the circuit configuration of the row decoder unit RD0.

The row decoder unit RD0 includes, for example, a block decoder BD, transfer gate lines TG and bTG, and transistors TR0 to TR17. Hereinafter, the transistors TR0 to TR17 are also referred to as a transistor TR.

The block decoder BD decodes the block address BA. The block decoder BD applies a predetermined voltage to each of the transfer gate lines TG and bTG based on the decoding result of the block address BA. Specifically, the block decoder BD applies an inverted signal of a signal to be applied to the transfer gate line TG to the transfer gate line bTG. That is, the voltage applied to the transfer gate line TG and the voltage applied to the transfer gate line bTG have a complementary relationship.

Each of the transistors TR0 to TR17 is a high-withstand-voltage n-channel MOS field effect transistor. The gates of the transistors TR0 to TR12 are connected to the transfer gate line TG. The gates of the transistors TR13 to TR17 are connected to the transfer gate line bTG. That is, each of the transistors TR0 to TR17 is controlled by the block decoder BD. In addition, each of the transistors TR0 to TR17 is connected to the driver 15 via a signal line. The signal line is shared by the plurality of blocks BLK.

The drain of the transistor TR0 is connected to a signal line SGSD. The signal line SGSD is shared by the plurality of blocks BLK and used as a global transfer gate line corresponding to the selected block BLKn. The source of the transistor TR0 is connected to the select gate line SGS. The select gate line SGS is used as a local transfer gate line provided for each block.

The drains of the transistors TR1 to TR8 are connected to signal lines CG0 to CG7, respectively. Each of the signal lines CG0 to CG7 is used as a global word line shared by the plurality of blocks BLK. The sources of the transistors TR1 to TR8 are connected to the word lines WL0 to WL7, respectively. Each of the word lines WL0 to WL7 is used as a local word line provided for each block.

The drains of the transistors TR9 to TR12 are connected to signal lines SGDD0 to SGDD3, respectively. Each of the signal lines SGDD0 to SGDD3 is shared by the plurality of blocks BLK and used as a global transfer gate line corresponding to the selected block BLKn. The sources of the transistors TR9 to TR12 are connected to the select gate lines SGD0 to SGD3, respectively. Each of the select gate lines SGD0 to SGD3 is used as a local transfer gate line provided for each block.

The drain of the transistor TR13 is connected to a signal line USGS. The source of the transistor TR13 is connected to the select gate line SGS. The drains of the transistors TR14 to TR17 are connected to a signal line USGD. The sources of the transistors TR14 to TR17 are connected to the select gate lines SGD0 to SGD3, respectively. Each of the signal lines USGS and USGD is shared by the plurality of blocks BLK and used as a global transfer gate line corresponding to the unselected block BLKn.

With the above configuration, the row decoder 16A (or 16B) can select the block BLKn. Specifically, during various operations, the block decoder BD corresponding to the selected block BLKn applies voltages at "H" level and "L" level to the transfer gate lines TG and bTG, respectively. The block decoder BD corresponding to the unselected block BLKn applies voltages at "L" level and "H" level to the transfer gate lines TG and bTG, respectively.

Note that the row decoder 16A (or 16B) included in the semiconductor memory device 10 of the first embodiment is not limited to the circuit configuration described above. For example, the number of transistors TR included in the row decoder unit RDn can be appropriately changed based on the number of memory cell transistors, select transistors, and the like provided in each block BLKn.

1.1.3 Configuration of Sense Amplifier

Next, a circuit configuration of the sense amplifiers 17A and 17B in the semiconductor memory device 10 of the first embodiment will be described.

Figure 6:
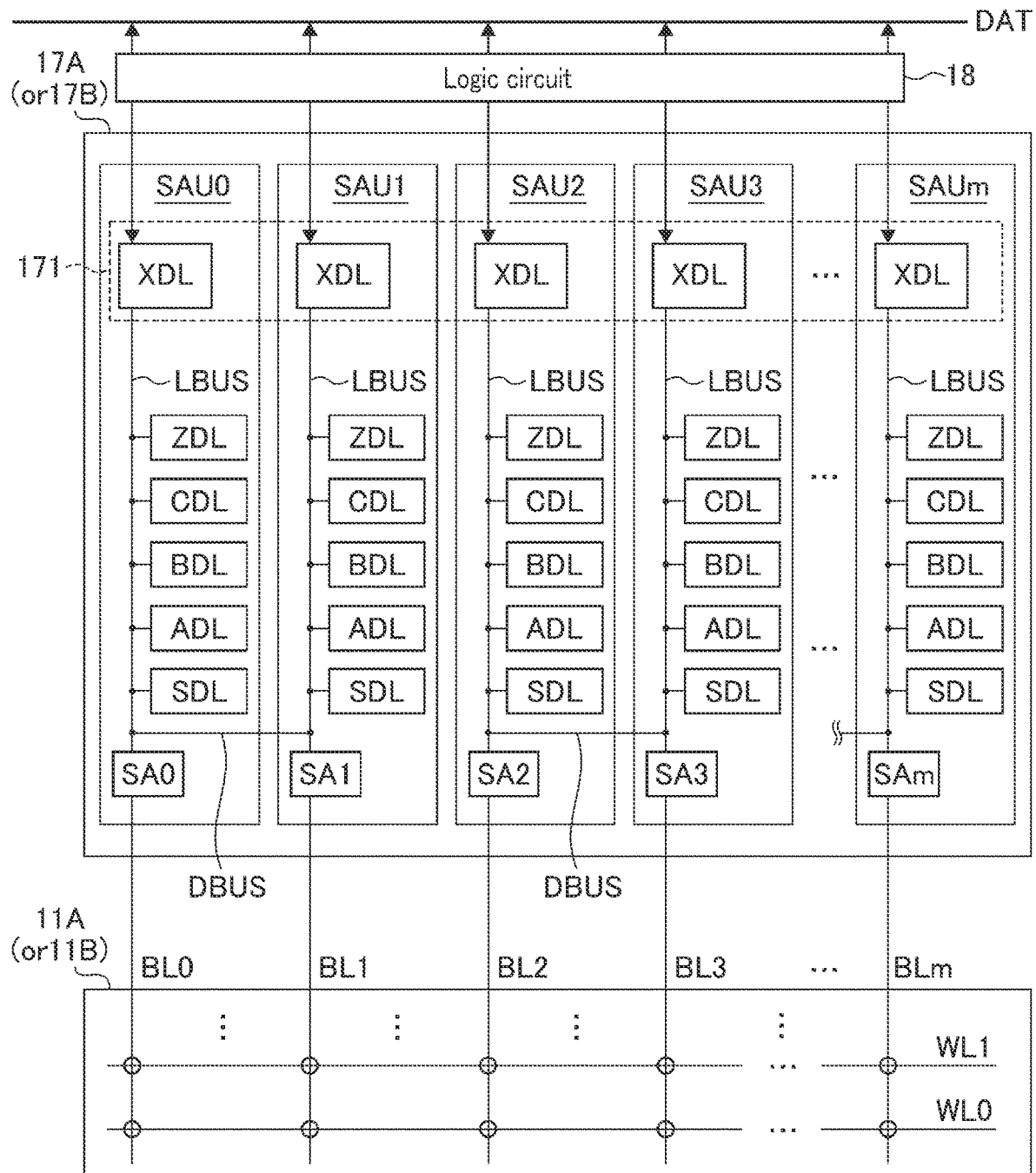
FIG. 6 is a diagram illustrating a circuit configuration of a sense amplifier of the semiconductor memory device according to the first embodiment.

FIG. 6 is a diagram illustrating a circuit configuration of the sense amplifier 17A (or 17B) in the semiconductor memory device 10. The sense amplifiers 17A and 17B have a similar circuit configuration. Here, a basic circuit configuration of the sense amplifier 17A will be described.

The sense amplifier 17A includes a plurality of sense amplifier units SAU0, SAU1, . . . , SAUm−1, and SAUm (m is an integer of 0 or more).

The sense amplifier units SAU0 to SAUm are associated with the bit lines BL0 to BLm, respectively. The sense amplifier unit SAUm includes, for example, a sense amplifier portion SAm, latch circuits SDL, ADL, BDL, CDL, ZDL, and XDL, and buses LBUS and DBUS.

The sense amplifier portion SAm and the latch circuits SDL, ADL, BDL, CDL, ZDL, and XDL are connected to the bus LBUS, and can transmit and receive data to and from each other via the bus LBUS.

The bus LBUS of the even-numbered sense amplifier unit is connected to the bus LBUS of the odd-numbered sense amplifier unit via the bus DBUS. Thus, the even-numbered sense amplifier unit can transmit and receive data to and from the odd-numbered sense amplifier unit via the bus DBUS. For example, the sense amplifier unit SAU0 can transmit and receive data to and from the sense amplifier unit SAU1 via the bus DBUS. Similarly, the sense amplifier unit SAUm-1 can transmit and receive data to and from the sense amplifier unit SAUm via the bus DBUS.

For example, in the read operation, the sense amplifier portion SAm determines whether the read data is "0" or "1" based on the voltage of the bit line BLm. In other words, the sense amplifier portion SAm senses and amplifies the voltage read to the bit line BLm, and determines the data stored in the selected memory cell. Each of the latch circuits SDL, ADL, BDL, CDL, and ZDL temporarily stores read data, writing data, and the like.

The latch circuit XDL is connected to an input/output circuit of the semiconductor memory device 10, and is used for input/output of data between the sense amplifier unit SAUm and the input/output circuit. In addition, the latch circuit XDL is also used as, for example, cache memory 171 of the semiconductor memory device 10. For example, even in a case where the latch circuits SDL, ADL, BDL, CDL, and ZDL are in use, the semiconductor memory device 10 can be set to the ready state in a case where the latch circuit XDL is vacant.

Next, three configuration examples: first, second, and third configuration examples will be described as circuit configurations of the sense amplifiers 17A and 17B and combinations A and B included in the semiconductor memory device 10 of the first embodiment. In the first embodiment, data is stored by the combination A and the combination B. The combination A includes a memory cell X and a memory cell Y, and similarly the combination B includes a memory cell X and a memory cell Y.

FIG. 7 is a diagram illustrating the first configuration example of the sense amplifiers 17A and 17B in the semiconductor memory device 10. In the first configuration example, the memory cells X and Y in the plane PL0 constitute the combination A, and the memory cells X and Y in the plane PL1 constitute the combination B.

As described above, each of the sense amplifiers 17A and 17B includes a plurality of sense amplifier units SAU0, SAU1, ..., SAUm-1, and SAUm. The sense amplifier units SAU0 to SAUm are associated with the bit lines BL0 to BLm, respectively. The sense amplifier unit SAUm includes, for example, a sense amplifier portion SAm, latch circuits SDL, ADL, BDL, CDL, ZDL, and XDL, and buses LBUS and DBUS.

The sense amplifier portion SAm and the latch circuits SDL, ADL, BDL, CDL, ZDL, and XDL are connected to the bus LBUS, and can transmit and receive data to and from each other via the bus LBUS.

For example, a memory cell X0 included in the combination A is arranged at an intersection of the word line WL0 and the bit line BL0 in the memory cell array 11A. The sense amplifier unit SAU0 in the sense amplifier 17A is connected to the bit line BL0. The bit line BL0 is connected to the memory cell X0. A memory cell Y0 included in the combination A is arranged at an intersection of the word line WL0 and the bit line BL1 in the memory cell array 11A. The sense amplifier unit SAU1 in the sense amplifier 17A is connected to the bit line BL1. The bit line BL1 is connected to the memory cell Y0. The memory cells X0 and Y0 constitute the combination A.

A memory cell X0 included in the combination B is arranged at an intersection of the word line WL0 and the bit line BL0 in the memory cell array 11B. The sense amplifier unit SAU0 in the sense amplifier 17B is connected to the bit line BL0. The bit line BL0 is connected to the memory cell X0. A memory cell Y0 included in the combination B is arranged at an intersection of the word line WL0 and the bit line BL1 in the memory cell array 11B. The sense amplifier unit SAU1 in the sense amplifier 17B is connected to the bit line BL1. The bit line BL1 is connected to the memory cell Y0. The memory cells X0 and Y0 constitute the combination B.

Similarly, a memory cell X0 included in the combination A is arranged at an intersection of the word line WL1 and the bit line BL0 in the memory cell array 11A. The sense amplifier unit SAU0 in the sense amplifier 17A is connected to the memory cell X0 via the bit line BL0. A memory cell Y0 included in the combination A is arranged at an intersection of the word line WL1 and the bit line BL1 in the memory cell array 11A. The sense amplifier unit SAU1 in the sense amplifier 17A is connected to the memory cell Y0 via the bit line BL1. The memory cells X0 and Y0 constitute the combination A.

Similarly, a memory cell X0 included in the combination B is arranged at an intersection of the word line WL1 and the bit line BL0 in the memory cell array 11B. The sense amplifier unit SAU0 in the sense amplifier 17B is connected to the memory cell X0 via the bit line BL0. A memory cell Y0 included in the combination B is arranged at an intersection of the word line WL1 and the bit line BL1 in the memory cell array 11B. The sense amplifier unit SAU1 in the sense amplifier 17B is connected to the memory cell Y0 via the bit line BL1. The memory cells X0 and Y0 constitute the combination B.

The latch circuits SDL, ADL, BDL, CDL, and ZDL included in the sense amplifier units SAU0 to SAUm of the plane PL0 constitute a logic circuit 18A. The latch circuits SDL, ADL, BDL, CDL, and ZDL included in the sense amplifier units SAU0 to SAUm of the plane PL1 constitute a logic circuit 18B.

Figure 8:
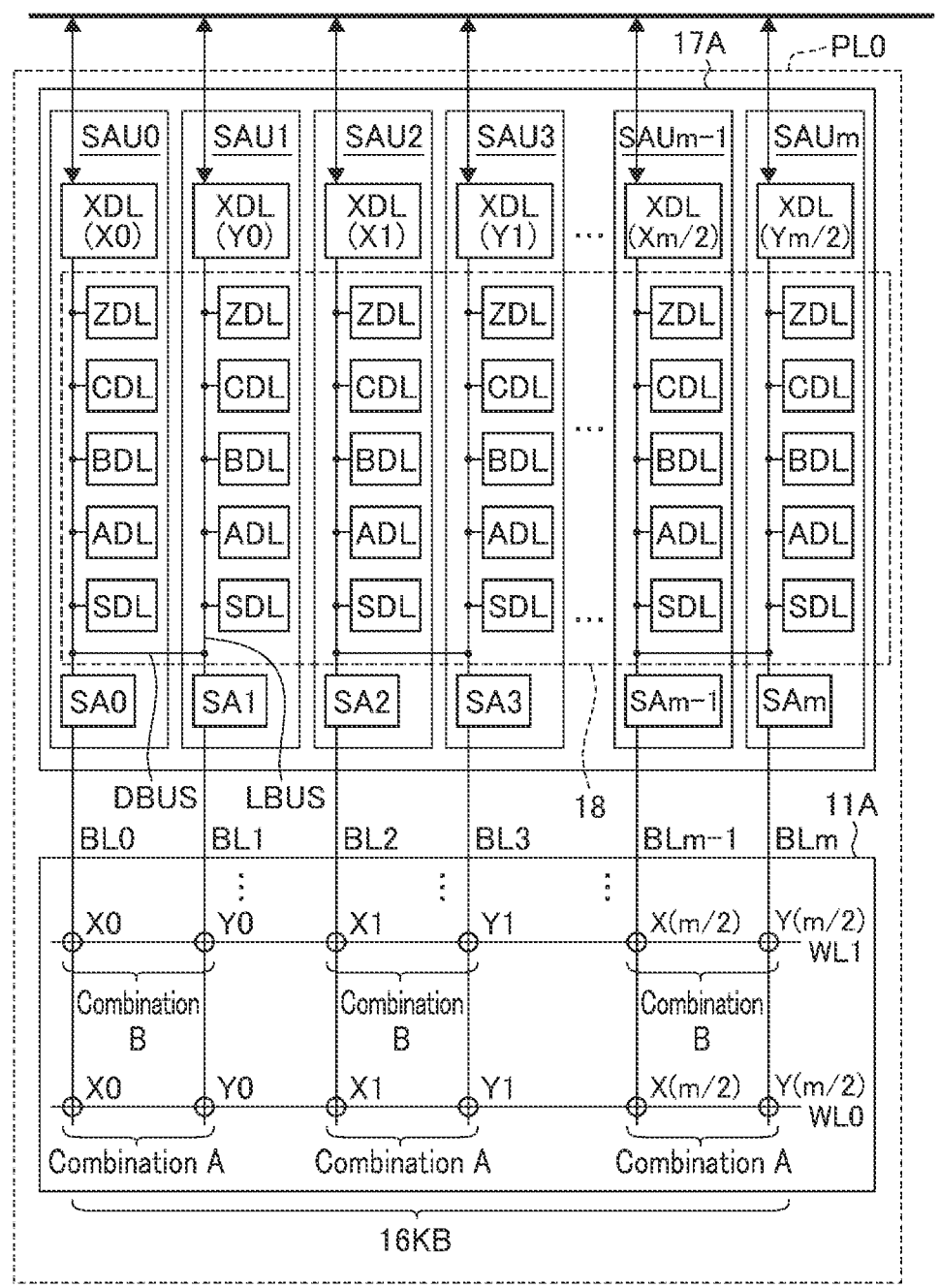
FIG. 8 is a diagram illustrating a second configuration example of the sense amplifier of the semiconductor memory device according to the first embodiment.

FIG. 8 is a diagram illustrating the second configuration example of the sense amplifiers 17A and 17B in the semiconductor memory device 10. In the second configuration example, memory cells X and Y connected to even-numbered word lines in the plane PL0 (or PL1) constitute a combination A, and memory cells X and Y connected to odd-numbered word lines in the plane PL0 constitute a combination B.

For example, a memory cell X0 included in the combination A is arranged at an intersection of the word line WL0 and the bit line BL0 in the memory cell array 11A. The sense amplifier unit SAU0 in the sense amplifier 17A is connected to the bit line BL0. The bit line BL0 is connected to the memory cell X0. A memory cell Y0 included in the combination A is arranged at an intersection of the word line WL0 and the bit line BL1 in the memory cell array 11A. The sense amplifier unit SAU1 in the sense amplifier 17A is connected to the bit line BL1. The bit line BL1 is connected to the memory cell Y0. The memory cells X0 and Y0 constitute the combination A.

A memory cell X0 included in the combination B is arranged at an intersection of the word line WL1 and the bit line BL0 in the memory cell array 11A. The sense amplifier unit SAU0 in the sense amplifier 17A is connected to the bit line BL0. The bit line BL0 is connected to the memory cell X0. A memory cell Y0 included in the combination B is arranged at an intersection of the word line WL1 and the bit line BL1 in the memory cell array 11A. The sense amplifier unit SAU1 in the sense amplifier 17A is connected to the bit line BL1. The bit line BL1 is connected to the memory cell Y0. The memory cells X0 and Y0 constitute the combination B.

Similarly, a memory cell X1 included in the combination A is arranged at an intersection of the word line WL0 and the bit line BL2 in the memory cell array 11A. The sense amplifier unit SAU2 in the sense amplifier 17A is connected to the bit line BL2. The bit line BL2 is connected to the memory cell X1. A memory cell Y1 included in the combination A is arranged at an intersection of the word line WL0 and the bit line BL3 in the memory cell array 11A. The sense amplifier unit SAU3 in the sense amplifier 17A is connected to the bit line BL3. The bit line BL3 is connected to the memory cell Y1. The memory cells X1 and Y1 constitute the combination A.

A memory cell X1 included in the combination B is arranged at an intersection of the word line WL1 and the bit line BL2 in the memory cell array 11A. The sense amplifier unit SAU2 in the sense amplifier 17A is connected to the bit line BL2. The bit line BL2 is connected to the memory cell X1. A memory cell Y1 included in the combination B is arranged at an intersection of the word line WL1 and the bit line BL3 in the memory cell array 11A. The sense amplifier unit SAU3 in the sense amplifier 17A is connected to the bit line BL3. The bit line BL3 is connected to the memory cell Y1. The memory cells X1 and Y1 constitute the combination B.

The latch circuits SDL, ADL, BDL, CDL, and ZDL included in the sense amplifier units SAU0 to SAUm of the plane PL0 constitute the logic circuit 18.

Figure 9:
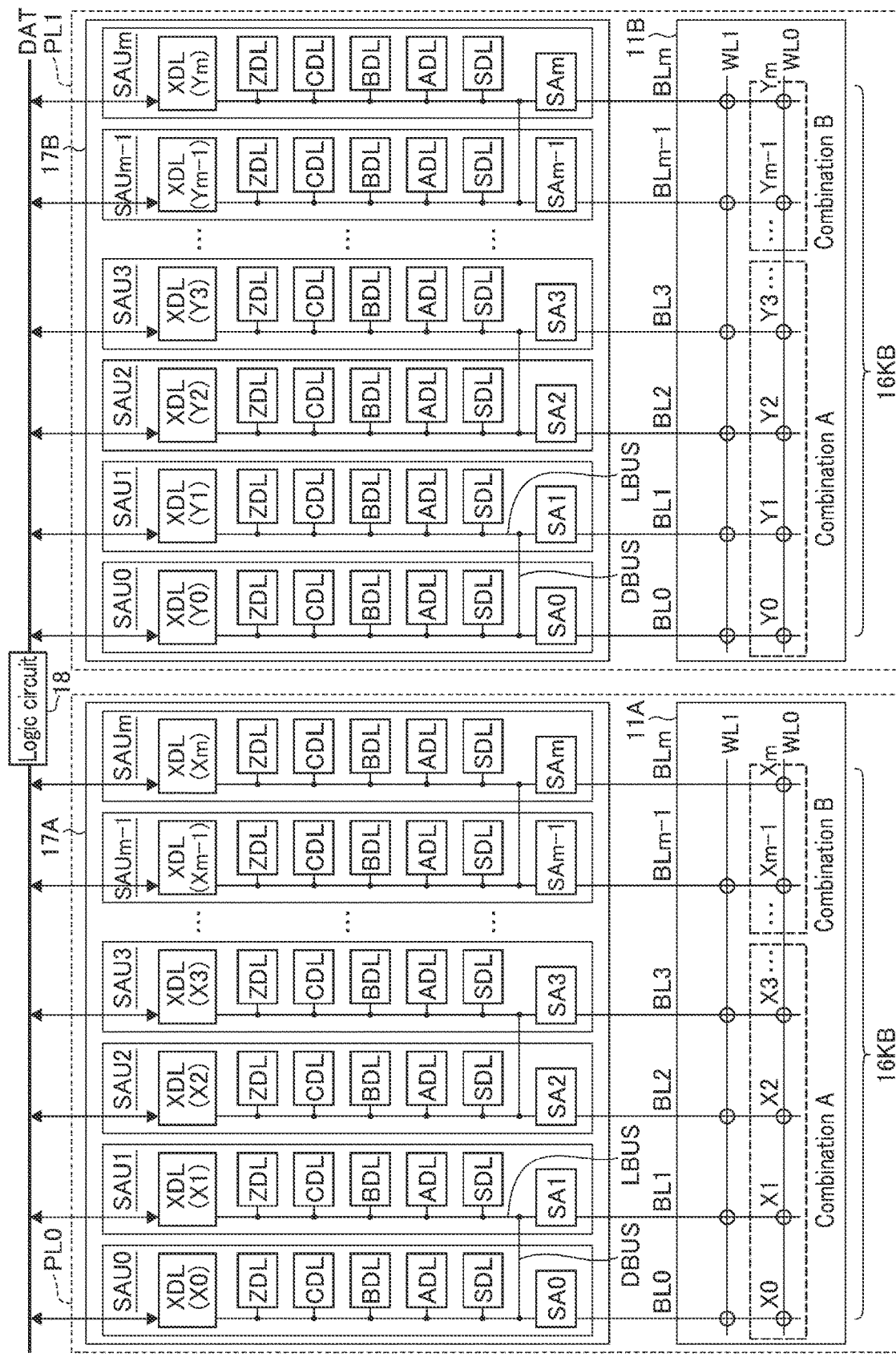
FIG. 9 is a diagram illustrating a third configuration example of the of sense amplifier of the semiconductor memory device according to the first embodiment.

FIG. 9 is a diagram illustrating the third configuration example of the sense amplifiers 17A and 17B in the semiconductor memory device 10. In the third configuration example, half of memory cells X and Y connected to a word line in the plane PL0 (or PL1) constitute a combination A, and the remaining half of the memory cells X and Y constitute a combination B.

The logic circuit 18 is arranged between wiring to which the sense amplifier units SAU0 to SAUm of the plane PL0 are connected and the data DAT is transferred and wiring to which the sense amplifier units SAU0 to SAUm of the plane PL1 are connected and the data is transferred.

Figure 10:
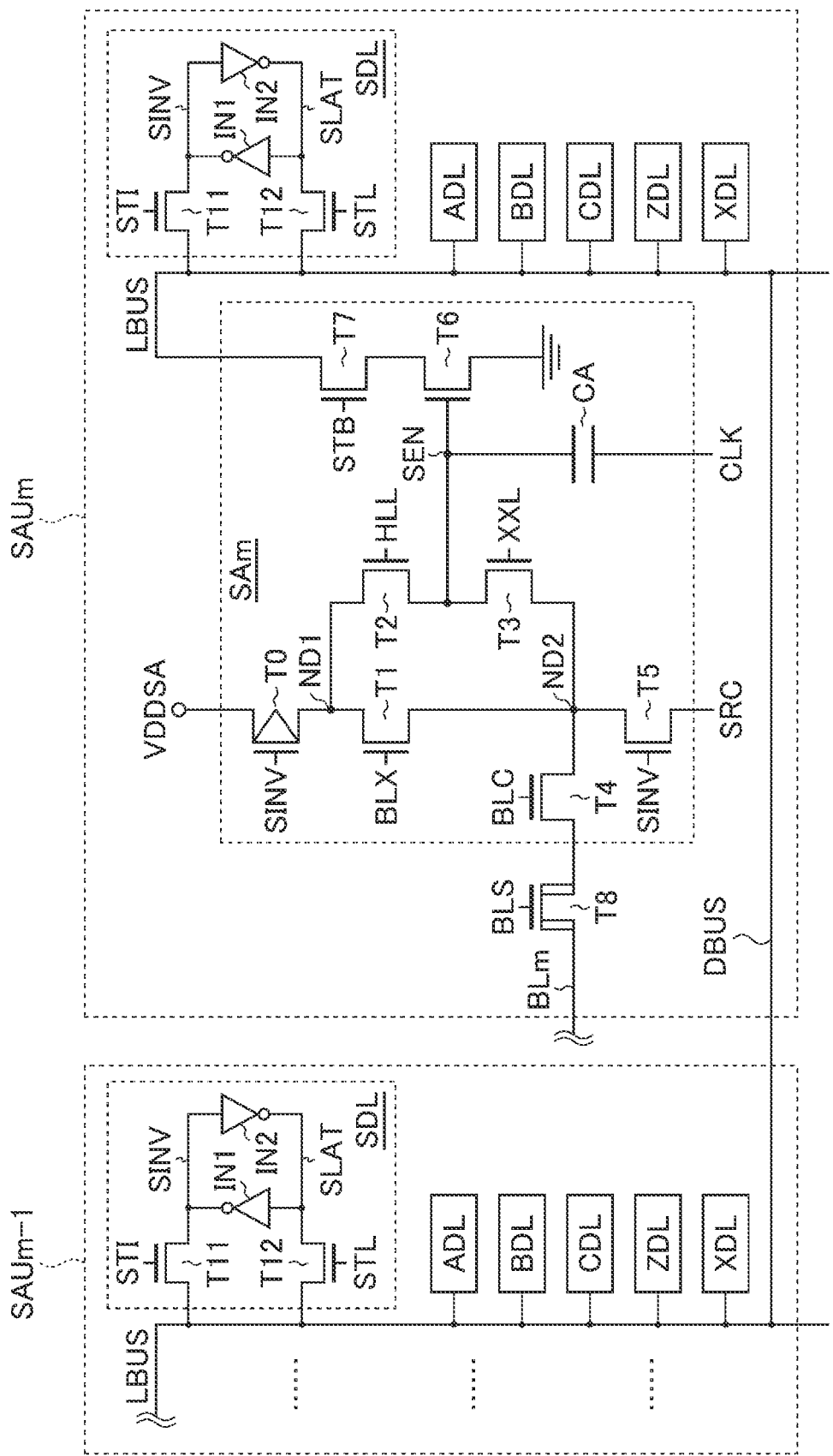
FIG. 10 is a circuit diagram of a sense amplifier unit according to the first embodiment.

Next, a circuit configuration of the sense amplifier unit SAUm of the sense amplifiers 17A and 17B will be described. FIG. 10 is a circuit diagram of the sense amplifier unit SAUm.

The sense amplifier unit SAUm includes, as described above, the sense amplifier portion SAm, the latch circuits SDL, ADL, BDL, CDL, ZDL, and XDL, and the buses LBUS and DBUS.

The sense amplifier portion SAm includes, for example, transistors T0, T1, . . . , and T8 and a capacitor CA. The transistor T0 is a p-channel MOS field effect transistor. Each of the transistors T1 to T8 is an n-channel MOS field effect transistor. The transistor T8 is an n-channel MOS field effect transistor having a higher withstand voltage than each of the transistors T0 to T7.

The source of the transistor T0 is connected to the node of a voltage VDDSA. For example, the voltage VDDSA is supplied from the driver 15 to this node. The drain of the transistor T0 is connected to a node ND1. The gate of the transistor T0 is connected to, for example, a node SINV of the latch circuit SDL. The drain of the transistor T1 is connected to the node ND1. The source of the transistor T1 is connected to a node ND2. A control signal BLX is input to the gate of the transistor T1. The drain of the transistor T2 is connected to the node ND1. The source of the transistor T2 is connected to a sense node SEN. A control signal HLL is input to the gate of the transistor T2.

The drain of the transistor T3 is connected to the sense node SEN. The source of the transistor T3 is connected to the node ND2. A control signal XXL is input to the gate of the transistor T3. The drain of the transistor T4 is connected to the node ND2. The source of the transistor T4 is connected to the drain of the transistor T8. A control signal BLC is input to the gate of the transistor T4. The source of the transistor T8 is connected to the bit line BLm. A control signal BLS is input to the gate of the transistor T8.

The drain of the transistor T5 is connected to the node ND2. The source of the transistor T5 is connected to a node SRC. For example, a ground voltage VSS is supplied to the node SRC. The gate of the transistor T5 is connected to the node SINV of the latch circuit SDL.

The drain of the transistor T7 is connected to the bus LBUS. The source of the transistor T7 is connected to the drain of the transistor T6. A control signal STB is input to the gate of the transistor T7. The source of the transistor T6 is, for example, grounded. In other words, the ground voltage VSS is supplied to the source of the transistor T6. The gate of the transistor T6 is connected to the sense node SEN.

One electrode of the capacitor CA is connected to the sense node SEN. A clock signal CLK is input to the other electrode of the capacitor CA.

The latch circuits SDL, ADL, BDL, CDL, ZDL, and XDL are connected to the bus LBUS.

The latch circuit SDL includes, for example, transistors T11 and T12 and inverters IN1 and IN2. The transistors T11 and T12 are an n-channel MOS field effect transistor.

An input node of the inverter IN1 is connected to a node SLAT. An output node of the inverter IN1 is connected to the node SINV. An input node of the inverter IN2 is connected to the node SINV. An output node of the inverter IN2 is connected to the node SLAT. One end of the transistor T11 is connected to the node SINV. The other end of the transistor T11 is connected to the bus LBUS. A control signal STI is input to the gate of the transistor T11. One end of the transistor T12 is connected to the node SLAT. The other end of the transistor T12 is connected to the bus LBUS. A control signal STL is input to the gate of the transistor T12. For example, the data held in the node SLAT corresponds to the data stored in the latch circuit SDL. On the other hand, the data held in the node SINV corresponds to inverted data of the data held in the node SLAT.

Since each of the other latch circuits ADL, BDL, CDL, ZDL, and XDL has a circuit configuration similar to that of the latch circuit SDL, the description thereof will be omitted.

The bus LBUS of the sense amplifier unit SAUm is connected to the bus LBUS of the sense amplifier unit SAUm−1 adjacent to the sense amplifier unit SAUm via the bus DBUS.

In the circuit configuration of the sense amplifier unit SAUm described above, the voltage of the node SINV changes based on the data stored by the latch circuit SDL. Each of the control signals BLX, HLL, XXL, BLC, BLS, and STB, and the clock signal CLK is controlled by, for example, the sequencer 14. For example, in the read operation, the sense amplifier portion SAm determines the data read to the bit line BLm based on the timing at which the control signal STB is asserted.

Note that the sense amplifiers 17A and 17B included in the semiconductor memory device 10 of the first embodiment are not limited to the circuit configuration described above. For example, the number of latch circuits included in the sense amplifier unit SAUm can be appropriately changed based on the number of pages stored in a cell unit CU. In addition, the sense amplifier portion SAm may have another circuit configuration as long as it can determine the data read to the bit line BLm.

1.1.4 Threshold Voltage Distribution of Memory Cell Transistor

Next, a threshold voltage distribution that can be taken by the memory cell transistor MT in the memory cell array 11A (or 11B) will be described.

In the present specification, a case where a memory cell transistor MT can store k (k is an integer of 1 or more)-bit data is referred to as Dk. For example, in a case where the memory cell transistor MT corresponds to D1, the memory cell transistor MT can store 1-bit data and has two threshold voltage distributions. In addition, in a case where the memory cell transistor MT corresponds to D2, the memory cell transistor MT can store 2-bit data and has four threshold voltage distributions. In a case where the memory cell transistor MT corresponds to D3, the memory cell transistor MT can store 3-bit data and has eight threshold voltage distributions.

In addition, a case where a memory cell transistor MT can store 0.5-bit data in addition to k-bit data, that is, a case where one memory cell transistor MT can store "k+0.5"-bit data is referred to as Dk.5. For example, in a case where the memory cell transistor MT corresponds to D1.5, the memory cell transistor MT can store 1.5-bit data and has a further threshold voltage distribution in addition to the two threshold voltage distributions, that is, three threshold voltage distributions. In a case where the memory cell transistor MT corresponds to D2.5, the memory cell transistor MT can store 2.5-bit data and has two further threshold voltage distributions in addition to the four threshold voltage distributions, that is, six threshold voltage distributions. In a case where the memory cell transistor MT corresponds to D3.5, the memory cell transistor MT can store 3.5-bit data and has four further threshold voltage distributions in addition to the eight threshold voltage distributions, that is, twelve threshold voltage distributions.

The memory cell transistors MT in the memory cell arrays 11A and 11B of the first embodiment can store "k+0.5"-bit data and correspond to Dk.5.

Figure 11:
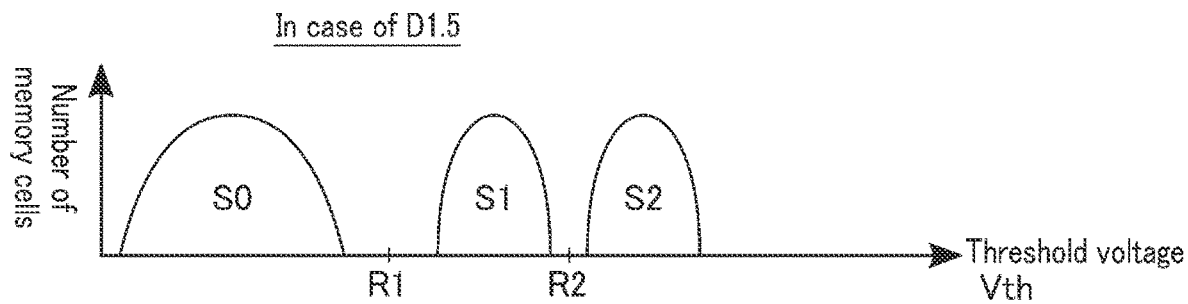
FIGS. 11 to 13 are diagrams illustrating threshold voltage distributions of memory cell transistors according to the first embodiment.
Figure 12:
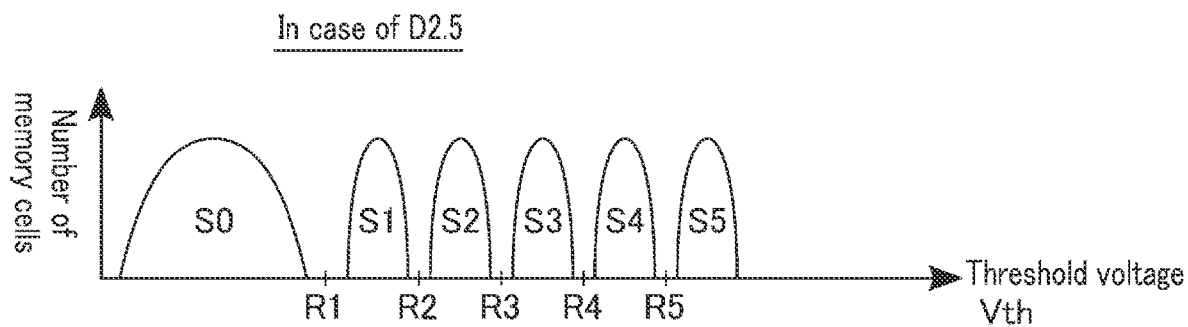
Figure 13:
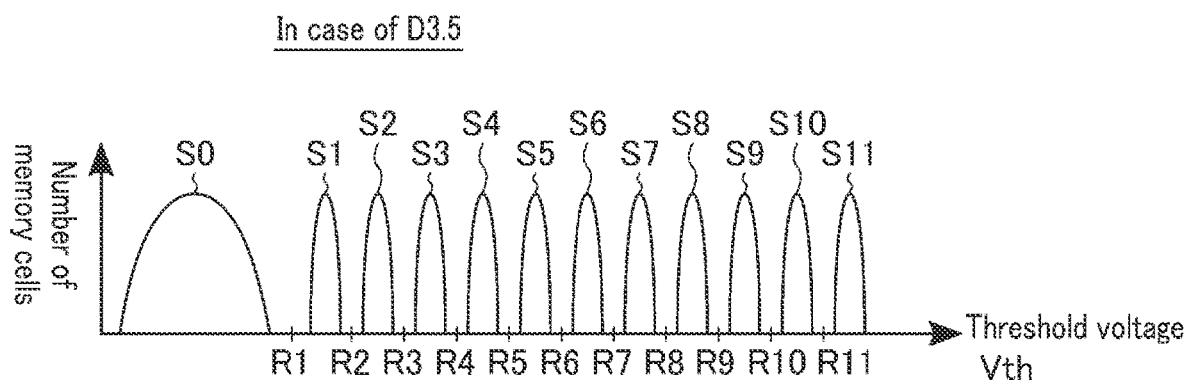

FIGS. 11, 12, and 13 illustrate threshold voltage distributions of the memory cell transistor MT of the first embodiment.

In a case where the memory cell transistor MT corresponds to D1.5, as illustrated in FIG. 11, the threshold voltage distribution of the memory cell transistor MT can take three states. Hereinafter, these three states are referred to as a state "S0", a state "S1", and a state "S2" in order from a lower threshold voltage. A read voltage is set between adjacent states. Specifically, a read voltage R1 is set between the state S0 and the state S1. Further, a read voltage R2 is set between the state S1 and the state S2.

In addition, in a case where the memory cell transistor MT corresponds to D2.5, as illustrated in FIG. 12, the threshold voltage distribution of the memory cell transistor MT can take six states. Hereinafter, these six states are referred to as a state "S0", a state "S1", a state "S2", a state "S3", a state "S4", and a state "S5" in order from a lower threshold voltage. A read voltage is set between adjacent states. Specifically, a read voltage R1 is set between the state S0 and the state S1. A read voltage R2 is set between the state S1 and the state S2. A read voltage R3 is set between the state S2 and the state S3. A read voltage R4 is set between the state S3 and the state S4. Further, a read voltage R5 is set between the state S4 and the state S5.

In addition, in a case where the memory cell transistor MT corresponds to D3.5, as illustrated in FIG. 13, the threshold voltage distribution of the memory cell transistor MT can take twelve states. Hereinafter, these twelve states are referred to as a state "S0", a state "S1", a state "S2", a state "S3", a state "S4", a state "S5", a state "S6", a state "S7", a state "S8", a state "S9", a state "S10", and a state "S11" in order from a lower threshold voltage. A read voltage is set between adjacent states. Specifically, a read voltage R1 is set between the state S0 and the state S1. A read voltage R2 is set between the state S1 and the state S2. A read voltage R3 is set between the state S2 and the state S3. A read voltage R4 is set between the state S3 and the state S4. A read voltage R5 is set between the state S4 and the state S5. A read voltage R6 is set between the state S5 and the state S6. A read voltage R7 is set between the state S6 and the state S7. A read voltage R8 is set between the state S7 and the state S8. A read voltage R9 is set between the state S8 and the state S9. A read voltage R10 is set between the state S9 and the state S10. Further, a read voltage R11 is set between the state S10 and the state S11.

1.1.5 Configuration of Page Data

Figure 14:
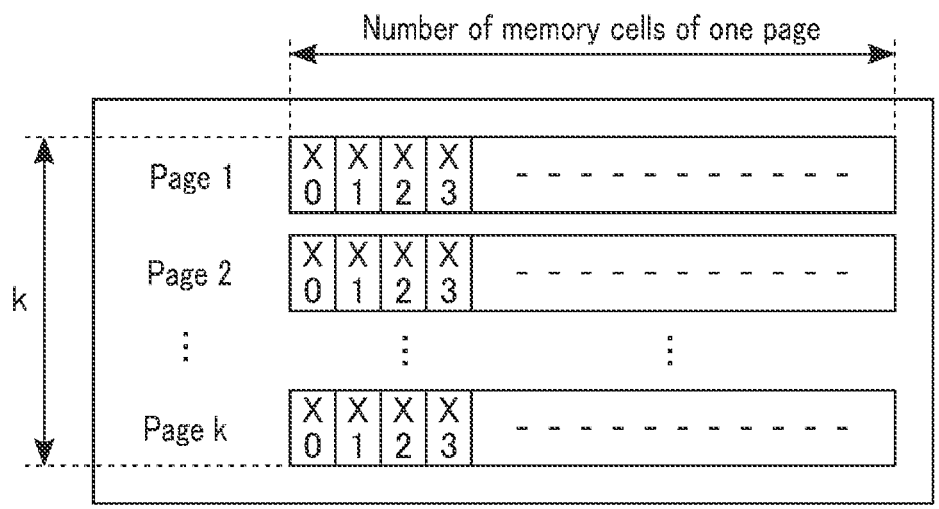
FIG. 14 is a diagram illustrating a configuration of normal page data.
Figure 15:
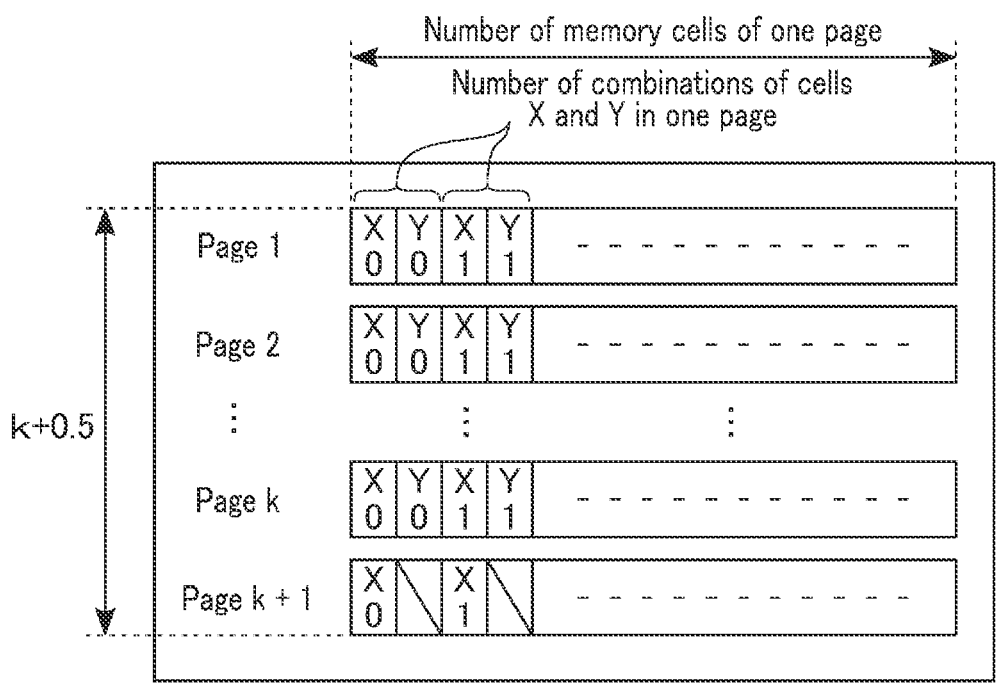
FIG. 15 is a diagram illustrating a configuration of page data according to the first embodiment.

Next, page data in a case where the memory cell transistor MT corresponds to Dk or Dk.5 will be described. FIG. 14 is a diagram illustrating a configuration of page data in a case where the memory cell transistor corresponds to Dk, and FIG. 15 is a diagram illustrating a configuration of page data in a case where the memory cell transistor corresponds to Dk.5.

In a case where the memory cell transistor corresponds to Dk, that is, in a case where k-bit data can be stored in a memory cell, page data of page 1, page 2, . . . , and page k can be expressed as described below as illustrated in FIG. 14.

Page data=(the number of cells used in one page)×
(the number of bits that can be expressed by
one cell)=(the number of cells used in one
page)×$k$ On the other hand, in the present embodiment, the memory cell transistor corresponds to Dk.5. In a case where the memory cell transistor corresponds to Dk.5, "2k+1"-bit data can be stored in two memory cells. In a case where "2k+1"-bit data is stored in two memory cells, page data of page 1, page 2, . . . , page k, and page k+1 can be expressed as described below as illustrated in FIG. 15.

Page data=(the number of combinations of cells $X$
and $Y$ in one page)×(the number of bits that can
be expressed by the combination of $X$ and $Y$)

=(the number of cells used in one page)/2×(2$k$+1)

=(the number of cells used in one page)×(2$k$+1)/2

=(the number of cells used in one page)×($k$+0.5)

In the present embodiment, for example, page data of page 1, page 2, . . . , page k, page k+1, . . . , page 2k, and page 2k+1 is stored using memory cells of two planes PL0 and PL1. FIG. 16 is a diagram illustrating a configuration of page data in a case where pages 1 to (2k+1) are stored using the planes PL0 and PL1. Hereinafter, for example, a page is assumed to have 16 k bytes of data, one page is described as "page (16 kB)", and a half page of a page is described as "page (8 kB)".

In the plane PL0, data is stored in the combination A of the memory cell X and the memory cell Y, and in the plane PL1, data is stored in the combination B of the memory cell X and the memory cell Y. As illustrated in FIG. 16, the combinations A are configured in pages 1 to k, the combinations B are configured in pages (k+1) to 2k, and the combinations A and B are configured in page 2k+1.

For example, in each of pages 1 to k, the combination A is configured by the memory cell X0 and the memory cell Y0 of the plane PL0, and the combination A is configured by the memory cell X1 and the memory cell Y1. Further, the combination A is configured by a memory cell X(m/2) and the memory cell Y(m/2) of the plane PL0.

In each of pages (k+1) to 2k, the combination B is configured by the memory cell X0 and the memory cell Y0 of the plane PL1, and the combination B is configured by the memory cell X1 and the memory cell Y1. Further, the combination B is configured by a memory cell X(m/2) and a memory cell Y(m/2) of the plane PL1.

In the page 2k+1, the combination A of the plane PL0 is configured by even bit data, and the combination B of the plane PL1 is configured by odd bit data. For example, the combination A is each configured by the memory cells X0 and X1 of the plane PL0. Further, the combination A is configured by the memory cell X(m/2) of the plane PL0. In addition, the combination B is each configured by the memory cells Y0 and Y1 of the plane PL1. Further, the combination B is configured by the memory cell Y(m/2) of the plane PL1.

Figure 17:
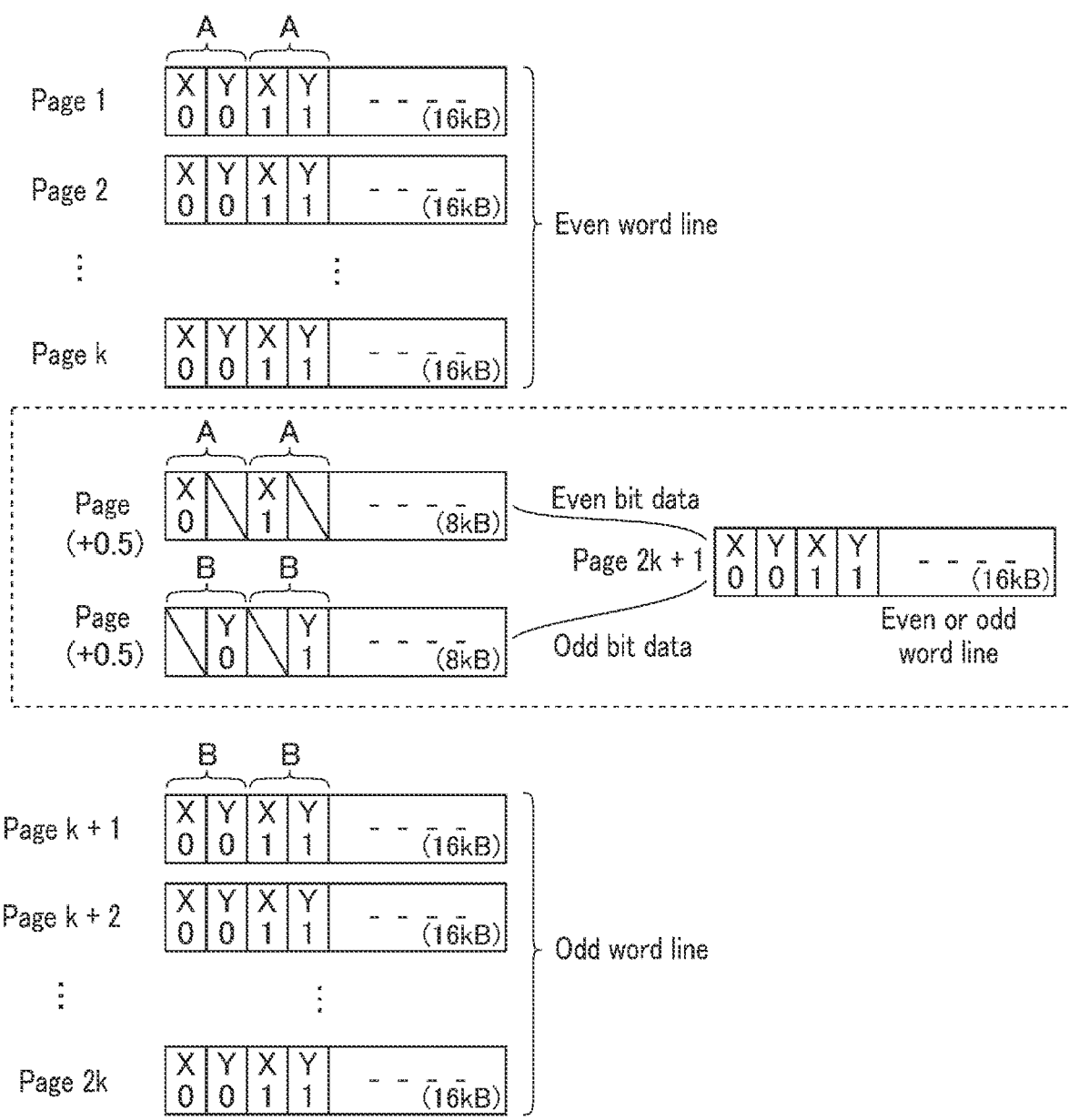
FIG. 17 is a diagram illustrating a configuration of page data in a case where pages are stored using two word lines of a plane according to the first embodiment.

In addition, in the present embodiment, page data of page 1, page 2, . . . , page k, page k+1, . . . , page 2k, and page 2k+1 is stored using memory cells connected to two word lines in a plane PL0 (or PL1). FIG. 17 is a diagram illustrating a configuration of page data in a case where pages 1 to (2k+1) are stored using two word lines in the plane PL0.

Data is stored by the combination A of the memory cell X and the memory cell Y connected to an even word line, for example, the word line WL0, in the plane PL0, and data is stored by the combination B of the memory cell X and the memory cell Y connected to an odd word line, for example, the word line WL1. As illustrated in FIG. 17, the combinations A are configured in pages 1 to k, the combinations B are configured in pages (k+1) to 2k, and the combinations A and B are configured in page 2k+1.

For example, in each of pages 1 to k, the combination A is configured by the memory cell X0 and the memory cell Y0 connected to the even word line of the plane PL0, and the combination A is configured by the memory cell X1 and the memory cell Y1. Further, the combination A is configured by the memory cell X(m/2) and the memory cell Y(m/2) connected to the even word line of the plane PL0.

In each of pages (k+1) to 2k, the combination B is configured by the memory cell X0 and the memory cell Y0 connected to the odd word line of the plane PL0, and the combination B is configured by the memory cell X1 and the memory cell Y1. Further, the combination B is configured by the memory cell X(m/2) and the memory cell Y(m/2) of the plane PL0.

In the page 2k+1, the combination A is configured by even bit data connected to the even or odd word line of the plane PL0, and the combination B is configured by odd bit data. For example, the combination A is each configured by the memory cells X0 and X1 connected to the even or odd word line of the plane PL0, and the combination B is each configured by the memory cells Y0 and Y1.

1.2 Operation of Semiconductor Memory Device 10

1.2.1 Data Arrangement in Coordinate Space and Data Conversion in Writing and Reading Next, arrangement of "2k+1"-bit data in a three-dimensional coordinate space and data conversion in a write operation and a read operation in the semiconductor memory device 10 according to the first embodiment will be described. In the semiconductor memory device 10, by virtually arranging the "2k+1"-bit data in a three-dimensional $(\alpha,\beta,\gamma)$ coordinate space, it is possible to easily grasp the storage state of the data.

As described above, for example, the page "2k+1" data is stored by the combinations A included in the cell unit CU in the plane PL0 and the combinations B included in the cell unit CU in the plane PL1. Alternatively, the page "2k+1" data is stored by the combinations A and B included in the two cell units CU in the plane PL0 (or PL1). Each of the combinations A and B includes the memory cell X and the memory cell Y.

Figure 18:
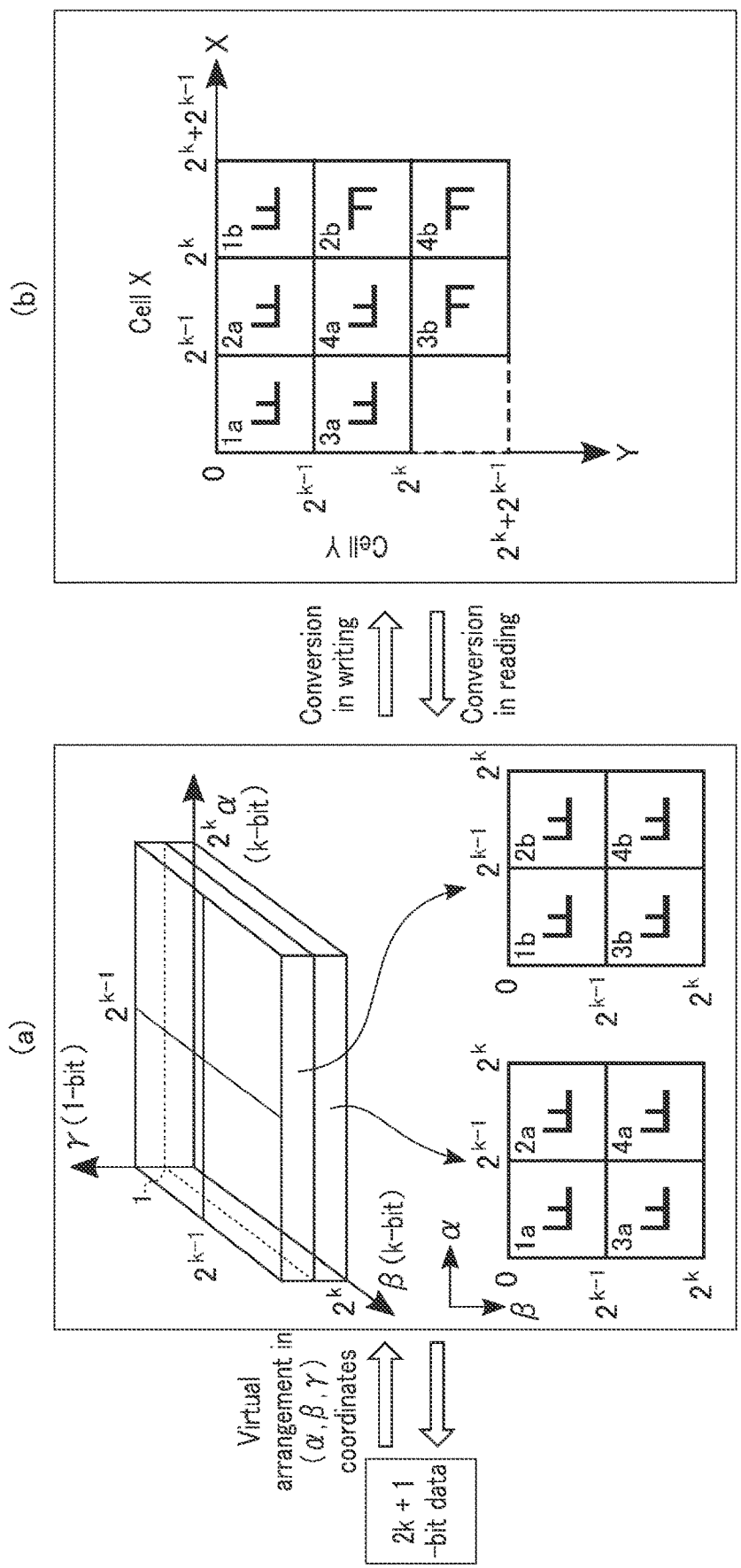
FIG. 18 is a diagram illustrating data arrangement in a coordinate space and data conversion in a write operation and a read operation according to the first embodiment.

Hereinafter, a case where "2k+1"-bit data is arranged in a three-dimensional $(\alpha,\beta,\gamma)$ coordinate space in the first embodiment will be described. FIG. 18 is diagram illustrating data arrangement in a coordinate space and data conversion in a write operation and a read operation of the first embodiment.

FIG. 18(*a*) is a conceptual diagram illustrating a case where "2k+1"-bit data is arranged in a three-dimensional $(\alpha,\beta,\gamma)$ coordinate space.

In FIG. 18A, the coordinate $\alpha$ represents k bits stored in the memory cell X, the coordinate $\beta$ represents k bits stored in the memory cell Y, and the coordinate $\gamma$ represents "+1" bits stored in the memory cells X and Y. Thus, the "2k+1"-bit data can be arranged in the three-dimensional $(\alpha,\beta,\gamma)$ coordinate space.

The "2k+1"-bit data arranged in the three-dimensional $(\alpha,\beta,\gamma)$ coordinate space is converted into a two-dimensional (X,Y) coordinate space at the time of the write operation. FIG. 18(*b*) is a diagram in which "2k+1"-bit data is arranged in a two-dimensional (X,Y) coordinate space, and "2k+1"-bit data is indicated by a threshold voltage (or a state) of the memory cell X and threshold voltages (or states) of the memory cell Y.

In FIG. 18(*b*), the coordinate X represents threshold voltages 0, $2^{k-1}$, $2^k$, and $2^k+2^{k-1}$ (k is an integer of 1 or more) of the memory cell X, and the coordinate Y represents threshold voltages 0, $2^{k-1}$, $2^k$, and $2^k+2^{k-1}$ of the memory cell Y. In a case where the memory cells X and Y correspond to D3.5, the coordinates X and Y represent states S0 to S11.

<Example of Conversion in Write Operation>

The conversion in the write operation of the "2k+1"-bit data, that is, the conversion from the three-dimensional $(\alpha,\beta,\gamma)$ coordinate space to the two-dimensional (X,Y) coordinate space is performed as described below.

In the write operation, the "2k+1"-bit data is arranged in three-dimensional coordinates of $(\alpha[k-1:0], \beta[k-1:0], \gamma[0])$, and then converted into arrangement in two-dimensional coordinates of states S0, S1, S2, . . . , and Sn of two memory cells X and Y.

The conversion into the two-dimensional coordinates is switched according to the value of $\gamma$. Since X≥$\alpha$ and Y≥$\beta$, one bit of $\gamma$ can be additionally written.

In a case where $\gamma=0$
  $X[k]=0$, $X[k-1:0]=\alpha[k-1:0]$
  $Y[k]=0$, $Y[k-1:0]=\beta[k-1:0]$
In a case where $\gamma=1$
  In a case where $\alpha[k-1]=1$
    $X[k]=1$, $X[k-1:0]=\sim\alpha[k-1:0](=\alpha[k-1:0])$*1
    $Y[k]=0$, $Y[k-1:0]=\beta[k-1:0]$
  In a case where $\alpha[k-1]=0$
    In a case where $\beta[k-1]=0$
      $X[k]=1$, $X[k-1:0]=\alpha[k-1:0]$*2
      $Y[k]=1$, $Y[k-1:0]=\beta[k-1:0]$*2
    In a case where $\beta[k-1]=1$
      $X[k]=0$, $X[k-1:0]=\sim\alpha[k-1:0]$
      $Y[k]=1$, $Y[k-1:0]=\sim\beta[k-1:0](=\beta[k-1:0])$*1

Note that, in the above formulae, ~ represents an inverted value. In the above description, the portions indicated by *1 are converted by threshold coding according to inversion of coordinates. If the coding portion $[2^k+2^{k-1}-1:2^k]$ to be added is a mirror image of $[2^k-1:2^{k-1}]$, $\sim\alpha[k-1:0]=\alpha[k-1:0]$, and inversion processing is unnecessary.

In addition, the portions indicated by *2 mean movement to the coordinates of $+2^k$ (S0→S8, or the like), and conversion processing according to threshold coding is necessary. If the coding portion $[2^k+2^{k-1}-1:2^k]$ to be added is arranged so as to be 1-bit inversion from $[2^{k-1}-1:0]$, the processing is easy.

<Example of Conversion in Read Operation>

The conversion in the read operation of the "2k+1"-bit data, that is, the conversion from the two-dimensional (X,Y) coordinate space to the three-dimensional ($\alpha,\beta,\gamma$) coordinate space is performed as described below.

The two-dimensional arrangement of the threshold voltages (X[k:0], Y[k:0]) of the two memory cells X and Y is converted into a three-dimensional arrangement of ($\alpha[k-1:0]$, $\beta[k-1:0]$, $\gamma[0]$) to obtain "2k+1"-bit data. These pieces of processing are performed by bit inversion in the sense amplifier unit connected to the memory cell X or Y and data exchange between the sense amplifier units connected to the two memory cells X and Y.

In a case where the read value of the memory cell is within k bits, since the conversion is such that $(\alpha,\beta)=(X,Y)$, the conversion is unnecessary.

In addition, it is also possible to read only one additional bit of $\gamma$.

Processing can be facilitated depending on threshold coding, and data can be output before reading all bits.

In a case where $Y[k]=1$
  In a case where $X[k]=0$
    $(\alpha,\beta,\gamma)=(\sim X[k-1:0], \sim Y[k-1:0], 1)=(X[k-1:0], Y[k-1:0], 1)$*3
  In a case where $X[k]=1$
    $(\alpha,\beta,\gamma)=(X[k-1:0], Y[k-1:0],1)$*4
In a case where $Y[k]=0$
  In a case where $X[k]=1$
    $(\alpha,\beta,\gamma)=(\sim X[k-1:0], Y[k-1:0], 1)=(X[k-1:0], Y[k-1:0], 1)$*3
  In a case where $X[k]=0$
    $(\alpha,\beta,\gamma)=(X[k-1:0], Y[k-1:0],0)$ In the above description, the portions indicated by *3 are converted according to inversion of coordinates at the time of threshold coding of a previous page. Bit inversion is unnecessary depending on threshold coding.

In addition, the portion indicated by *4 is converted according to the coordinate movement of $-2^k$ at the time of threshold coding of a previous page. Depending on threshold coding, processing can be facilitated.

<Example of Threshold Coding Corresponding to Facilitation of Processing of "2k+1"-Bit Data>

Next, an example of threshold coding for facilitating processing of "2k+1"-bit data will be described.

FIG. 19 is a diagram illustrating an example of threshold coding corresponding to facilitation of processing of "2k+1"-bit data. In a case where the mapping of the "2k+1"-bit data from the three-dimensional arrangement to the two-dimensional arrangement is combined with the example of threshold coding illustrated in FIG. 19, the conversion control information is collected in the latch circuits ADL and ZDL. Therefore, the other latch circuits are arranged such that data conversion is unnecessary.

In the "2k+1"-bit data, the data of the latch circuits BDL, CDL, . . . corresponding to the states S(0) to S($2^{k-1}-1$) is inverted to data of the latch circuits BDL, CDL, . . . corresponding to the states S($2^{k-1}$) to S($2^{k-1}$) relative to a symmetric line between the states S($2^{k-1}-1$) and S($2^{k-1}$). That is, the data of the latch circuits excluding the latch circuits ADL and ZDL corresponding to the states S(0) to S($2^{k-1}-1$) is inverted line-symmetrically to data of the latch circuits excluding the latch circuits ADL and ZDL corresponding to the states S($2^{k-1}$) to S($2^{k-1}$) relative to a symmetric line between the states S($2^{k-1}-1$) and S($2^{k-1}$).

In addition, the data of the latch circuits BDL, CDL, . . . corresponding to the states S($2^{k-1}$) to S($2^{k-1}$) is inverted to data of the latch circuits BDL, CDL, . . . corresponding to the states S($2^k$) to S($2^k+2^{k-1}$) relative to a symmetric line between the states S($2^{k-1}$) and S($2^k$). That is, the data of the latch circuits excluding the latch circuits ADL and ZDL corresponding to the states S($2^{k-1}$) to S($2^{k-1}$) is inverted line-symmetrically to data of the latch circuits excluding the latch circuits ADL and ZDL corresponding to the states S($2^k$) to S($2^k+2^{k-1}$) relative to a symmetric line between the states S($2^{k-1}$) and S($2^k$).

As described above, by inverting the data of the latch circuits excluding the latch circuits ADL and ZDL in mirror symmetry, it is possible to facilitate the processing of the "2k+1"-bit data.

1.3 Effects of First Embodiment

According to the first embodiment, it is possible to provide a semiconductor memory device capable of improving the performance of the write operation and the read operation.

Hereinafter, effects of the first embodiment will be described.

In the first embodiment, in a case where the memory cell can store 0.5-bit data in addition to k-bit data, it is possible to store "2k+1"-bit data by storing the data in a combination of two memory cells.

In addition, with the configuration of the first embodiment, k is an integer of 1 or more, and even in a case where k is increased to 1, 2, 3, 4, 5, . . . , it is possible to easily execute the write operation and the read operation of "2k+1"-bit data with respect to the semiconductor memory device 10 by using for data conversion between the three-dimensional ($\alpha,\beta,\gamma$) coordinate space and the two-dimensional (X,Y) coordinate space described above.

In addition, with the configuration of the first embodiment, even in a case where the memory cell stores 0.5-bit data in addition to k-bit data, the memory controller 20 can handle "2k+1"-bit data as a unit of access, so that access to the semiconductor memory device 10 is easy.

2. Second Embodiment

A semiconductor memory device 10 of the second embodiment will be described. In the second embodiment, specific operations of the write operation and the read operation in the semiconductor memory device 10 will be described. The configuration of the semiconductor memory device 10 of the second embodiment is similar to that of the first embodiment. In the second embodiment, points different from the first embodiment will be mainly described.

2.1 Write Operation

The write operation in the semiconductor memory device 10 of the second embodiment will be described. In the present embodiment, page 1 to "2k+1" data is stored by a combination A and a combination B included in a cell unit CU. For example, in a case where a memory cell corresponds to D3.5, the page 1 to "2k+1" data corresponds to page 1 to 7 data. In the write operation of the page 1 to "2k+1" data, an example of post-writing page "+1" data and an example of pre-writing page "+1" data will be described.

The page "+1" data is data in which page 0.5 data of page 1 data is written to the combination A and the remaining page 0.5 data is written to the combination B. The case of post-writing of the page "+1" data is, for example, in a case where the page "2k+1" data is seven pieces of page data, a case where the page 1 to 3 data are first written and then the page 4(+1) data and the page 5 to 7 data are sequentially written. The case of pre-writing of the page "+1" data is, for example, a case where the page 1 to 3 data and the page 4(+1) data are written first and then the page 5 to 7 data are written.

FIG. 20 is diagram illustrating page data in the write operation of the second embodiment. FIG. 20 illustrates a state of page data in post-writing and pre-writing in a case where the memory cell corresponds to D3.5 and the page "2k+1" data is seven pieces of page data.

In the case of post-writing, as illustrated in FIG. 20(*a*), the page 1 to 3 data are written first, next the page 4 data corresponding to page "+1" data is written, and then the page 5 to 7 data are written. The page 1 to 3 data are written to the combination A. Page 0.5 data of the page 4 data is written to the combination A and the remaining page 0.5 data is written to the combination B. Further, the page 5 to 7 data are written to the combination B.

In the case of pre-writing, as illustrated in FIG. 20(*b*), the page 1 to 3 data and the page 4 data corresponding to page "+1" data are written first, and then the page 5 to 7 data are written. The page 1 to 3 data are written to the combination A. Page 0.5 data of the page 4 data is written to the combination A and the remaining page 0.5 data is written to the combination B. Further, the page 5 to 7 data are written to the combination B.

Figure 21:
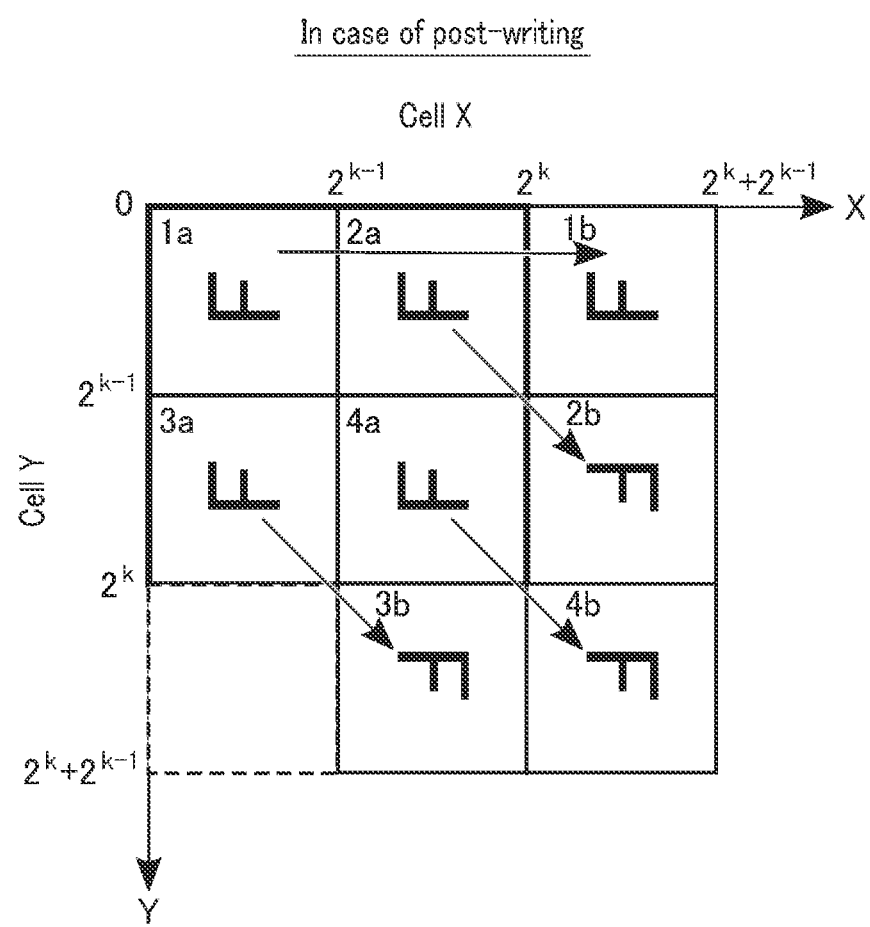
FIG. 21 is a diagram illustrating threshold voltages of a memory cell in post-writing according to the second embodiment.

Next, the write operation in the case of post-writing will be described. FIG. 21 is a diagram illustrating threshold voltages of the memory cells X and Y in the combinations A and B in the case of post-writing. The X-axis represents the threshold voltages of the memory cell X, and the Y-axis represents the threshold voltages of the memory cell Y.

In the post-writing, page k data to be written first is written using the threshold voltage of the memory cell X and the threshold voltage of the memory cell Y in the combination A. Next, the page 0.5 data of the page "+1" data is written using the threshold voltage of the memory cell X and the threshold voltage of the memory cell Y in the combination A. Further, the remaining page 0.5 data of the page "+1" data is written using the threshold voltage of the memory cell X and the threshold voltage of the memory cell Y in the combination B. Then, the page k data is written using the threshold voltage of the memory cell X and the threshold voltage of the memory cell Y in the combination B.

Figure 22:
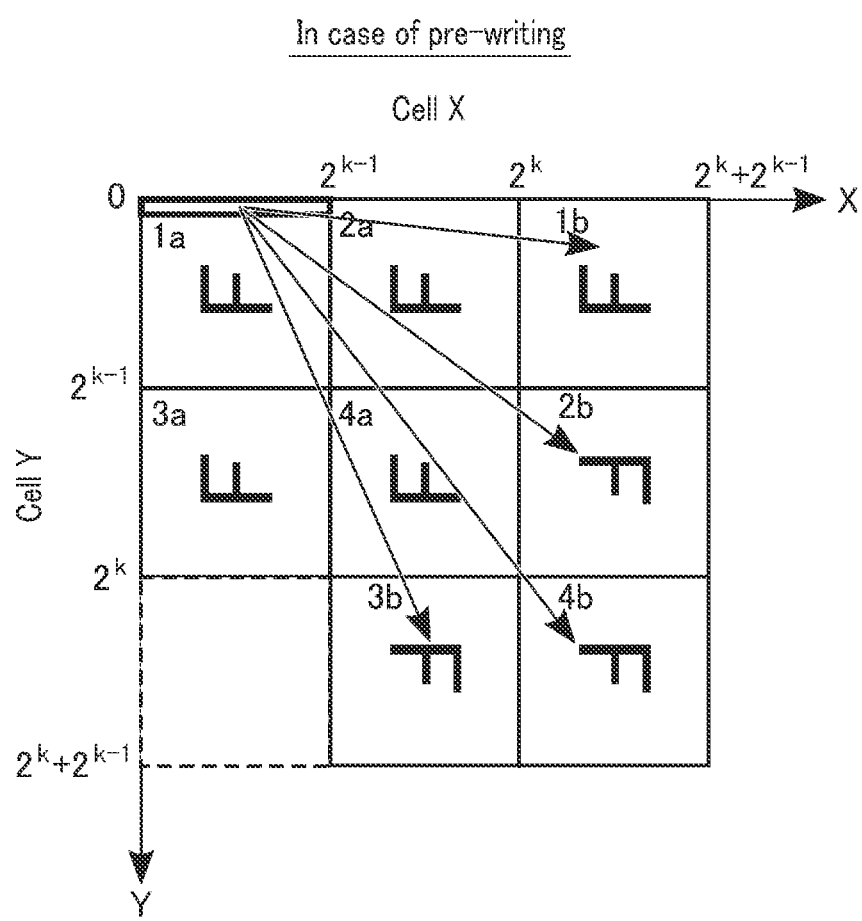
FIG. 22 is a diagram illustrating threshold voltages of a memory cell in pre-writing according to the second embodiment.

Next, the write operation in the case of pre-writing will be described. FIG. 22 is a diagram illustrating threshold voltages of the memory cells X and Y in the combinations A and B in the case of pre-writing. In the pre-writing, page k data and page 0.5 data of the page "+1" data to be written first are written using the threshold voltage of the memory cell X and the threshold voltage of the memory cell Y in the combination A. Further, the remaining page 0.5 data of the page "+1" data is written using the threshold voltage of the memory cell X and the threshold voltage of the memory cell Y in the combination B. Then, the page k data is written using the threshold voltage of the memory cell X and the threshold voltage of the memory cell Y in the combination B.

Next, the write operation in a case where the memory cell corresponds to D1.5 and the write operation in a case where the memory cell corresponds to D2.5 will be described.

First, the write operation in a case where the memory cell corresponds to D1.5 will be described. In a case where the memory cells X and Y correspond to D1.5, the memory cells X and Y of the combination A and the memory cells X and Y of the combination B can store "2·1+1=3"-bit (that is, $2^3$=8 ways) data. Therefore, the cell unit configured by the combinations A and B can store three pieces of page data.

FIG. 23 is diagram illustrating threshold tables in the write operation in a case where the memory cells X and Y of the combinations A and B correspond to D1.5. FIG. 23(*a*) illustrates a relationship between the values of the latch circuits ADL and ZDL of the sense amplifier unit connected to the memory cell X or Y and the threshold voltages. FIG. 23(*b*) is obtained by inverting the values illustrated in FIG. 23(*a*).

Hereinafter, for example, an example in which writing data is written in the order of page 1 (16 kB)→page 2 (8 kB+8 kB)→page 3 (16 kB) will be described. FIG. 24 is diagram illustrating threshold voltages (or states) of the memory cells X and Y of the combinations A and B in the write operation.

In a case where the first writing is executed, data corresponding to page 1 is written in the memory cells X and Y of the combination A as illustrated in FIG. 24(*a*). No writing is performed on the memory cells X and Y of the combination B.

Next, in a case where the second writing is executed, half of the data corresponding to page 2 is written in the memory cells X and Y of the combination A as illustrated in FIG. 24(*b*). Further, the remaining data of the data corresponding to page 2 is written to the memory cells X and Y of the combination B.

Next, in a case where the third writing is executed, data corresponding to page 3 is written in the memory cells X and Y of the combination B as illustrated in FIG. 24(*c*). No writing is performed on the memory cells X and Y of the combination A.

Positions 0, 1, 2, and 3 illustrated in FIG. 24 for writing in the above-described write operation are calculated by Formula (1) described below using the value of the latch circuit ADL illustrated in FIG. 23.

$$\text{Positions 0, 1, 2, and 3}: Y(\sim\!A)\cdot 2 + X(\sim\!A) \tag{1}$$

Note that, ~ represents an inverted value. For example, in Formula (1), ~A represents a value obtained by inverting A.

Further, positions 4, 5, 6, and 7 are positions obtained by moving the positions 0, 1, 2, and 3 according to the movement rule illustrated in FIG. 21. Specifically, the data at the position 4 is obtained by translating the data of the position 0. The data of the position 5 is obtained by rotating and moving the data of the position 1. In other words, the data of the position 5 is obtained by moving the data of the position 1 point-symmetrically. The data of the position 6 is obtained by rotating and moving the data of the position 2. In other words, the data of the position 6 is obtained by moving the data of the position 2 point-symmetrically. Further, the data of the position 7 is obtained by rotating and moving the data of the position 3. In other words, the data of the position 7 is obtained by moving the data of the position 3 point-symmetrically.

Hereinafter, specific examples of the write operation in a case where the memory cells X and Y correspond to D1.5 will be described in first to sixth examples.

Figure 25:
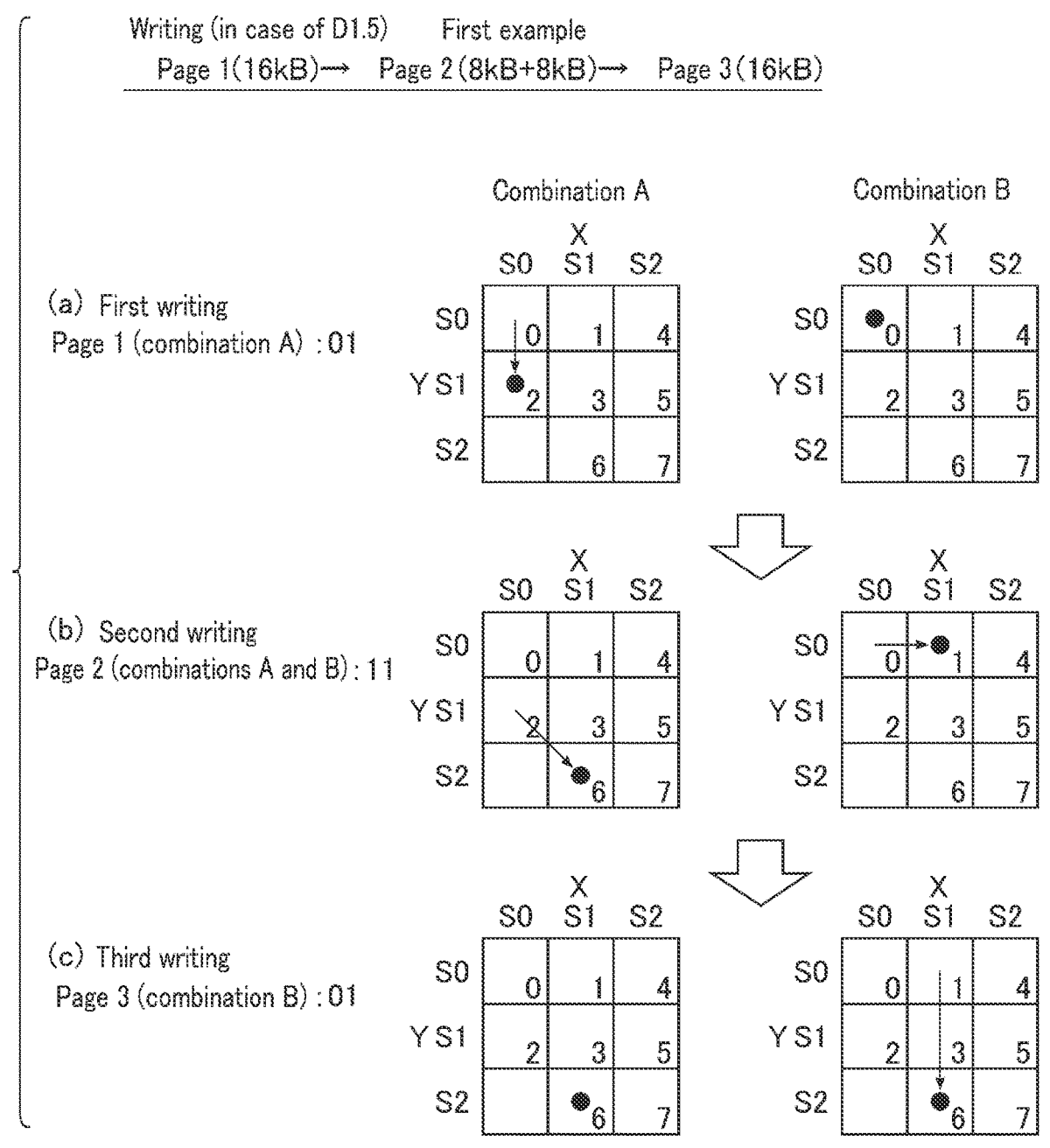

FIGS. 25A to 25C are diagrams illustrating a first example of the write operation in a case where the memory cells X and Y correspond to D1.5. The first example indicates a case where page 1: 01→page 2: 11→page 3: 01 are written in this order. This write operation is executed by the sequencer 14.

In the first writing, data: 01 corresponding to page 1 is input to the sense amplifier 17A. Then, as illustrated in FIG. 25(a), in the memory cells X and Y of the combination A, writing is performed at the position "2" where the state of the memory cell X is S0 and the state of the memory cell Y is S1. No writing is performed on the memory cells X and Y of the combination B, and the threshold voltages of the memory cells X and Y remain S0.

Next, in the second writing, data: 11 corresponding to page 2 is input to the sense amplifiers 17A and 17B. Then, as illustrated in FIG. 25(b), in the memory cells X and Y of the combination A, writing is performed at the position "6" where the state of the memory cell X is S1 and the state of the memory cell Y is S2. In the memory cells X and Y of the combination B, writing is performed at the position "1" where the state of the memory cell X is S1 and the state of the memory cell Y is S0.

Next, in the third writing, data: 00 corresponding to page 3 is input to the sense amplifier 17B. Then, as illustrated in FIG. 25(c), writing is not performed on the memory cells X and Y of the combination A, and the position "6" of the threshold voltage of the memory cells X and Y is maintained. In the memory cells X and Y of the combination B, writing is performed at the position "6" where the state of the memory cell X is S1 and the state of the memory cell Y is S2.

FIG. 26 is diagram illustrating a second example of the write operation in a case where the memory cells X and Y correspond to D1.5. The second example indicates a case where page 1: 10→page 2: 11→page 3: 00 are written in this order. This write operation is executed by the sequencer 14.

In the first writing, data: 10 corresponding to page 1 is input to the sense amplifier 17A. Then, as illustrated in FIG. 26(a), in the memory cells X and Y of the combination A, writing is performed at the position "1" where the state of the memory cell X is S1 and the state of the memory cell Y is S0. No writing is performed on the memory cells X and Y of the combination B, and the threshold voltages of the memory cells X and Y remain S0.

Next, in the second writing, data: 11 corresponding to page 2 is input to the sense amplifiers 17A and 17B. Then, as illustrated in FIG. 26(b), in the memory cells X and Y of the combination A, writing is performed at the position "5" where the state of the memory cell X is S2 and the state of the memory cell Y is S1. In the memory cells X and Y of the combination B, writing is performed at the position "1" where the state of the memory cell X is S1 and the state of the memory cell Y is S0.

Next, in the third writing, data: 00 corresponding to page 3 is input to the sense amplifier 17B. Then, as illustrated in FIG. 26(c), writing is not performed on the memory cells X and Y of the combination A, and the position "5" of the threshold voltage of the memory cells X and Y is maintained. In the memory cells X and Y of the combination B, writing is performed at the position "4" where the state of the memory cell X is S2 and the state of the memory cell Y is S0.

FIG. 27 is diagram illustrating a third example of the write operation in a case where the memory cells X and Y correspond to D1.5. The third example indicates a case where page 1: 01, page 2: 00, and page 3: 01 are written in this order. This write operation is executed by the sequencer 14.

In the first writing, data: 01 corresponding to page 1 is input to the sense amplifier 17A. Then, as illustrated in FIG. 27(a), in the memory cells X and Y of the combination A, writing is performed at the position "2" where the state of the memory cell X is S0 and the state of the memory cell Y is S1. No writing is performed on the memory cells X and Y of the combination B, and the threshold voltages of the memory cells X and Y remain S0.

Next, in the second writing, data: 00 corresponding to page 2 is input to the sense amplifiers 17A and 17B. Then, as illustrated in FIG. 27(b), writing is not performed on the memory cells X and Y of the combination A, and the position "2" of the threshold voltage of the memory cells X and Y is maintained. Writing is not performed on the memory cells X and Y of the combination B either, and the position "0" of the threshold voltage of the memory cells X and Y is maintained.

Next, in the third writing, data: 01 corresponding to page 3 is input to the sense amplifier 17B. Then, as illustrated in FIG. 27(c), writing is not performed on the memory cells X and Y of the combination A, and the position "2" of the threshold voltage of the memory cells X and Y is maintained. In the memory cells X and Y of the combination B, writing is performed at the position "2" where the state of the memory cell X is S0 and the state of the memory cell Y is S1.

FIG. 28 is diagram illustrating a fourth example of the write operation in a case where the memory cells X and Y correspond to D1.5. The fourth example indicates a case where page 1: 01, page 2: 11, and page 3: 10 are written in this order.

In the first writing, data: 01 corresponding to page 1 is input to the sense amplifier 17A. Then, as illustrated in FIG. 28(a), in the memory cells X and Y of the combination A, writing is performed at the position "2" where the state of the memory cell X is S0 and the state of the memory cell Y is S1. No writing is performed on the memory cells X and Y of the combination B, and the threshold voltages of the memory cells X and Y remain S0.

Next, in the second writing, data: 11 corresponding to page 2 is input to the sense amplifiers 17A and 17B. Then, as illustrated in FIG. 28(b), in the memory cells X and Y of the combination A, writing is performed at the position "6" where the state of the memory cell X is S1 and the state of the memory cell Y is S2. In the memory cells X and Y of the combination B, writing is performed at the position "1" where the state of the memory cell X is S1 and the state of the memory cell Y is S0.

Next, in the third writing, data: 10 corresponding to page 3 is input to the sense amplifier 17B. Then, as illustrated in FIG. 28(c), writing is not performed on the memory cells X and Y of the combination A, and the position "6" of the threshold voltage of the memory cells X and Y is maintained. In the memory cells X and Y of the combination B, writing is performed at the position "6" where the state of the memory cell X is S1 and the state of the memory cell Y is S2.

FIG. 29 is diagram illustrating a fifth example of the write operation in a case where the memory cells X and Y correspond to D1.5. The fifth example indicates a case where page 1: 01, page 2: 01, and page 3: 10 are written in this order.

In the first writing, data: 01 corresponding to page 1 is input to the sense amplifier 17A. Then, as illustrated in FIG. 29(a), in the memory cells X and Y of the combination A, writing is performed at the position "2" where the state of the memory cell X is S0 and the state of the memory cell Y is S1. No writing is performed on the memory cells X and Y of the combination B, and the threshold voltages of the memory cells X and Y remain S0.

Next, in the second writing, data: 01 corresponding to page 2 is input to the sense amplifiers 17A and 17B. Then, as illustrated in FIG. 29(b), writing is not performed on the memory cells X and Y of the combination A, and the position "2" of the threshold voltage of the memory cells X and Y is maintained. In the memory cells X and Y of the combination B, writing is performed at the position "1" where the state of the memory cell X is S1 and the state of the memory cell Y is S0.

Next, in the third writing, data: 10 corresponding to page 3 is input to the sense amplifier 17B. Then, as illustrated in FIG. 29(c), writing is not performed on the memory cells X and Y of the combination A, and the position "2" of the threshold voltage of the memory cells X and Y is maintained. In the memory cells X and Y of the combination B, writing is performed at the position "6" where the state of the memory cell X is S1 and the state of the memory cell Y is S2.

Figure 30:
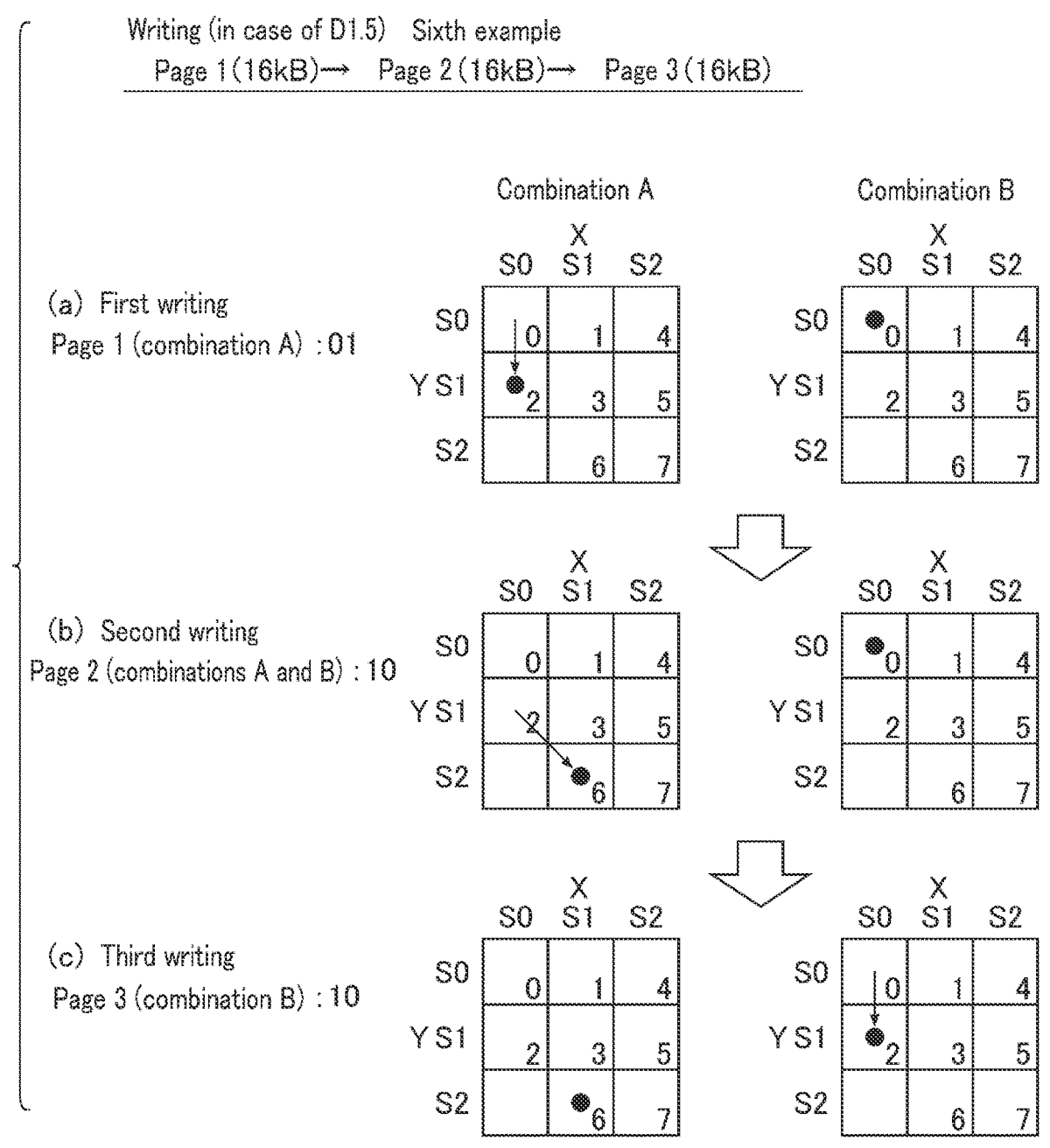

FIG. 30 is diagram illustrating a sixth example of the write operation in a case where the memory cells X and Y correspond to D1.5. The sixth example indicates a case where page 1: 01, page 2: 10, and page 3: 10 are written in this order.

In the first writing, data: 01 corresponding to page 1 is input to the sense amplifier 17A. Then, as illustrated in FIG. 30(a), in the memory cells X and Y of the combination A, writing is performed at the position "2" where the state of the memory cell X is S0 and the state of the memory cell Y is S1. No writing is performed on the memory cells X and Y of the combination B, and the threshold voltages of the memory cells X and Y remain S0.

Next, in the second writing, data: 10 corresponding to page 2 is input to the sense amplifiers 17A and 17B. Then, as illustrated in FIG. 30(b), in the memory cells X and Y of the combination A, writing is performed at the position "6" where the state of the memory cell X is S1 and the state of the memory cell Y is S2. Writing is not performed on the memory cells X and Y of the combination B, and the position "0" of the threshold voltage of the memory cells X and Y is maintained.

Next, in the third writing, data: 10 corresponding to page 3 is input to the sense amplifier 17B. Then, as illustrated in FIG. 30(c), writing is not performed on the memory cells X and Y of the combination A, and the position "6" of the threshold voltage of the memory cells X and Y is main-
tained. In the memory cells X and Y of the combination B, writing is performed at the position "2" where the state of the memory cell X is S0 and the state of the memory cell Y is S1.

Next, the write operation in a case where the memory cell corresponds to D2.5 will be described. In a case where the memory cells X and Y correspond to D2.5, the memory cells X and Y of the combination A and the memory cells X and Y of the combination B can store "2·2+1=5"-bit (that is, $2^5$=32 ways) data. Therefore, the cell unit configured by the combinations A and B can store five pieces of page data.

Figure 31:
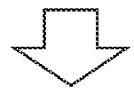
FIG. 31 is a diagram illustrating threshold tables in the write operation in a case where the memory cell corresponds to D2.5 according to the second embodiment.

FIG. 31 is diagram illustrating threshold tables in the write operation in a case where the memory cells X and Y of the combinations A and B correspond to D2.5. FIG. 31(a) illustrates a relationship between the values of the latch circuits ADL, BDL, and ZDL of the sense amplifier unit connected to the memory cell X or Y and the threshold voltages. FIG. 31(b) is obtained by inverting the values illustrated in FIG. 31(a).

Hereinafter, for example, an example in which writing data is written in the order of page 1 (16 kB) and page 2 (16 kB)→page 3 (8 kB+8 kB)→page 4 (16 kB) and page 5 (16 kB) will be described. FIG. 32 is diagram illustrating threshold voltages (or states) of the memory cells X and Y of the combinations A and B in the write operation.

In a case where the first writing is executed, data corresponding to page 1 and page 2 is written in the memory cells X and Y of the combination A as illustrated in FIG. 32(a). No writing is performed on the memory cells X and Y of the combination B.

Next, in a case where the second writing is executed, half of the data corresponding to page 3 is written in the memory cells X and Y of the combination A as illustrated in FIG. 32(b). Further, the remaining data of the data corresponding to page 3 is written to the memory cells X and Y of the combination B.

Next, in a case where the third writing is executed, data corresponding to page 4 and page 5 is written in the memory cells X and Y of the combination B as illustrated in FIG. 32(c). No writing is performed on the memory cells X and Y of the combination A.

Positions 0, 1, 2, . . . , and 15 illustrated in FIG. 32 for writing in the above-described write operation are calculated by Formula (2) described below using the values of the latch circuits ADL and BDL illustrated in FIG. 31.

$$\text{Positions 0 to 15: } Y(\sim A)\cdot 8 + Y(\sim B)\cdot 4 + X(\sim A)\cdot 2 + X(\sim B) \quad (2)$$

Note that, ~ represents an inverted value. For example, in Formula (2), ~A represents a value obtained by inverting A.

Further, positions 16, 17, 18, . . . , and 31 are positions obtained by moving the positions 0 to 15 according to the movement rule illustrated in FIG. 21. Specifically, the data of the position 16 is obtained by translating the data of the position 0. The data of the position 17 is obtained by translating the data of the position 1. The data of the position 18 is obtained by rotating and moving the data of the position 2. In other words, the data of the position 18 is obtained by moving the data of the position 2 point-symmetrically. The data of the position 19 is obtained by rotating and moving the data of the position 3. In other words, the data of the position 19 is obtained by moving the data of the position 3 point-symmetrically. Similarly, the data of the positions 20 to 31 is obtained by translating or rotating and moving the data of the positions 4 to 15.

Hereinafter, specific examples of the write operation in a case where the memory cells X and Y correspond to D2.5 will be described in first and second examples.

Figure 33:
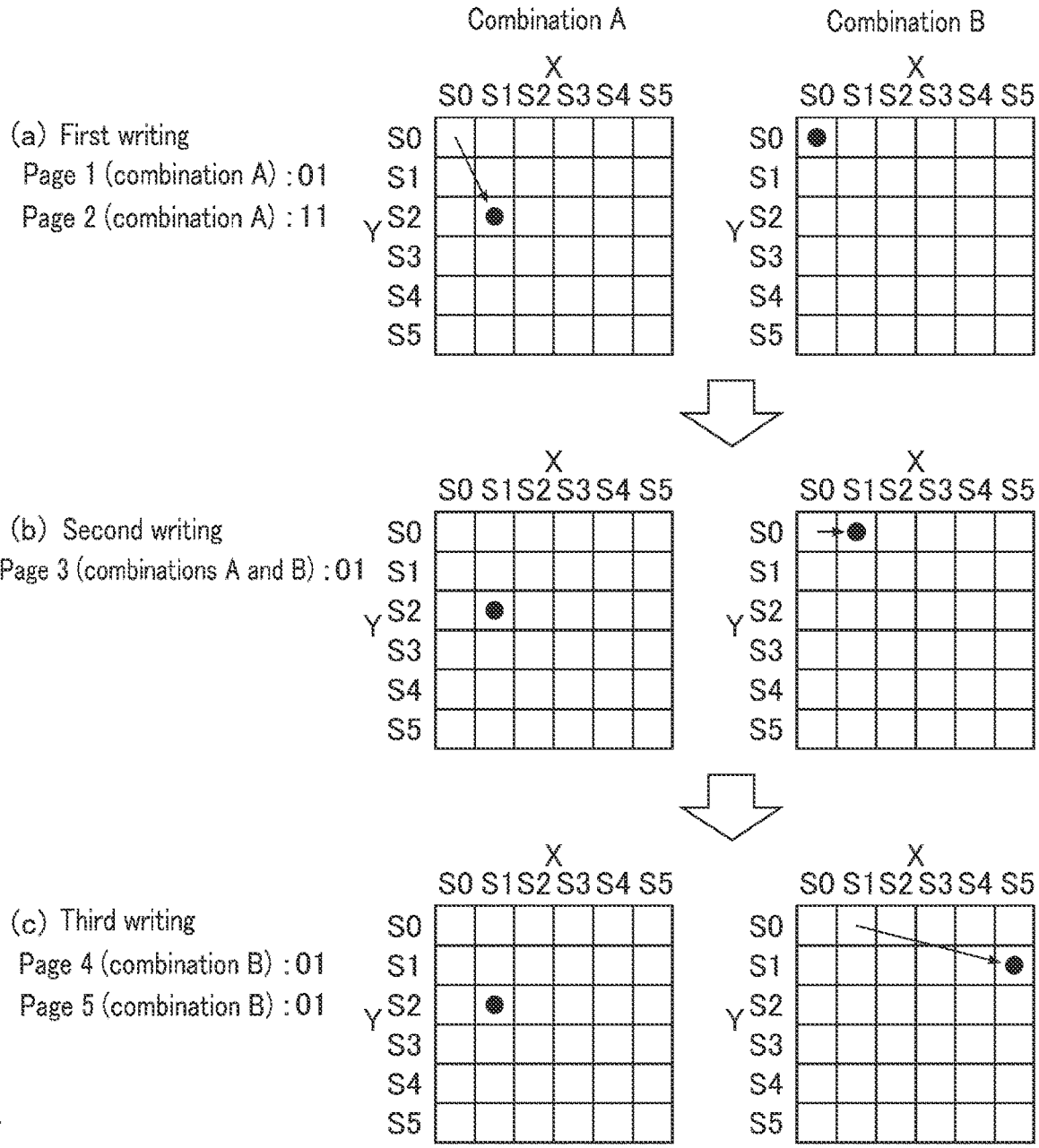
FIG. 33 is a diagram illustrating a first example of the write operation in a case where the memory cell corresponds to D2.5 according to the second embodiment.

FIG. 33 is diagram illustrating a first example of the write operation in a case where the memory cells X and Y correspond to D2.5. The first example indicates a case where page 1: 01 and page 2: 11 →page 3: 01→page 4: 01 and page 5: 01 are written in this order. This write operation is executed by the sequencer 14. States S0, S1, S2, and S3 of the memory cells X and Y correspond to page data 00, 01, 11, and 10, respectively.

In the first writing, data: 01 corresponding to page 1 and data: 11 corresponding to page 2 are input to the sense amplifier 17A. Then, as illustrated in FIG. 33(a), in the memory cells X and Y of the combination A, writing is performed at the position where the state of the memory cell X is S1 and the state of the memory cell Y is S2. No writing is performed on the memory cells X and Y of the combination B, and the threshold voltages of the memory cells X and Y remain S0.

In the second writing, data: 01 corresponding to page 3 is input to the sense amplifiers 17A and 17B. Then, as illustrated in FIG. 33(b), writing is not performed on the memory cells X and Y of the combination A, and threshold voltages of the memory cells X and Y remain S1 and S2, respectively. In the memory cells X and Y of the combination B, writing is performed at the position where the state of the memory cell X is S1 and the state of the memory cell Y is S0.

In the third writing, data: 01 corresponding to page 4 and data: 01 corresponding to page 5 are input to the sense amplifier 17B. Then, as illustrated in FIG. 33(c), writing is not performed on the memory cells X and Y of the combination A, and the threshold voltages of the memory cells X and Y remain S1 and S2, respectively. In the memory cells X and Y of the combination B, writing is performed at the position where the state of the memory cell X is S5 and the state of the memory cell Y is S1.

Figure 34:
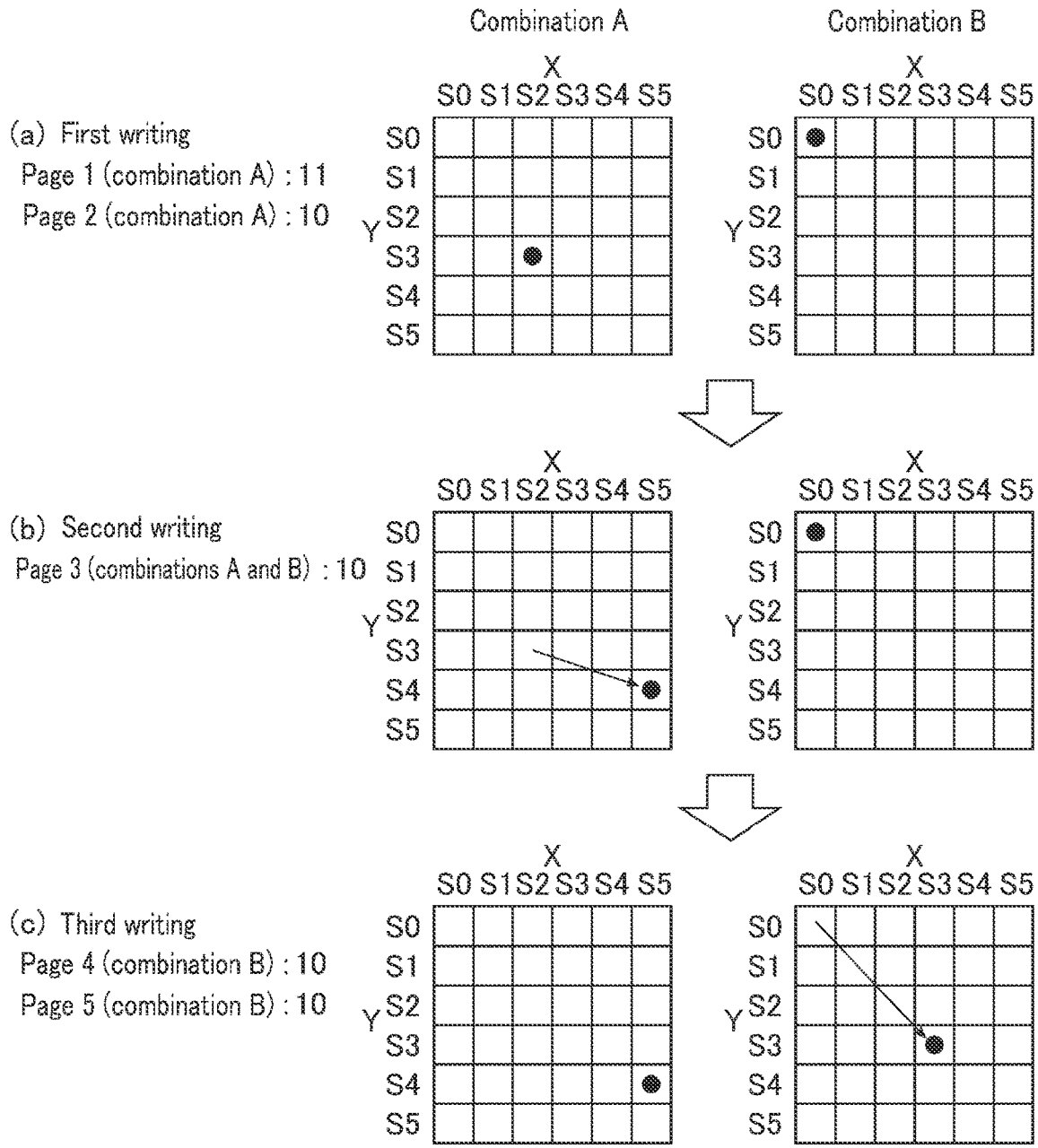
FIG. 34 is a diagram illustrating a second example of the write operation in a case where the memory cell corresponds to D2.5 according to the second embodiment.

FIG. 34 is diagram illustrating a second example of the write operation in a case where the memory cells X and Y correspond to D2.5. The second example indicates a case where page 1: 11 and page 2: 10→page 3: 10→page 4: 10 and page 5: 10 are written in this order. This write operation is executed by the sequencer 14.

In the first writing, data: 11 corresponding to page 1 and data: 10 corresponding to page 2 are input to the sense amplifier 17A. Then, as illustrated in FIG. 34(a), in the memory cells X and Y of the combination A, writing is performed at the position where the state of the memory cell X is S2 and the state of the memory cell Y is S3. No writing is performed on the memory cells X and Y of the combination B, and the threshold voltages of the memory cells X and Y remain S0.

In the second writing, data: 10 corresponding to page 3 is input to the sense amplifiers 17A and 17B. Then, as illustrated in FIG. 34(b), in the memory cells X and Y of the combination A, writing is performed at the position where the state of the memory cell X is S5 and the state of the memory cell Y is S4. No writing is performed on the memory cells X and Y of the combination B, and the threshold voltages of the memory cells X and Y remain S0.

In the third writing, data: 10 corresponding to page 4 and data: 10 corresponding to page 5 are input to the sense amplifier 17B. Then, as illustrated in FIG. 34(c), writing is not performed on the memory cells X and Y of the combination A, and the threshold voltages of the memory cells X and Y remain S5 and S4, respectively. In the memory cells X and Y of the combination B, writing is performed at the position where the state of the memory cell X is S3 and the state of the memory cell Y is S3.

Note that in writing from page 1 data to page "2k+1" data, in a case where writing up to page 1 to "2k" data is performed first and writing of page "+1" data is performed subsequently, the threshold voltage range by writing is as described below. Here, an example of a case where the memory cell corresponds to D3.5 will be described. The latch circuits of the sense amplifier 17A (or 17B) used in this write operation are ADL, BDL, and CDL.

FIG. 35 is diagram illustrating threshold voltage ranges of the memory cells X and Y used in writing from page 1 data to page "2k+1" data. FIG. 36 is threshold tables illustrating a correspondence between values of latch circuits and threshold voltages (or states) in writing of page 1 to "2k+1" data.

In the writing from the page 1 data to the page "2k" data, as illustrated in FIG. 35(a) and FIG. 36(a), in the memory cells X and Y, writing is performed on any of states S0 to S7 according to the values of the latch circuits ADL, BDL, and CDL.

Subsequently, in the writing of the page "+1" data, as illustrated in FIG. 35(b) and FIG. 36(b), in the memory cells X and Y, writing is performed on any of states S4 to S11 according to the values of the latch circuits ADL, BDL, and CDL.

As described above, in a case where the threshold voltage range used in the write operation is from 0 to $2^k$ and from $2^{k-1}$ to $2^k+2^{k-1}$, writing can be performed only with the number of latch circuits used in a case where the memory cell corresponds to Dk. Thus, even in a case where the page 1 to "2k+1" data is written, the writing can be performed only with the latch circuit used for writing the page 1 to "2k" data, and it is not necessary to add a latch circuit.

Next, the writing timing in the write operation of the second embodiment will be described. Here, the writing timing in a case where the memory cell corresponds to D3.5 will be described. For example, in a case where the memory cell corresponds to D3, writing is performed in units of three pages, and thus, even in a case where the memory cell corresponds to D3.5, writing in units of similar pages is suitable. That is, in the present embodiment, for example, writing is executed in units of three pages or in units of four pages. This writing timing is controlled by the sequencer 14.

Figure 37:
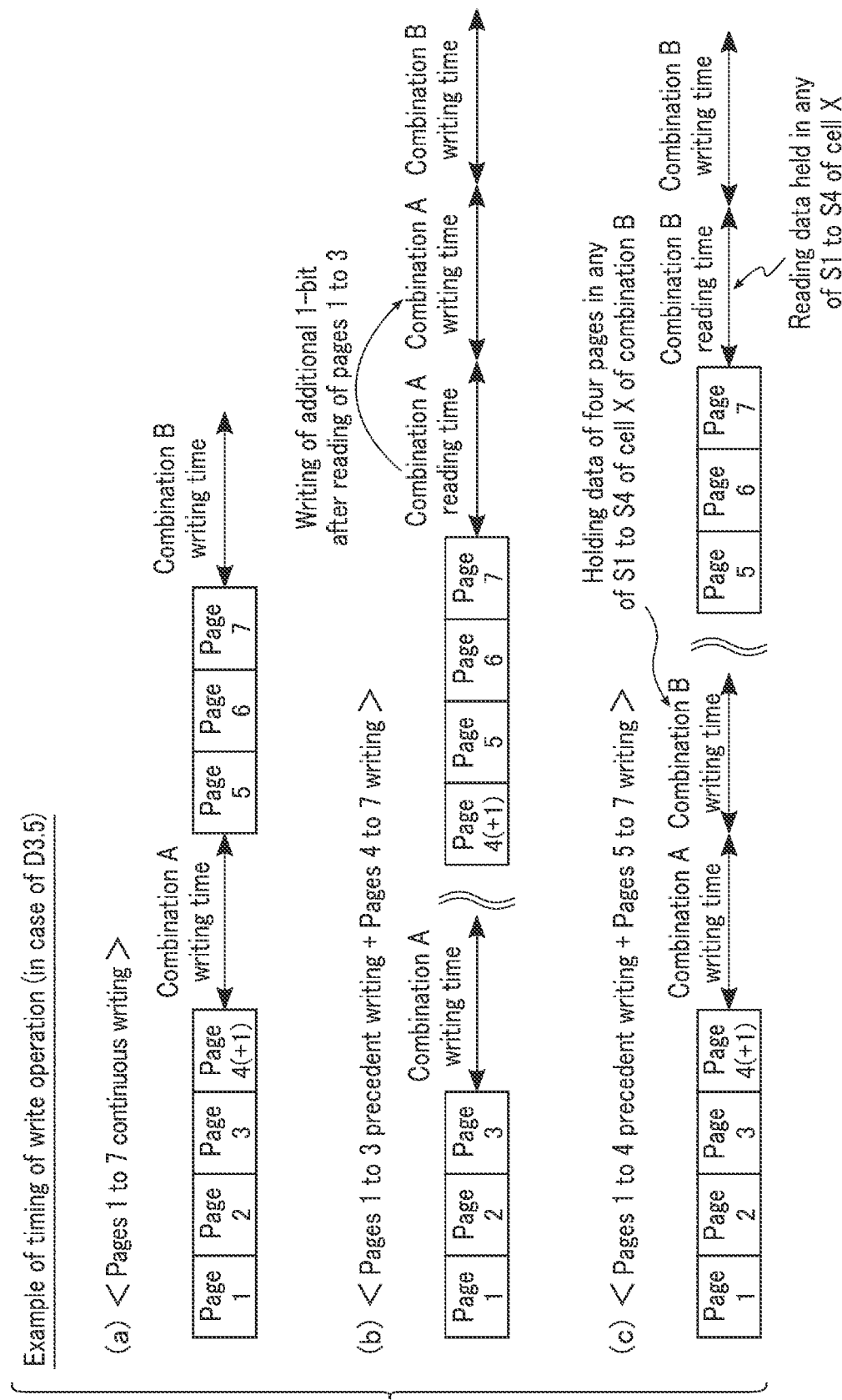
FIG. 37 is a diagram illustrating writing timings of page data in the write operation according to the second embodiment.

First, an example in which page 1 to 7 data are continuously written in the write operation in a case where the memory cell corresponds to D3.5 will be described. FIG. 37(a) is a diagram illustrating writing timings in a case where page 1 to 7 data are continuously written in the second embodiment.

As illustrated in FIG. 37(a), in the continuous writing of page 1 to 7 data, first, the page 1 to 3 data and the data of a half page of the page 4(+1) data are written to the combination A, and the data of the remaining half page of the page 4(+1) data is written to the combination B. Next, the page 5 to 7 data are written to the combination B.

Next, an example in which page 1 to 3 data are written first and page 4 to 7 data are written subsequently in the write operation in a case where the memory cell corresponds to D3.5 will be described. FIG. 37(b) is a diagram illustrating writing timings in a case where page 1 to 3 data are written precedently and page 4 to 7 data are written subsequently in the second embodiment.

As illustrated in FIG. 37(b), the page 1 to 3 data are first written to the combination A. Subsequently, the written page 1 to 3 data are read from the combination A, and page data in which the data of a half page of the page 4(+1) data is added to the read page 1 to 3 data is written again to the combination A. Next, the data of the remaining half page of the page 4(+1) data and the page 5 to 7 data are written to the combination B.

Next, an example in which page 1 to 4 data are written first and page 5 to 7 data are written subsequently in the write operation in a case where the memory cell corresponds to D3.5 will be described. FIG. 37(c) is a diagram illustrating writing timings in a case where page 1 to 4 data are written precedently and page 5 to 7 data are written subsequently in the second embodiment.

As illustrated in FIG. 37(c), first, the page 1 to 3 data and the data of a half page of the page 4(+1) data are written to the combination A. Subsequently, the data of the remaining half page of the page 4(+1) data is written to, for example, any of S0 to S3 of the memory cell X of the combination B. Next, data written to any of S0 to S3 of the memory cell X in the combination B is read, and the read data and the page 5 to 7 data are written to the combination B.

Next, continuous writing of page 1 to 7 data, precedent writing of page 1 to 3 data, and precedent writing of page 1 to 4 data described above will be described in more detail.

Figure 40:
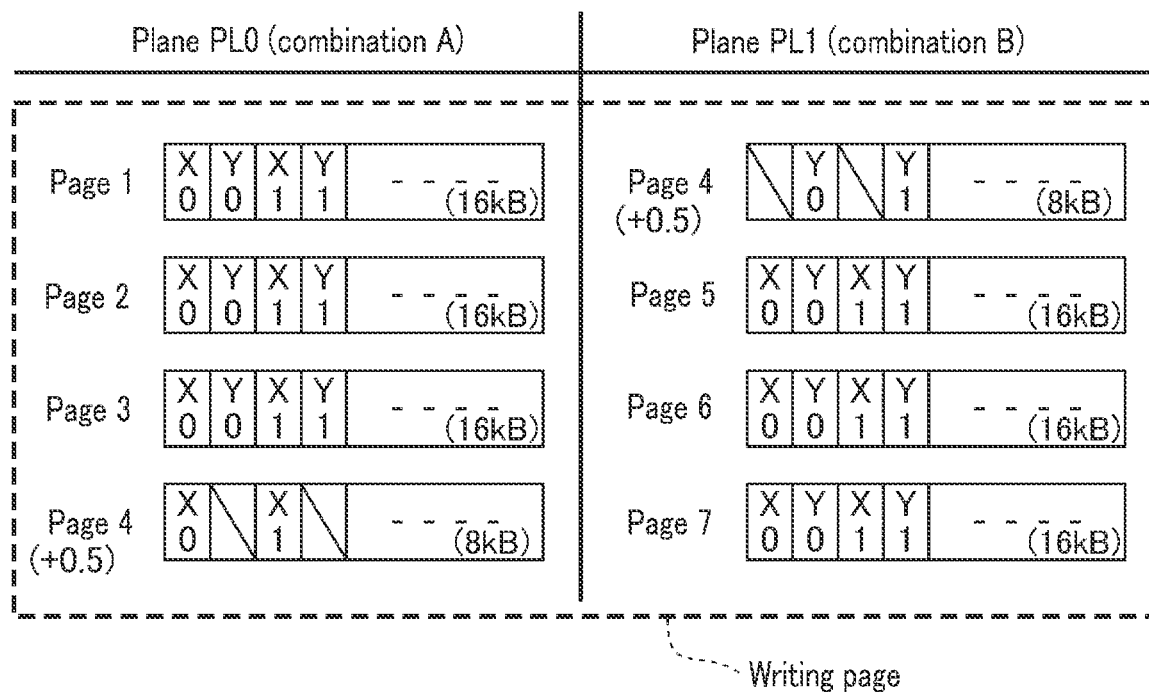
FIG. 40 is a diagram illustrating a writing page in continuous writing according to the second embodiment.

First, an example of executing continuous writing of page 1 to 7 data will be described. FIG. 38 is diagram illustrating writing timings in a case where the continuous writing of page 1 to 7 data is executed. FIG. 38(a) illustrates an example in which the writing page is divided by the combination A of the plane PL0 and the combination B of the plane PL1 in the continuous writing of page 1 to 7 data. FIG. 38(b) illustrates an example in which the writing page is divided by the combination A of the word line WL0 and the combination B of the word line WL1. FIG. 39 is diagram illustrating writing ranges of the combinations A and B in a case where the continuous writing of page 1 to 7 data is executed. FIG. 40 is a diagram illustrating a writing page of the combinations A and B in a case where the continuous writing of page 1 to 7 data is executed. This writing timing is controlled by the sequencer 14.

As illustrated in FIGS. 38(a) and 40, in the example in which the writing page is divided by the combination A of the plane PL0 and the combination B of the plane PL1, the page 1 to 3 data are written to the combination A of the plane PL0, and the page 4(+1) data is divided by half and written to the combination A of the plane PL0 and the combination B of the plane PL1. Further, the page 5 to 7 data are written to the combination B of the plane PL1. As illustrated in FIGS. 39(a) and 39(b), the writing range of the memory cells X and Y of the combinations A and B is a range from 0 to $2^k + 2^{k-1}$ (k=3), that is, states S0 to S11.

As illustrated in FIG. 38(b), in the example in which the writing page is divided by the combination A of the word line WL0 and the combination B of the word line WL1, the page 1 to 3 data and the data of a half page of the page 4(+1) data are written to the combination A of the word line WL0. Data of the remaining half page of the page 4(+1) data is stored in the latch circuit of the sense amplifier 17A (or 17B). Further, the page 5 to 7 data and the data of the remaining half page of the page 4(+1) data stored in the latch circuit are written to the combination B of the plane PL1. As illustrated in FIGS. 39(a) and 39(b), the writing range of the memory cells X and Y of the combinations A and B is a range from 0 to $2^k + 2^{k-1}$ (k=3), that is, states S0 to S11.

Next, an example in which page 1 to 3 data are written first and page 4 to 7 data are written subsequently will be described. FIG. 41 is diagram illustrating writing timings in a case where page 1 to 3 data are written first and page 4 to 7 data are written subsequently. FIG. 41(a) illustrates an example in which the writing page is divided by the combination A of the plane PL0 and the combination B of the plane PL1 in a case where the page 1 to 3 data are written first and the page 4 to 7 data are written subsequently. FIG. 41(b) illustrates an example in which the writing page is divided by the combination A of the word line WL0 and the combination B of the word line WL1. FIG. 42 is diagram illustrating a writing range of the combinations A and B in a case where the page 1 to 3 data are written first and the page 4 to 7 data are written subsequently. FIG. 43 is a diagram illustrating a writing page of the combinations A and B in a case where the page 1 to 3 data are written first and the page 4 to 7 data are written subsequently. This writing timing is controlled by the sequencer 14.

As illustrated in FIGS. 41(a) and 43, in the example in which the writing page is divided by the combination A of the plane PL0 and the combination B of the plane PL1, the page 1 to 3 data are written to the combination A of the plane PL0. Subsequently, the data of a half page of the page 4(+1) data is written to the combination A of the plane PL0, and the data of the remaining half page of the page 4(+1) data is written to the combination B of the plane PL1. Further, the page 5 to 7 data are written to the combination B of the plane PL1. In the writing of the page 1 to 3 data, the writing range of the memory cells X and Y of the combination A is 0 to $2^k$ (k=3), that is, a range of states S0 to S7 as illustrated in FIG. 42(a). In addition, writing of the page 1 to 3 data and writing of the page 5 to 7 data can be executed in parallel.

As illustrated in FIG. 41(b), in the example in which the writing page is divided by the combination A of the word line WL0 and the combination B of the word line WL1, the page 1 to 3 data are written to the combination A of the word line WL0. Subsequently, the data of a half page of the page 4(+1) data is written to the combination A of the word line WL0, and the data of the remaining half page of the page 4(+1) data is written to the combination B of the word line WL1. Further, the page 5 to 7 data are written to the combination B of the word line WL1. In the writing of the page 1 to 3 data, the writing range of the memory cells X and Y of the combination A is 0 to $2^k$ (k=3), that is, a range of states S0 to S7 as illustrated in FIG. 42(a). In addition, writing of the page 5 to 7 data is sequentially executed after end of writing of the page 1 to 3 data.

Next, an example in which the page 1 to 4 data are written first and the page 5 to 7 data are written subsequently will be described. FIG. 44 is diagram illustrating writing timings in a case where page 1 to 4 data are written first and page 5 to 7 data are written subsequently. FIG. 44(a) illustrates an example in which the writing page is divided by the combination A of the plane PL0 and the combination B of the plane PL1 in a case where the page 1 to 4 data are written first and the page 5 to 7 data are written subsequently. FIG. 44(b) illustrates an example in which the writing page is divided by the combination A of the word line WL0 and the combination B of the word line WL1. FIG. 45 is diagram illustrating writing ranges of the combinations A and B in a case where page 1 to 4 data are written first and page 5 to 7 data are written subsequently. FIG. 46 is a diagram illustrating writing pages of the combinations A and B in a case where page 1 to 4 data are written first and page 5 to 7 data are written subsequently. This writing timing is controlled by the sequencer 14.

As illustrated in FIGS. 44(a) and 46, in the example where the writing page is divided by the combination A of the plane PL0 and the combination B of the plane PL1, the page 1 to 3 data and the data of a half page of the page 4(+1) data are written to the combination A of the plane PL0, and the data of the remaining half page of the page 4(+1) data is written to, for example, any of S0 to S3 of the memory cell X of the combination B of the plane PL1. Next, data written to any of S0 to S3 of the memory cell X in the combination B is read, and the read data and the page 5 to 7 data are written to the combination B of the plane PL1. In the writing of the page 1 to 4(+1) data, the writing range of the memory cells X and Y of the combination A is 0 to $2^k+2^{k-1}$ (k=3), that is, a range of states S0 to S11 as illustrated in FIG. 45(a). In the writing of the page 4(+1) data, the writing range of the memory cells X and Y of the combination B is 0 to $2^{k-1}$ (k=3), that is, a range of states S0 to S3 as illustrated in FIG. 45(b). In addition, the writing of the data of the remaining half page of the page 4(+1) data can be executed in parallel with the writing of the page 1 to 3 data and the data of the half page of the page 4(+1) data.

As illustrated in FIG. 44(b), in the example where the writing page is divided by the combination A of the word line WL0 and the combination B of the word line WL1, the page 1 to 3 data and the data of a half page of the page 4(+1) data are written to the combination A of the word line WL0, and the data of the remaining half page of the page 4(+1) data is written to, for example, any of S0 to S3 of the memory cell X of the combination B of the word line WL1. Next, data written to any of S0 to S3 of the memory cell X in the combination B is read, and the read data and the page 5 to 7 data are written to the combination B of the word line WL1. In the writing of the page 1 to 4(+1) data, the writing range of the memory cells X and Y of the combination A is 0 to $2^k+2^{k-1}$ (k=3), that is, a range of states S0 to S11 as illustrated in FIG. 45(a). In the writing of the page 4(+1) data, the writing range of the memory cells X and Y of the combination B is 0 to $2^{k-1}$ (k=3), that is, a range of states S0 to S3 as illustrated in FIG. 45(b). In addition, the writing of the data of the remaining half page of the page 4(+1) data is sequentially executed after end of the writing of the page 1 to 3 data and the data of the half page of the page 4(+1) data.

Figure 49:
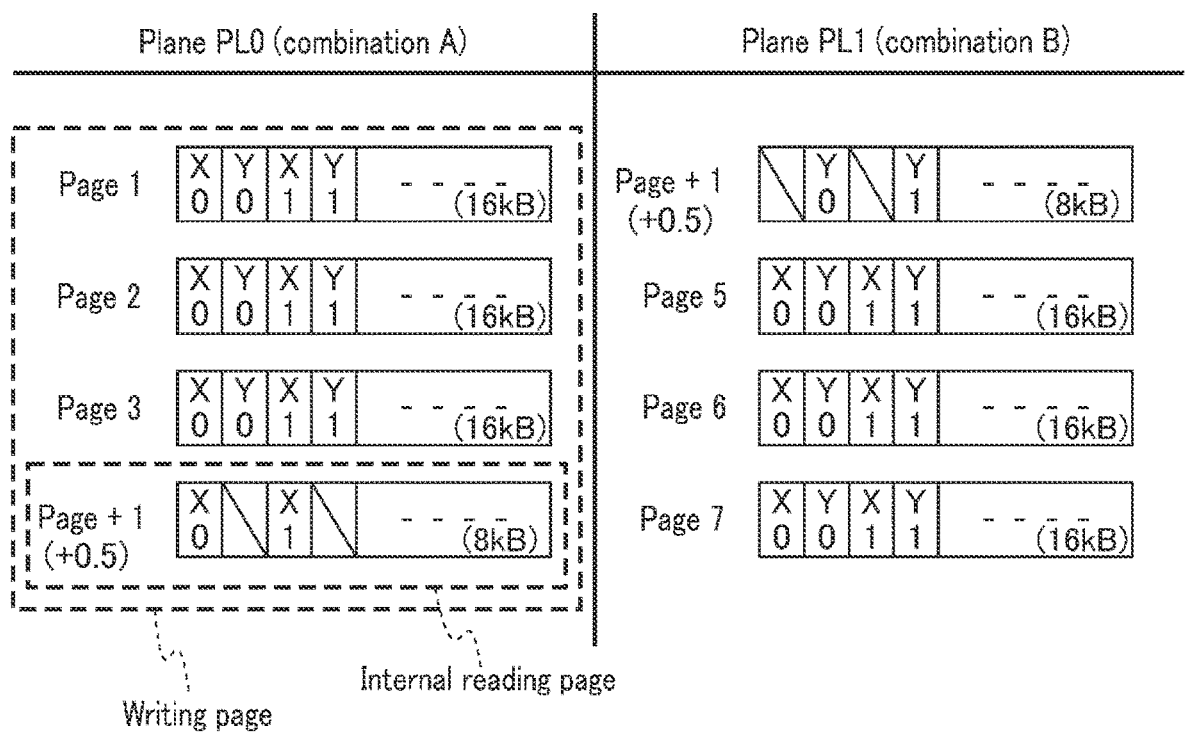
FIG. 49 is a diagram illustrating a writing page and a reading page in a case where page "+1" data is written first and page data is written subsequently according to the second embodiment.

Next, an example of performing post-writing of page 1 to 3 data in a state where page data corresponding to page "+1" has been written at the time of the write operation will be described. For example, a case where the memory cell corresponds to D3.5 will be described. FIG. 47 is diagram illustrating writing timings in a case where page data corresponding to page "+1" is written first and page 1 to 3 data are written subsequently. FIG. 48 is diagram illustrating a writing range of the combinations A and B in a case where page data corresponding to page "+1" is written first and page 1 to 3 data are written subsequently. FIG. 49 is a diagram illustrating a writing page and a reading page of the combinations A and B in a case where page data corresponding to page "+1" is written first and page 1 to 3 data are written subsequently. This write operation is controlled by the sequencer 14.

As illustrated in FIGS. 47(a) and 49, in the example in which the page data is written to the combination A of the plane PL0, first, the data written to any of S0 to S3 of the memory cell X of the combination A is read as illustrated in FIG. 48(a) in order to acquire the page data corresponding to the page "+1". The voltage level of the read voltage used in this reading may be one. Subsequently, the read data and the page 1 to 3 data are written to the combination A of the plane PL0. That is, first, page data corresponding to the page "+1" written to the combination A is read, and subsequently, writing to the combination A of the plane PL0 is executed based on the read page data corresponding to the page "+1" and the page 1 to 3 data.

As illustrated in FIG. 47(b), in the example in which the page data is written to the combination A of the word line WL0, first, the data written to any of S0 to S3 of the memory cell X of the combination A is read as illustrated in FIG. 48(a) in order to acquire the page data corresponding to the page "+1". The voltage level of the read voltage used in this reading may be one. Subsequently, the read data and the page 1 to 3 data are written to the combination A of the word line WL0. That is, first, page data corresponding to the page "+1" written to the combination A is read, and subsequently, writing to the combination A of the word line WL0 is executed based on the read page data corresponding to the page "+1" and the page 1 to 3 data.

Figure 52:
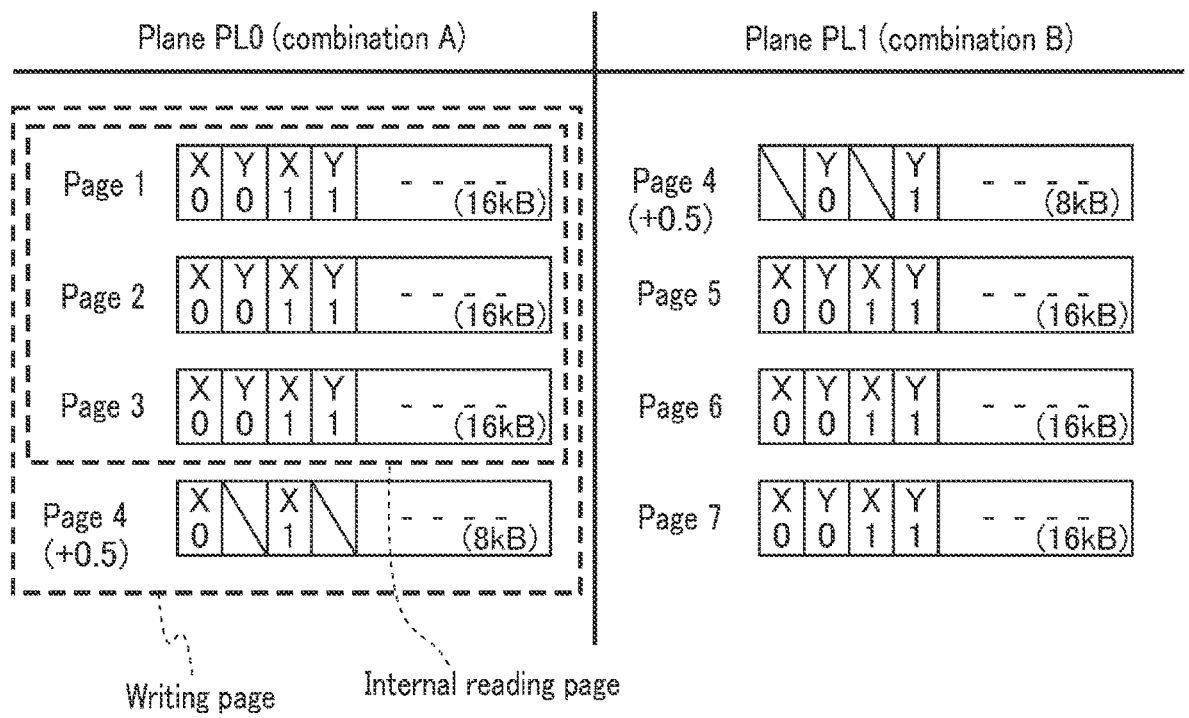
FIG. 52 is a diagram illustrating a writing page and a reading page in a case where page data is written first and page "+1" data is written subsequently according to the second embodiment.

Next, an example of performing post-writing of page 4 data corresponding to page "+1" in a state where page 1 to 3 data have been written at the time of the write operation will be described. FIG. 50 is diagram illustrating writing timings in a case where page 1 to 3 data are written first and page 4 data corresponding to page "+1" is written subsequently. FIG. 51 is diagram illustrating a writing range of the combinations A and B in a case where page 1 to 3 data are written first and page 4 data corresponding to page "+1" is written subsequently. FIG. 52 is a diagram illustrating a writing page and a reading page of the combinations A and B in a case where page 1 to 3 data are written first and page 4 data corresponding to page "+1" is written subsequently. This write operation is controlled by the sequencer 14.

As illustrated in FIGS. 50(a) and 52, in the example in which the page data is written to the combination A of the plane PL0, first, the data written to 0 to $2^k$ (k=3), that is, states S0 to S7 of the memory cells X and Y of the combination A is read as illustrated in FIG. 51(a) in order to acquire the page 1 to 3 data. In this reading, seven voltage levels are used as the read voltage. Subsequently, the read page 1 to 3 data and the page 4 data corresponding to the page "+1" are written to the combination A of the plane PL0. That is, first, the page 1 to 3 data written to the combination A are read, and subsequently, writing to the combination A of the plane PL0 is executed based on the read page 1 to 3 data and the page 4 data corresponding to page "+1".

As illustrated in FIG. 50(b), in the example in which the page data is written to the combination A of the word line WL0, first, the data written to 0 to $2^k$ (k=3), that is, states S0 to S7 of the memory cells X and Y of the combination A is read as illustrated in FIG. 51(a) in order to acquire the page 1 to 3 data. In this reading, seven voltage levels are used as the read voltage. Subsequently, the read page 1 to 3 data and the page 4 data corresponding to the page "+1" are written to the combination A of the word line WL0. That is, first, the page 1 to 3 data written to the combination A are read, and subsequently, writing to the combination A of the word line WL0 is executed based on the read page 1 to 3 data and the page 4 data corresponding to page "+1".

Next, an operation sequence in a case where writing data is sequentially converted at the time of receiving the writing data in the write operation will be described. The operation sequence in the write operation for the combination A is similar to the operation sequence in the write operation for the combination B. Here, the operation sequence in the write operation for the combination A will be described. The memory cells X and Y of the combination A correspond to D3.5.

Figure 54:
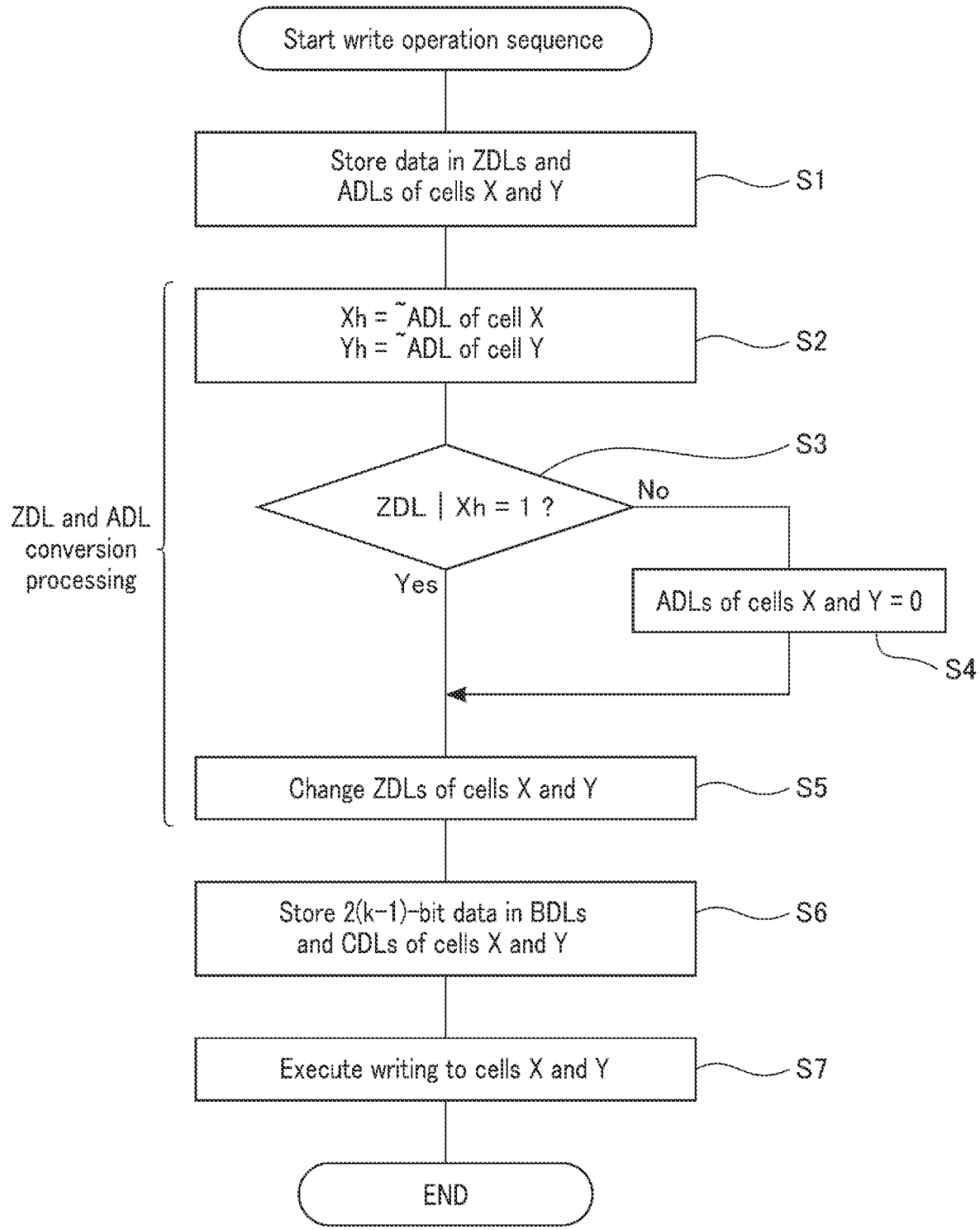
FIG. 54 is a flowchart illustrating an operation sequence in the write operation according to the second embodiment.

FIG. 53 is a diagram illustrating threshold coding in a case where the memory cells X and Y of the combination A (or B) correspond to D3.5. FIG. 54 is a flowchart illustrating the operation sequence for the combination A (or B) in the write operation. This operation sequence is executed by the sequencer 14. In a case where the semiconductor memory device 10 receives the writing data, the sequencer 14 sequentially converts the writing data as described below.

First, as illustrated in FIG. 54, the sequencer 14 stores data in the latch circuits ADL and ZDL of the memory cell X and the latch circuits ADL and ZDL of the memory cell Y (S1). Here, the same data is stored in the latch circuits ZDL of the memory cells X and Y.

Next, the sequencer 14 executes processing of conversion of the data stored in the latch circuits ADL and ZDL. Hereinafter, the data stored in the latch circuit ADL is referred to as "ADL", and the data stored in the latch circuit ZDL is referred to as "ZDL".

In the data conversion processing, the sequencer 14 sets inverted data of the ADL of the memory cell X to Xh. That is, Xh is set to "~ADL of the memory cell X". ~ADL represents inverted data of the ADL. Similarly, the sequencer 14 sets inverted data of the ADL of the memory cell Y to Yh. That is, Yh is set to "~ADL of the memory cell Y" (S2).

Next, the sequencer 14 determines whether at least one of the ZDL and Xh is 1. That is, it is determined whether ZDL|Xh=1 is satisfied (S3).

In a case where neither the ZDL nor Xh is 1 (No), the sequencer 14 sets the ADLs of the memory cells X and Y to 0. That is, ADL=0 is set (S4). Thereafter, the sequencer 14 advances the processing to step S5.

On the other hand, in a case where at least one of the ZDL and Xh is 1 (Yes), the sequencer 14 changes the ZDLs of the memory cells X and Y (S5). Specifically, the ZDL of the memory cell X is rewritten by "ZDL=ZDL|(~Xh & Yh)". The ZDL of the memory cell Y is rewritten by "ZDL=ZDL|Xh". Steps S2 to S5 described above are data conversion processing. Here, & represents a logical AND operation (and), and | represents a logical OR operation (or).

Next, the sequencer 14 stores "2(k−1)=2(3−1)=4"-bit data in the latch circuits BDL and CDL of the memory cell X and the latch circuits BDL and CDL of the memory cell Y (S6).

Next, the sequencer 14 executes the write operation on the memory cells X and Y according to the threshold coding illustrated in FIG. 53 (S7). Thus, the operation sequence in the write operation is ended.

Next, an operation sequence in a case where "+1"-bit data is separately written in the write operation will be described. The operation sequence in the write operation for the combination A is similar to the operation sequence in the write operation for the combination B, and here, the operation sequence in the write operation for the combination A will be described. The memory cells X and Y of the combination A correspond to D3.5.

Figure 55:
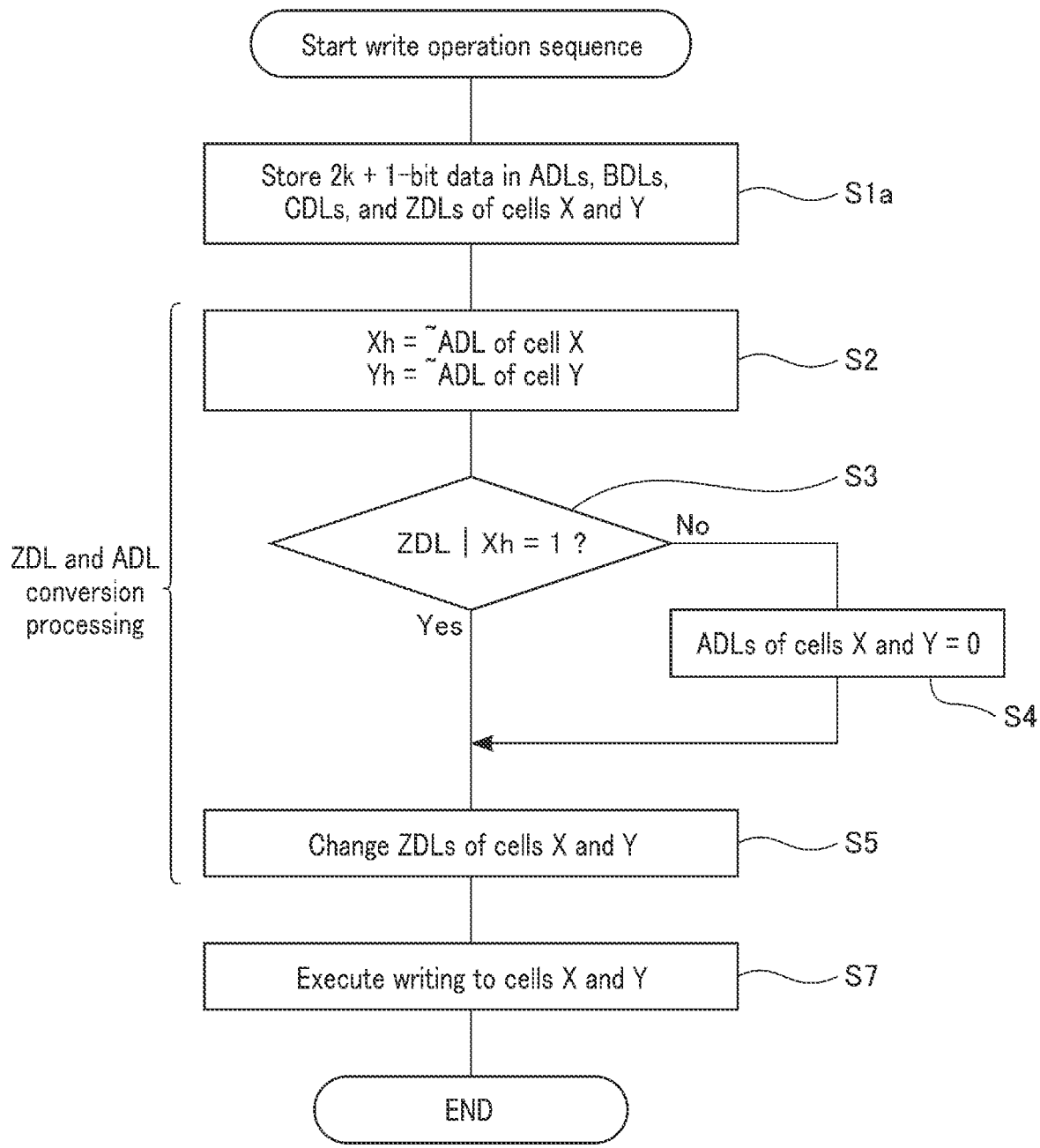
FIG. 55 is a flowchart illustrating another operation sequence in the write operation according to the second embodiment.

FIG. 55 is a flowchart illustrating the operation sequence for the combination A (or B) in the write operation. This operation sequence is executed by the sequencer 14. In a case where the semiconductor memory device 10 receives the writing data, the sequencer 14 converts the writing data as described below.

First, as illustrated in FIG. 55, the sequencer 14 stores "2k+1=2·3+1=7"-bit data in the latch circuits ADL, BDL, CDL, and ZDL of the memory cell X and the latch circuits ADL, BDL, CDL, and ZDL of the memory cell Y (Sla). Here, the same data is stored in the latch circuits ZDL of the memory cells X and Y.

Next, the processing of conversion of the data stored in the latch circuits ADL and ZDL is executed.

First, the sequencer 14 sets inverted data of the ADL of the memory cell X to Xh. That is, Xh is set to "~ADL of the memory cell X". Similarly, the sequencer 14 sets inverted data of the ADL of the memory cell Y to Yh. That is, Yh is set to "~ADL of the memory cell Y" (S2).

Next, the sequencer 14 determines whether at least one of the ZDL and Xh is 1. That is, it is determined whether ZDL|Xh=1 is satisfied (S3).

In a case where neither the ZDL nor Xh is 1 (No), the sequencer 14 sets the ADLs of the memory cells X and Y to 0. That is, ADL=0 is set (S4). Thereafter, the sequencer 14 advances the processing to step S5.

On the other hand, in a case where at least one of the ZDL and Xh is 1 (Yes), the sequencer 14 changes the ZDLs of the memory cells X and Y (S5). Specifically, the ZDL of the memory cell X is rewritten by "ZDL=ZDL|(~Xh & Yh)". The ZDL of the memory cell Y is rewritten by "ZDL=ZDL|Xh". Steps S2 to S5 above are data conversion processing.

Next, the sequencer 14 executes the write operation on the memory cells X and Y according to the threshold coding illustrated in FIG. 53 (S7). Thus, the operation sequence in the write operation is ended.

2.2 Read Operation

In the write operation described above, the page "2k+1" data is written and stored in the semiconductor memory device 10. Hereinafter, the read operation of reading the page "2k+1" data stored in the semiconductor memory device 10 will be described.

In the read operation of the second embodiment, the page "2k+1" data stored by the combination A in the memory cell array 11A of the plane PL0 and the combination B in the memory cell array 11B of the plane PL1 is read. Alternatively, the page "2k+1" data stored by the combinations A and B connected to different word lines (for example, WL0 and WL1) in the plane PL0 (or PL1) is read. Here, a case where the page "2k+1" data stored by the combination A of the plane PL0 and the combination B of the plane PL1 is read will be described as an example.

Hereinafter, the read operation in a case where the memory cell corresponds to D1.5, the read operation in a case where the memory cell corresponds to D2.5, and the read operation in a case where the memory cell corresponds to D3.5 will be described.

First, the read operation in a case where the memory cell corresponds to D1.5 will be described.

FIG. 56 is a table illustrating read voltages used for the read operation in a case where the memory cell corresponds to D1.5.

The reading of page 1 (16 kB) is executed for the memory cells X and Y of the combination A included in the plane PL0 using read voltages R1 and R2. Since the values stored in the memory cells X and Y are determined by reading using the two read voltages R1 and R2, the number of times of determination of this reading is two.

Next, the reading of a half page (8 kB) of page 2 is executed for the memory cells X and Y of the combination A of the plane PL0 using the read voltage R2. Since the values stored in the memory cells X and Y are determined by reading using a read voltage R2, the number of times of determination of this reading is one.

Next, the reading of the remaining half page (8 kB) of page 2 is executed for the memory cells X and Y of the combination B included in the plane PL1 using the read voltage R2. Since the values stored in the memory cells X and Y are determined by reading using a read voltage R2, the number of times of determination of this reading is one.

Next, the reading of page 3 (16 kB) is executed for the memory cells X and Y of the combination A of the plane PL0 using the read voltages R1 and R2. Since the values stored in the memory cells X and Y are determined by reading using the two read voltages R1 and R2, the number of times of determination of this reading is two.

As described above, in the read operation in a case where the memory cell corresponds to D1.5, the number of times of determination for the plane PL0 is three, and the number of times of determination for the plane PL1 is three. The determination performed using the read voltage in the plane PL0 and the determination performed using the read voltage in the plane PL1 can be executed in parallel. Therefore, in the read operation in a case where the memory cell corresponds to D1.5, the page 1 to 3 data can be read by the three-time determination.

Next, the read operation in a case where the memory cell corresponds to D2.5 will be described.

FIG. 57 is a table illustrating read voltages used for the read operation in a case where the memory cell corresponds to D2.5.

The reading of page 1 (16 kB) is executed for the memory cells X and Y of the combination A included in the plane PL0 using read voltages R2 and R4. Since the values stored in the memory cells X and Y are determined by reading using the two read voltages R2 and R4, the number of times of determination of this reading is two.

Next, the reading of page 2 (16 kB) is executed for the memory cells X and Y of the combination A of the plane PL0 using read voltages R1, R3, and R5. Since the values stored in the memory cells X and Y are determined by reading using the three read voltages R1, R3, and R5, the number of times of determination of this reading is three.

Next, the reading of a half page (8 kB) of page 3 is executed for the memory cells X and Y of the combination A of the plane PL0 using the read voltage R4. Since the values stored in the memory cells X and Y are determined by reading using a read voltage R4, the number of times of determination of this reading is one.

Next, the reading of the remaining half page (8 kB) of page 3 is executed for the memory cells X and Y of the combination B included in the plane PL1 using the read voltage R4. Since the values stored in the memory cells X and Y are determined by reading using a read voltage R4, the number of times of determination of this reading is one.

Next, the reading of page 4 (16 kB) is executed for the memory cells X and Y of the combination B of the plane PL1 using read voltages R1, R3, and R5. Since the values stored in the memory cells X and Y are determined by reading using the three read voltages R1, R3, and R5, the number of times of determination of this reading is three.

Next, the reading of page 5 (16 kB) is executed for the memory cells X and Y of the combination B of the plane PL1 using the read voltages R2 and R4. Since the values stored in the memory cells X and Y are determined by reading using the two read voltages R2 and R4, the number of times of determination of this reading is two.

As described above, in the read operation in a case where the memory cell corresponds to D2.5, the number of times of determination for the plane PL0 is six, and the number of times of determination for the plane PL1 is six. The determination performed using the read voltage in the plane PL0 and the determination performed using the read voltage in the plane PL1 can be executed in parallel. Therefore, in the read operation in a case where the memory cell corresponds to D2.5, the page 1 to 5 data can be read by the six-time determination.

Next, the read operation in a case where the memory cell corresponds to D3.5 will be described.

FIG. 58 is a table illustrating read voltages used for the read operation in a case where the memory cell corresponds to D3.5.

The reading of page 1 (16 kB) is executed for the memory cells X and Y of the combination A included in the plane PL0 using read voltages R4 and R8. Since the values stored in the memory cells X and Y are determined by reading using the two read voltages R4 and R8, the number of times of determination of this reading is two.

Next, the reading of page 2 (16 kB) is executed for the memory cells X and Y of the combination A of the plane PL0 using read voltages R2, R6, and R10. Since the values stored in the memory cells X and Y are determined by reading using the three read voltages R2, R6, and R10, the number of times of determination of this reading is three.

Next, the reading of page 3 (16 kB) is executed for the memory cells X and Y of the combination A of the plane PL0 using read voltages R1, R3, R5, R7, R9, and R11. Since the values stored in the memory cells X and Y are determined by reading using the six read voltages R1, R3, R5, R7, R9, and R11, the number of times of determination of this reading is six.

Next, the reading of a half page (8 kB) of page 4 is executed for the memory cells X and Y of the combination A of the plane PL0 using the read voltage R8. Since the values stored in the memory cells X and Y are determined by reading using a read voltage R8, the number of times of determination of this reading is one.

Next, the reading of the remaining half page (8 kB) of page 4 is executed for the memory cells X and Y of the combination B included in the plane PL1 using the read voltage R8. Since the values stored in the memory cells X and Y are determined by reading using a read voltage R8, the number of times of determination of this reading is one.

Next, the reading of page 5 (16 kB) is executed for the memory cells X and Y of the combination B of the plane PL1 using the read voltages R4 and R8. Since the values stored in the memory cells X and Y are determined by reading using the two read voltages R4 and R8, the number of times of determination of this reading is two.

Next, the reading of page 6 (16 kB) is executed for the memory cells X and Y of the combination B of the plane PL1 using read voltages R2, R6, and R10. Since the values stored in the memory cells X and Y are determined by reading using the three read voltages R2, R6, and R10, the number of times of determination of this reading is three.

Next, the reading of page 7 (16 kB) is executed for the memory cells X and Y of the combination B of the plane PL1 using read voltages R1, R3, R5, R7, R9, and R11. Since the values stored in the memory cells X and Y are determined by reading using the six read voltages R1, R3, R5, R7, R9, and R11, the number of times of determination of this reading is six.

As described above, in the read operation in a case where the memory cell corresponds to D3.5, the number of times of determination for the plane PL0 is twelve, and the number of times of determination for the plane PL1 is twelve. The determination performed using the read voltage in the plane PL0 and the determination performed using the read voltage in the plane PL1 can be executed in parallel. Therefore, in the read operation in a case where the memory cell corresponds to D3.5, the page 1 to 7 data can be read by the twelve-time determination.

Note that in a case where the page "2k+1" data stored by the combinations A and B connected to different word lines in the plane PL0 (or PL1) is read, reading with respect to the combinations A and B cannot be executed in parallel. Therefore, in the read operation in a case where the memory cell corresponds to D1.5, the page 1 to 3 data are read by the six-time determination. In the read operation in a case where the memory cell corresponds to D2.5, the page 1 to 5 data are read by the twelve-time determination. In the read operation in a case where the memory cell corresponds to D3.5, the page 1 to 7 data are read by the 24-time determination.

Next, it will be described that even in a case where the memory cell corresponds to D3.5, the memory cell can be used as one corresponding to D3.

FIG. 59(a) is a table illustrating read voltages used for the read operation in a case where the memory cell corresponds to D3, and FIG. 59(b) is a table illustrating read voltages used for the read operation in a case where the memory cell corresponds to D3.5. FIG. 60(a) is a diagram illustrating a reading range in the read operation in a case where the memory cell corresponds to D3. FIG. 60(b) is a diagram illustrating a reading range in the read operation in a case where the memory cell corresponds to D3.5.

As described above, even in a case where the memory cell corresponds to D3.5, the memory cell can be used as one corresponding to D3. That is, even in a case where the memory cell can use the states S0 to S11, writing can be performed using the states S0 to S7 and data written in the states S0 to S7 of the memory cell can be read.

In addition, for example, in a case where it is desired to expand data after data is written in a case where the memory cell corresponds to D3, that is, in a case where it is desired to write more data to the memory cell, data can be written such that the memory cell corresponds to D3.5.

Hereinafter, the number of times of determination in the read operation in a case where the memory cell corresponds to D3 and D3.5 will be described.

In a case where the memory cell corresponds to D3, reading is performed as described below. As illustrated in FIG. 59(a), the reading of page 1 (16 kB) is executed for the memory cells X and Y of the combination A included in the plane PL0 using the read voltage R4. Since the values stored in the memory cells X and Y are determined by reading using a read voltage R4, the number of times of determination of this reading is one.

Next, the reading of page 2 (16 kB) is executed for the memory cells X and Y of the combination A of the plane PL0 using the read voltages R2 and R6. Since the values stored in the memory cells X and Y are determined by reading using the two read voltages R2 and R6, the number of times of determination of this reading is two.

Next, the reading of page 3 (16 kB) is executed for the memory cells X and Y of the combination A of the plane PL0 using read voltages R1, R3, R5, and R7. Since the values stored in the memory cells X and Y are determined by reading using the four read voltages R1, R3, R5, and R7, the number of times of determination of this reading is four.

Next, the reading of page 4 (16 kB) is executed for the memory cells X and Y of the combination B of the plane PL1 using the read voltage R4. Since the values stored in the memory cells X and Y are determined by reading using a read voltage R4, the number of times of determination of this reading is one.

Next, the reading of page 5 (16 kB) is executed for the memory cells X and Y of the combination B of the plane PL1 using the read voltages R2 and R6. Since the values stored in the memory cells X and Y are determined by reading using the two read voltages R2 and R6, the number of times of determination of this reading is two.

Next, the reading of page 6 (16 kB) is executed for the memory cells X and Y of the combination B of the plane PL1 using read voltages R1, R3, R5, and R7. Since the values stored in the memory cells X and Y are determined by reading using the four read voltages R1, R3, R5, and R7, the number of times of determination of this reading is four.

As described above, in the read operation in a case where the memory cell corresponds to D3, the number of times of determination for the plane PL0 is seven, and the number of times of determination for the plane PL1 is seven. The determination performed using the read voltage in the plane PL0 and the determination performed using the read voltage in the plane PL1 can be executed in parallel. Therefore, in the read operation in a case where the memory cell corresponds to D3, the page 1 to 6 data can be read by the seven-time determination.

In a case where the memory cell corresponds to D3.5, reading is performed as described below. As illustrated in FIG. 59(b), the reading of page 1 (16 kB) is executed for the memory cells X and Y of the combination A included in the plane PL0 using read voltages R4 and R8. Since the values stored in the memory cells X and Y are determined by reading using the two read voltages R4 and R8, the number of times of determination of this reading is two.

Next, the reading of page 2 (16 kB) is executed for the memory cells X and Y of the combination A of the plane PL0 using read voltages R2, R6, and R10. Since the values stored in the memory cells X and Y are determined by reading using the three read voltages R2, R6, and R10, the number of times of determination of this reading is three.

Next, the reading of page 3 (16 kB) is executed for the memory cells X and Y of the combination A of the plane PL0 using read voltages R1, R3, R5, R7, R9, and R11. Since the values stored in the memory cells X and Y are determined by reading using the six read voltages R1, R3, R5, R7, R9, and R11, the number of times of determination of this reading is six.

Next, the reading of a half page (8 kB) of page 4 is executed for the memory cells X and Y of the combination A of the plane PL0 using the read voltage R8. Since the values stored in the memory cells X and Y are determined by reading using a read voltage R8, the number of times of determination of this reading is one.

Next, the reading of the remaining half page (8 kB) of page 4 is executed for the memory cells X and Y of the combination B included in the plane PL1 using the read voltage R8. Since the values stored in the memory cells X and Y are determined by reading using a read voltage R8, the number of times of determination of this reading is one.

Next, the reading of page 5 (16 kB) is executed for the memory cells X and Y of the combination B of the plane PL1 using the read voltages R4 and R8. Since the values stored in the memory cells X and Y are determined by reading using the two read voltages R4 and R8, the number of times of determination of this reading is two.

Next, the reading of page 6 (16 kB) is executed for the memory cells X and Y of the combination B of the plane PL1 using read voltages R2, R6, and R10. Since the values stored in the memory cells X and Y are determined by reading using the three read voltages R2, R6, and R10, the number of times of determination of this reading is three.

Next, the reading of page 7 (16 kB) is executed for the memory cells X and Y of the combination B of the plane PL1 using read voltages R1, R3, R5, R7, R9, and R11. Since the values stored in the memory cells X and Y are determined by reading using the six read voltages R1, R3, R5, R7, R9, and R11, the number of times of determination of this reading is six.

As described above, in the read operation in a case where the memory cell corresponds to D3.5, the number of times of determination for the plane PL0 is twelve, and the number of times of determination for the plane PL1 is twelve. The determination performed using the read voltage in the plane PL0 and the determination performed using the read voltage in the plane PL1 can be executed in parallel. Therefore, in the read operation in a case where the memory cell corresponds to D3.5, the page 1 to 7 data can be read by the twelve-time determination.

Note that, in a case where the memory cell is used to correspond to D3 to D3.5, as illustrated in FIG. 59(b), the read voltage R8 increases in reading of page 1. The read voltage R10 increases in reading of page 2, the read voltages R9 and R11 increase in reading of page 3, and the read voltage R8 increases in reading of page 4. Similarly, the read voltage R8 increases in reading of page 5. The read voltage R10 increases in reading of page 6, and the read voltages R9 and R11 increase in reading of page 7.

Next, in the case of post-writing of "+1"-bit data in the write operation, the range of the threshold voltage distribution of the memory cell may be expanded due to the neighboring word line interference (NWI). In order to reduce this, in a case where it is desired to reduce the change in the threshold voltage of the memory cell, the threshold voltage sections of the memory cells X and Y may be subdivided. A case where the memory cell corresponds to D3.5 will be described below.

Figures 61, 62:
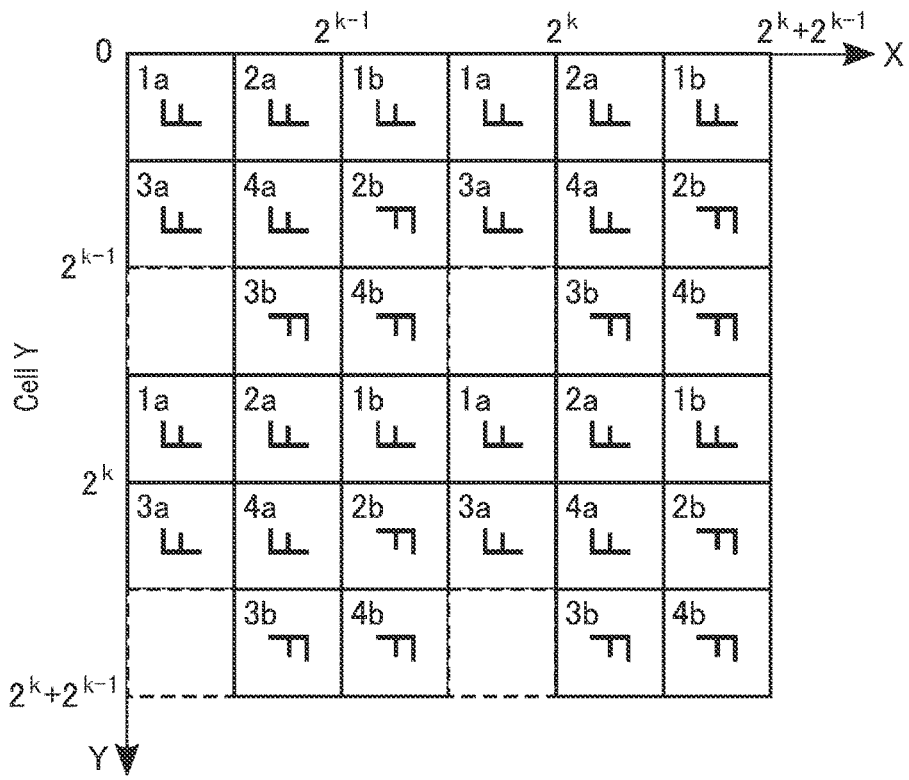
FIG. 61 is a diagram illustrating an example in which the threshold voltages of the memory cell are subdivided according to the second embodiment.
FIG. 62 is a table illustrating read voltages used for the read operation in a case of reading stored data in the example illustrated in FIG. 61.

FIG. 61 is a diagram illustrating an example in which the threshold voltages of the memory cells X and Y are subdivided. FIG. 62 is a table illustrating read voltages used for the read operation in a case of reading data stored at the threshold voltages illustrated in FIG. 61.

As illustrated in FIG. 62, in a case where the memory cell is used as D3.5, the reading of page 1 (16 kB) is executed for the memory cells X and Y of the combination A included in the plane PL0 using the read voltages R2, R4, R6, R8, and R10. Since the values stored in the memory cells X and Y are determined by reading using the five read voltages R2, R4, R6, R8, and R10, the number of times of determination of this reading is five.

Next, the reading of page 2 (16 kB) is executed for the memory cells X and Y of the combination A of the plane PL0 using the read voltages R5 and R11. Since the values stored in the memory cells X and Y are determined by reading using the two read voltages R5 and R11, the number of times of determination of this reading is two.

Next, the reading of page 3 (16 kB) is executed for the memory cells X and Y of the combination A of the plane PL0 using read voltages R1, R3, R7, and R9. Since the values stored in the memory cells X and Y are determined by reading using the four read voltages R1, R3, R7, and R9, the number of times of determination of this reading is four.

Next, the reading of a half page (8 kB) of page 4 is executed for the memory cells X and Y of the combination A of the plane PL0 using the read voltages R4, R6, and R10. Since the values stored in the memory cells X and Y are determined by reading using the three read voltages R4, R6, and R10, the number of times of determination of this reading is three.

Next, the reading of the remaining half page (8 kB) of page 4 is executed for the memory cells X and Y of the combination B included in the plane PL1 using the read voltages R4, R6, and R10. Since the values stored in the memory cells X and Y are determined by reading using the three read voltages R4, R6, and R10, the number of times of determination of this reading is three.

Next, the reading of page 5 (16 kB) is executed for the memory cells X and Y of the combination B of the plane PL1 using read voltages R2, R4, R6, R8, and R10. Since the values stored in the memory cells X and Y are determined by reading using the five read voltages R2, R4, R6, R8, and R10, the number of times of determination of this reading is five.

Next, the reading of page 6 (16 kB) is executed for the memory cells X and Y of the combination B of the plane PL1 using the read voltages R5 and R11. Since the values stored in the memory cells X and Y are determined by reading using the two read voltages R5 and R11, the number of times of determination of this reading is two.

Next, the reading of page 7 (16 kB) is executed for the memory cells X and Y of the combination B of the plane PL1 using read voltages R1, R3, R7, and R9. Since the values stored in the memory cells X and Y are determined by reading using the four read voltages R1, R3, R7, and R9, the number of times of determination of this reading is four.

Therefore, the number of times of determination in the read operation in a case where the memory cell corresponds to D3.5 is 14, which is not the minimum number.

As described above, in order to reduce the effect of the neighboring word line interference in the write operation, the threshold voltage sections of the memory cells X and Y may be subdivided. However, in a case where the threshold voltage sections of the memory cells X and Y are subdivided, the number of times of determination in the read operation, that is, the number of times of reading increases. Therefore, the subdivision of the threshold voltage sections of the memory cells X and Y is determined depending on which of the effect of the neighboring word line interference and the number of times of reading is prioritized.

Next, an operation sequence in a case where the read data is sequentially processed in the read operation will be described. The operation sequence in the read operation for the combination A is similar to the operation sequence in the read operation for the combination B. Here, the operation sequence in the read operation for the combination A will be described. The memory cells X and Y of the combination A correspond to D3.5.

Figure 63:
FIG. 63 is a diagram illustrating threshold coding in a case where the memory cell corresponds to D3.5 according to the second embodiment.

FIG. 63 is a diagram illustrating threshold coding in a case where the memory cells X and Y of the combination A (or B) correspond to D3.5. FIG. 64 is a flowchart illustrating an operation sequence for the combination A (or B) in the read operation. This operation sequence is executed by the sequencer 14.

First, as illustrated in FIG. 64, the sequencer 14 reads data to the latch circuit ZDL of the memory cell X and the latch circuit ZDL of the memory cell Y. Here, the data stored in the latch circuit ZDL of the memory cell X is represented as Zx, and the data stored in the latch circuit ZDL of the memory cell Y is represented as Zy. That is, "Zx=(ZDL of memory cell X)" and "Zy=(ZDL of memory cell Y)" are set. Then, in a case where Zy is 0, Zx is set to 0. Further, Zx, that is, ZDL (1-bit data) of the memory cell X is output (S11).

Next, the sequencer 14 reads data to the latch circuit ADL of the memory cell X and the latch circuit ADL of the memory cell Y. In a case where Zy is 0, the ADL of the memory cell X is set to 1, and the ADL of the memory cell Y is set to ~Zx. Further, the ADL (1-bit data) of the memory cell X and the ADL (1-bit data) of the memory cell Y are output (S12).

Next, the sequencer 14 reads data to the latch circuit BDL of the memory cell X and the latch circuit BDL of the memory cell Y. The BDL (1-bit data) of the memory cell X and the BDL (1-bit data) of the memory cell Y are output (S13).

Next, the sequencer 14 reads data to the latch circuit CDL of the memory cell X and the latch circuit CDL of the memory cell Y. The CDL (1-bit data) of the memory cell X and the CDL (1-bit data) of the memory cell Y are output (S14).

Here, an example in which the ZDLs and the ADLs to the CDLs of the memory cells X and Y are output in a case where the memory cells X and Y correspond to D3.5 has been described, but in a case where the memory cells X and Y correspond to D4.5, latch circuits DDL may be prepared, and the ZDLs and the ADLs to the DDLs of the memory cells X and Y may be output. The same applies to a case where the memory cells X and Y correspond to D5.5 or more.

In addition, an example in which the data of the latch circuits ZDL and ADL of the memory cells X and Y is read and output first, and then the data of the latch circuits BDL and CDL of the memory cells X and Y is read and output has been described above, but the data of the latch circuits BDL and CDL of the memory cells X and Y may be read and output first, and then the data of the latch circuits ZDL and ADL of the memory cells X and Y may be read and output.

2.3 Effects of Second Embodiment

According to the second embodiment, it is possible to provide a semiconductor memory device capable of improving the performance of the read operation or the write operation.

With the configuration of the second embodiment, in a case where the memory cell can store 0.5-bit data in addition to k-bit data, it is possible to store "2k+1"-bit data by storing the data in a combination of two memory cells.

Further, with the configuration of the second embodiment, k is an integer of 1 or more, and even in a case where k is increased to 1, 2, 3, 4, 5, . . . , it is possible to easily execute the write operation and the read operation of "2k+1"-bit data with respect to the semiconductor memory device 10 by using for data conversion between the three-dimensional $(\alpha,\beta,\gamma)$ coordinate space and the two-dimensional (X,Y) coordinate space described above.

In addition, with the configuration of the second embodiment, even in a case where the memory cell stores 0.5-bit data in addition to k-bit data, the memory controller 20 can handle "2k+1"-bit data as a unit of access, so that access to the semiconductor memory device 10 is easy.

Although some embodiments of the present invention have been described, these embodiments have been presented as examples, and are not intended to limit the scope of the invention. These embodiments can be implemented in various other forms, and various omissions, substitutions, and changes can be made without departing from the gist of the invention. These embodiments and modifications thereof are included in the scope and gist of the invention and are included in the invention described in the claims and the scope of equivalents thereof.

What is claimed is:

1. A semiconductor memory device comprising:
    a memory cell array including two or more memory cells; and
    a control circuit configured to control a write operation of writing first data to the two or more memory cells and a read operation of reading the first data from the two or more memory cells,
    wherein:
    the control circuit sets cell states of the two or more memory cells based on second data included in the first data in the write operation,
    the control circuit converts read data into the first data based on the second data included in data read from the two or more memory cells in the read operation, and
    in a case where each of the cell states of the two or more memory cells belongs to one of a plurality of sectioned threshold voltage distributions and the threshold voltage distribution to which the cell states belong in the write operation transitions in one direction, the control circuit causes each of the memory cells to store k-bit data, where k is an integer of 1 or more, then causes 1-bit data to be stored by a combination of the cell states of the memory cells by switching the cell states based on the second data, and then causes each of the memory cells to store the k-bit data.

2. The semiconductor memory device according to claim 1, wherein:
    each of the cell states of the two or more memory cells belongs to at least one of two to (k+0.5)-th power sectioned threshold voltage distributions, where k is an integer of 1 or more,
    the control circuit causes the two or more memory cells to store (2k+1)-bit data as the first data by a combination of the cell states, and
    the second data is 1 bit of (2k+1) bits.

3. The semiconductor memory device according to claim 1, wherein:
    the two or more memory cells include a first memory cell and a second memory cell, and
    the first memory cell and the second memory cell are connected to a first word line.

4. The semiconductor memory device according to claim 1, wherein:
    the memory cell array includes a first cell array and a second cell array, the first cell array including the first memory cell and a first word line connected to the first memory cell, and the second cell array including the second memory cell and a second word line connected to the second memory cell, and
    the semiconductor memory device further comprises a first row decoder connected to the first word line and a second row decoder connected to the second word line.

5. The semiconductor memory device according to claim 1, wherein:
    the first data includes k-bit, 1-bit, and k-bit data, where k is an integer of 1 or more, and
    the control circuit performs writing to the two or more memory cells in order of k-bit, 1-bit, and k-bit data in the write operation.

6. The semiconductor memory device according to claim 1, wherein:
    the first data includes (k+1)-bit and k-bit data, where k is an integer of 1 or more, and
    the control circuit performs writing to the two or more memory cells in order of (k+1)-bit and k-bit in the write operation.

7. The semiconductor memory device according to claim 1, wherein:
the two or more memory cells include a first memory cell, a second memory cell, a third memory cell, and a fourth memory cell,
the memory cell array includes a first combination and a second combination, the first combination including the first memory cell and the second memory cell, and the second combination including the third memory cell and the fourth memory cell, and
the control circuit writes the first data to the first combination and the second combination.

8. The semiconductor memory device according to claim 1, wherein:
the two or more memory cells include a first memory cell, a second memory cell, a third memory cell, and a fourth memory cell,
the memory cell array includes a first cell array and a second cell array, the first cell array including a first combination, the second cell array including a second combination, the first combination including the first memory cell and the second memory cell, and the second combination including the third memory cell and the fourth memory cell,
the semiconductor memory device further comprises:
a first row decoder that corresponds to the first cell array and is connected to the first memory cell and the second memory cell; and
a second row decoder that corresponds to the second cell array and is connected to the third memory cell and the fourth memory cell, and
the control circuit writes the first data to the first combination and the second combination.

9. The semiconductor memory device according to claim 1, wherein:
the two or more memory cells include a first memory cell, a second memory cell, a third memory cell, and a fourth memory cell,
the memory cell array includes a first combination and a second combination, the first combination including the first memory cell and the second memory cell connected to a first word line, and the second combination including the third memory cell and the fourth memory cell connected to a second word line, and
the control circuit writes the first data to the first combination and the second combination.

10. A semiconductor memory device comprising:
a memory cell array including two or more memory cells; and
a control circuit configured to control a write operation of writing first data to the two or more memory cells and a read operation of reading the first data from the two or more memory cells,
wherein:
the control circuit sets cell states of the two or more memory cells based on second data included in the first data in the write operation,
the control circuit converts read data into the first data based on the second data included in data read from the two or more memory cells in the read operation,
the first data includes k-bit, 1-bit, and k-bit data, where k is an integer of 1 or more,
the control circuit performs writing to the two or more memory cells in order of k-bit, 1-bit, and k-bit data in the write operation, and
the control circuit reads the k-bit written to the two or more memory cells before performing writing of the 1-bit and writes the read k-bit and the 1-bit in the write operation.

11. A semiconductor memory device comprising:
a memory cell array including two or more memory cells; and
a control circuit configured to control a write operation of writing first data to the two or more memory cells and a read operation of reading the first data from the two or more memory cells,
wherein:
the control circuit sets cell states of the two or more memory cells based on second data included in the first data in the write operation,
the control circuit converts read data into the first data based on the second data included in data read from the two or more memory cells in the read operation,
the first data includes (k+1)-bit and k-bit data, where k is an integer of 1 or more,
the control circuit performs writing to the two or more memory cells in order of (k+1)-bit and k-bit in the write operation, and
the control circuit reads partial bits of the (k+1) bits written to the two or more memory cells before performing writing of the k-bit, and performs writing of the k-bit based on the read partial bits in the write operation.

* * * * *